United States Patent
Stewart et al.

(10) Patent No.: US 9,958,228 B2
(45) Date of Patent: May 1, 2018

(54) TELEMATICS SENSORS AND CAMERA ACTIVATION IN CONNECTION WITH FIREARM ACTIVITY

(71) Applicant: Yardarm Technologies, Inc., Capitola, CA (US)

(72) Inventors: Robert J. Stewart, Soquel, CA (US); David Glowacki, San Francisco, CA (US); James Schaff, Pacifica, CA (US); Kyle Howell, Atlanta, GA (US); John Wade, Alpharetta, GA (US); Tom Tooley, Alpharetta, GA (US); Paul Hammond, San Jose, CA (US)

(73) Assignee: YARDARM TECHNOLOGIES, INC., Capitola, CA (US)

( * ) Notice: Subject to any disclaimer, the term of this patent is extended or adjusted under 35 U.S.C. 154(b) by 12 days.

(21) Appl. No.: 15/415,642

(22) Filed: Jan. 25, 2017

(65) Prior Publication Data
US 2017/0160041 A1    Jun. 8, 2017

Related U.S. Application Data

(63) Continuation-in-part of application No. 14/970,104, filed on Dec. 15, 2015, which is a
(Continued)

(51) Int. Cl.
*F41A 17/00* (2006.01)
*F41A 35/00* (2006.01)
(Continued)

(52) U.S. Cl.
CPC .............. *F41A 35/00* (2013.01); *F41C 23/22* (2013.01); *F41C 33/029* (2013.01); *H04N 7/185* (2013.01); *H04N 7/188* (2013.01)

(58) Field of Classification Search
CPC .................................................... F41C 33/029
See application file for complete search history.

(56) References Cited

U.S. PATENT DOCUMENTS

| | | | |
|---|---|---|---|
| 4,291,481 | A | 9/1981 | Hillberg |
| 4,409,670 | A | 10/1983 | Herndon et al. |

(Continued)

FOREIGN PATENT DOCUMENTS

| | | |
|---|---|---|
| DE | 102010019451 A1 | 11/2011 |
| GB | 2273624 A | 6/1994 |

(Continued)

OTHER PUBLICATIONS

"Breathalyzer." Wikipedia (last modified Aug. 14, 2014), http://en.wikipedia.org/wiki/Breathalyzer, WayBack Machine captured Sep. 4, 2014, 11 pages.

(Continued)

*Primary Examiner* — Gabriel Klein
(74) *Attorney, Agent, or Firm* — Ascenda Law Group, PC

(57) ABSTRACT

Disclosed herein are apparatuses, systems, methods, and machine readable media for activating a portable camera in response to the activity of a firearm, and for implementing and using a system for identifying an individual who discharged a firearm, and for recording, assessing, identifying, and transmitting information related to the firing of a firearm, and for monitoring the status of an implement at a mount, and for using a charging device for delivering electrical power to components of a firearm. A communications channel may be established between a firearm telematics sensor and a video camera, sometimes by means of intermediary devices. A communications channel may be established between a mount (e.g., holster) telematics device and local and/or remote monitoring service components, sometimes by means of intermediary devices. When the telematics sensor detects that its associated firearm is (Continued)

removed from its holster, or in motion, or being discharged, it may signal the camera to initiate recording. When the telematics device detects that its associated firearm is removed from its holster, the change in status can be reported to the local and/or remote system.

8 Claims, 32 Drawing Sheets

Related U.S. Application Data continuation-in-part of application No. 14/970,109, filed on Dec. 15, 2015, application No. 15/415,642, which is a continuation-in-part of application No. 14/970,112, filed on Dec. 15, 2015, application No. 15/415,642, which is a continuation-in-part of application No. 14/986,139, filed on Dec. 31, 2015, now abandoned, application No. 15/415,642, which is a continuation-in-part of application No. 15/189,917, filed on Jun. 22, 2016, now Pat. No. 9,658,012, which is a continuation of application No. 14/023,371, filed on Sep. 10, 2013, now Pat. No. 9,395,132, which is a continuation-in-part of application No. 13/954,903, filed on Jul. 30, 2013, now Pat. No. 9,404,698, which is a continuation-in-part of application No. 13/913,478, filed on Jun. 9, 2013, now Pat. No. 9,400,150.

(60) Provisional application No. 62/092,133, filed on Dec. 15, 2014, provisional application No. 62/092,153, filed on Dec. 15, 2014, provisional application No. 62/092,167, filed on Dec. 15, 2014, provisional application No. 62/283,807, filed on Sep. 14, 2015, provisional application No. 61/853,179, filed on Apr. 1, 2013, provisional application No. 61/853,971, filed on Apr. 16, 2013, provisional application No. 61/825,985, filed on May 21, 2013.

(51) Int. Cl.
*F41C 33/02* (2006.01)
*F41C 23/22* (2006.01)
*H04N 7/18* (2006.01)

(56) References Cited

U.S. PATENT DOCUMENTS

| | | |
|---|---|---|
| 4,556,872 A | 12/1985 | Masoncup et al. |
| 4,811,578 A | 3/1989 | Masoncup et al. |
| 4,863,130 A | 9/1989 | Marks, Jr. |
| 4,918,473 A | 4/1990 | Blackshear |
| 5,027,104 A | 6/1991 | Reid |
| 5,096,287 A | 3/1992 | Kakinami et al. |
| 5,111,289 A | 5/1992 | Lucas et al. |
| 5,194,845 A | 3/1993 | Sirmon et al. |
| 5,289,321 A | 2/1994 | Secor |
| 5,381,155 A | 1/1995 | Gerber |
| 5,446,659 A | 8/1995 | Yamawaki |
| 5,453,939 A | 9/1995 | Hoffman et al. |
| 5,473,729 A | 12/1995 | Bryant et al. |
| 5,479,149 A * | 12/1995 | Pike .................. F41C 33/0209 340/539.1 |
| 5,497,419 A | 3/1996 | Hill |
| 5,526,133 A | 6/1996 | Paff |
| 5,553,311 A | 9/1996 | McLaughlin et al. |
| 5,585,798 A | 12/1996 | Yoshioka et al. |
| 5,642,285 A | 6/1997 | Woo et al. |
| 5,655,461 A | 8/1997 | Gilbert |
| 5,668,675 A | 9/1997 | Fredricks |
| 5,689,442 A | 11/1997 | Swanson et al. |
| 5,742,336 A | 4/1998 | Lee |
| 5,752,632 A | 5/1998 | Sanderson et al. |
| 5,798,458 A | 8/1998 | Monroe |
| 5,815,093 A | 9/1998 | Kikinis |
| 5,850,613 A | 12/1998 | Bullecks |
| 5,878,283 A | 3/1999 | House et al. |
| 5,886,739 A | 3/1999 | Winningstad |
| 5,890,079 A | 3/1999 | Levine |
| 5,926,210 A | 7/1999 | Hackett et al. |
| 5,978,017 A | 11/1999 | Tino |
| 5,983,161 A | 11/1999 | Lemelson et al. |
| 5,996,023 A | 11/1999 | Winter et al. |
| 6,008,841 A | 12/1999 | Charlson |
| 6,028,528 A | 2/2000 | Lorenzetti et al. |
| 6,052,068 A | 4/2000 | Price et al. |
| 6,097,429 A | 8/2000 | Seeley et al. |
| 6,100,806 A | 8/2000 | Gaukel |
| 6,121,881 A | 9/2000 | Bieback et al. |
| 6,141,609 A | 10/2000 | Herdeg et al. |
| 6,163,338 A | 12/2000 | Johnson et al. |
| 6,175,300 B1 | 1/2001 | Kendrick |
| 6,223,461 B1 | 5/2001 | Mardirossian |
| 6,298,290 B1 | 10/2001 | Abe et al. |
| 6,310,541 B1 | 10/2001 | Atkins |
| 6,314,364 B1 | 11/2001 | Nakamura |
| 6,321,478 B1 | 11/2001 | Klebes |
| 6,326,900 B2 | 12/2001 | Deline et al. |
| 6,333,694 B2 | 12/2001 | Pierce et al. |
| 6,333,759 B1 | 12/2001 | Mazzilli |
| 6,357,156 B1 | 3/2002 | Klebes et al. |
| 6,370,475 B1 | 4/2002 | Breed et al. |
| RE37,709 E | 5/2002 | Dukek |
| 6,389,340 B1 | 5/2002 | Rayner |
| 6,396,403 B1 | 5/2002 | Haner |
| 6,405,112 B1 | 6/2002 | Rayner |
| 6,415,542 B1 | 7/2002 | Bates et al. |
| 6,421,943 B1 | 7/2002 | Caulfield et al. |
| 6,429,769 B1 | 8/2002 | Fulgueira |
| 6,449,540 B1 | 9/2002 | Rayner |
| 6,452,572 B1 | 9/2002 | Fan et al. |
| 6,477,801 B1 | 11/2002 | O'Dwyer |
| 6,518,881 B2 | 2/2003 | Monroe |
| 6,525,672 B2 | 2/2003 | Chainer et al. |
| 6,546,119 B2 | 4/2003 | Ciolli et al. |
| 6,560,463 B1 | 5/2003 | Santhoff |
| 6,591,242 B1 | 7/2003 | Karp et al. |
| 6,681,195 B1 | 1/2004 | Poland et al. |
| 6,697,103 B1 | 2/2004 | Fernandez et al. |
| 6,718,239 B2 | 4/2004 | Rayner |
| 6,727,816 B1 | 4/2004 | Helgeson |
| 6,748,792 B1 | 6/2004 | Freund et al. |
| 6,823,621 B2 | 11/2004 | Gotfried |
| 6,831,556 B1 | 12/2004 | Boykin |
| 6,856,873 B2 | 2/2005 | Breed et al. |
| 6,970,183 B1 | 11/2005 | Monroe |
| 6,975,204 B1 | 12/2005 | Silver |
| 7,004,848 B2 | 2/2006 | Konow |
| 7,012,632 B2 | 3/2006 | Freeman et al. |
| 7,034,683 B2 | 4/2006 | Ghazarian |
| 7,038,590 B2 | 5/2006 | Hoffman et al. |
| D529,528 S | 10/2006 | Ross, Jr. et al. |
| 7,119,832 B2 | 10/2006 | Blanco et al. |
| 7,126,472 B2 | 10/2006 | Kraus et al. |
| 7,147,155 B2 | 12/2006 | Weekes |
| 7,158,167 B1 | 1/2007 | Yerazunis et al. |
| 7,180,407 B1 | 2/2007 | Guo et al. |
| 7,190,882 B2 | 3/2007 | Gammenthaler |
| 7,359,553 B1 | 4/2008 | Wendt et al. |
| 7,371,021 B2 | 5/2008 | Ross, Jr. et al. |
| 7,436,955 B2 | 10/2008 | Yan et al. |
| 7,448,996 B2 | 11/2008 | Khanuja et al. |
| 7,456,875 B2 | 11/2008 | Kashiwa |
| 7,488,996 B2 | 2/2009 | Chang |
| 7,496,140 B2 | 2/2009 | Winningstad et al. |
| 7,500,794 B1 | 3/2009 | Clark |
| 7,508,941 B1 | 3/2009 | O'Toole et al. |
| 7,536,457 B2 | 5/2009 | Miller |
| 7,539,533 B2 | 5/2009 | Tran |
| 7,561,037 B1 | 7/2009 | Monroe |
| 7,594,416 B2 | 9/2009 | Bosin |

(56) References Cited

U.S. PATENT DOCUMENTS

| | | |
|---|---|---|
| 7,600,339 B2 | 10/2009 | Schumacher et al. |
| 7,602,301 B1 | 10/2009 | Stirling et al. |
| 7,659,827 B2 | 2/2010 | Gunderson et al. |
| 7,680,947 B2 | 3/2010 | Nicholl et al. |
| 7,697,035 B1 | 4/2010 | Suber et al. |
| 7,703,229 B2 | 4/2010 | Parhofer et al. |
| 7,744,483 B2 | 6/2010 | Konow |
| 7,804,426 B2 | 9/2010 | Etcheson |
| 7,806,525 B2 | 10/2010 | Howell et al. |
| 7,849,624 B2 | 12/2010 | Holt et al. |
| 7,853,944 B2 | 12/2010 | Choe |
| 7,921,588 B2 | 4/2011 | Brown et al. |
| 8,046,948 B2 | 11/2011 | Mauch et al. |
| 8,077,029 B1 | 12/2011 | Daniel et al. |
| 8,127,482 B2 | 3/2012 | O'Shaughnessy et al. |
| 8,166,693 B2 | 5/2012 | Hughes et al. |
| 8,175,314 B1 | 5/2012 | Webster |
| 8,269,617 B2 | 9/2012 | Cook et al. |
| 8,312,660 B1 | 11/2012 | Fujisaki |
| 8,314,708 B2 | 11/2012 | Gunderson et al. |
| 8,339,257 B2 | 12/2012 | Cazanas et al. |
| 8,373,567 B2 | 2/2013 | Denson |
| 8,375,838 B2 | 2/2013 | Rudakevych et al. |
| 8,384,539 B2 | 2/2013 | Denny et al. |
| 8,456,293 B1 | 6/2013 | Trundle et al. |
| 8,503,972 B2 | 8/2013 | Haler et al. |
| 8,508,353 B2 | 8/2013 | Cook et al. |
| 8,520,069 B2 | 8/2013 | Haler |
| 8,584,388 B1 | 11/2013 | Fujisaki |
| 8,606,492 B1 | 12/2013 | Botnen |
| 8,676,428 B2 | 3/2014 | Richardson et al. |
| 8,707,758 B2 | 4/2014 | Keays |
| 8,725,462 B2 | 5/2014 | Jain et al. |
| 8,744,642 B2 | 6/2014 | Nemat-Nasser et al. |
| 8,781,292 B1 | 7/2014 | Ross et al. |
| 8,849,501 B2 | 9/2014 | Cook et al. |
| 8,854,199 B2 | 10/2014 | Cook et al. |
| 8,930,072 B1 | 1/2015 | Lambert et al. |
| 8,931,195 B2 | 1/2015 | Milde, Jr. |
| 8,947,252 B2 | 2/2015 | Wilson |
| 8,966,797 B2 | 3/2015 | Carlson |
| 8,989,914 B1 | 3/2015 | Nemat-Nasser et al. |
| 8,996,234 B1 | 3/2015 | Tamari et al. |
| 9,140,509 B2 | 9/2015 | Sullivan et al. |
| 9,253,452 B2 | 2/2016 | Ross et al. |
| 9,666,056 B2* | 5/2017 | Herrera .................. G08B 21/18 |
| 2001/0032407 A1 | 10/2001 | Cain et al. |
| 2001/0033228 A1 | 10/2001 | Kisreman et al. |
| 2002/0013517 A1 | 1/2002 | West et al. |
| 2002/0032510 A1 | 3/2002 | Turnbull et al. |
| 2002/0032976 A1 | 3/2002 | Riener |
| 2002/0044065 A1 | 4/2002 | Quist et al. |
| 2002/0049881 A1 | 4/2002 | Sugimura |
| 2002/0084130 A1 | 7/2002 | Ghazarian et al. |
| 2002/0131768 A1 | 9/2002 | Gammenthaler |
| 2002/0135336 A1 | 9/2002 | Zhou et al. |
| 2002/0159434 A1 | 10/2002 | Gosior et al. |
| 2002/0178635 A1 | 12/2002 | Martin |
| 2002/0191952 A1 | 12/2002 | Fiore et al. |
| 2003/0040917 A1 | 2/2003 | Fiedler |
| 2003/0080878 A1 | 5/2003 | Kirmuss |
| 2003/0081935 A1 | 5/2003 | Kirmuss |
| 2003/0081942 A1 | 5/2003 | Melnyk et al. |
| 2003/0095688 A1 | 5/2003 | Kirmuss |
| 2003/0106917 A1 | 6/2003 | Shetler et al. |
| 2003/0133018 A1 | 7/2003 | Ziemkowski |
| 2003/0173408 A1 | 9/2003 | Mosher, Jr. et al. |
| 2003/0215010 A1 | 11/2003 | Kashiwa |
| 2003/0215114 A1 | 11/2003 | Kyle |
| 2003/0222982 A1 | 12/2003 | Hamdan et al. |
| 2004/0043765 A1 | 3/2004 | Tolhurst |
| 2004/0098584 A1 | 5/2004 | Sherman et al. |
| 2004/0145457 A1 | 7/2004 | Schofield et al. |
| 2004/0168002 A1 | 8/2004 | Accarie et al. |
| 2004/0199785 A1 | 10/2004 | Pederson |
| 2004/0223054 A1 | 11/2004 | Rotholtz |
| 2005/0000139 A1 | 1/2005 | Mauch et al. |
| 2005/0030151 A1 | 2/2005 | Singh |
| 2005/0035161 A1 | 2/2005 | Shioda |
| 2005/0046583 A1 | 3/2005 | Richards |
| 2005/0066567 A1* | 3/2005 | Newkirk .................. F41A 17/06 42/70.11 |
| 2005/0066587 A1 | 3/2005 | Newkirk et al. |
| 2005/0068169 A1 | 3/2005 | Copley et al. |
| 2005/0094966 A1 | 5/2005 | Elberbaum |
| 2005/0100329 A1 | 5/2005 | Lao et al. |
| 2005/0134966 A1 | 6/2005 | Burgner |
| 2005/0153729 A1 | 7/2005 | Logan et al. |
| 2005/0167172 A1 | 8/2005 | Fernandez |
| 2005/0188583 A1 | 9/2005 | Jackson et al. |
| 2005/0206532 A1 | 9/2005 | Lock |
| 2005/0228234 A1 | 10/2005 | Yang |
| 2005/0232469 A1 | 10/2005 | Schofield et al. |
| 2005/0262751 A1 | 12/2005 | Leslie |
| 2006/0009238 A1 | 1/2006 | Stanco et al. |
| 2006/0028811 A1 | 2/2006 | Ross, Jr. et al. |
| 2006/0072014 A1 | 4/2006 | Geng et al. |
| 2006/0082730 A1* | 4/2006 | Franks .................. F41A 17/06 352/95 |
| 2006/0087439 A1 | 4/2006 | Tolliver |
| 2006/0098088 A1* | 5/2006 | Raghunath .............. H04N 5/782 348/61 |
| 2006/0158968 A1 | 7/2006 | Vanman et al. |
| 2006/0164220 A1 | 7/2006 | Harter, Jr. et al. |
| 2006/0164534 A1 | 7/2006 | Robinson et al. |
| 2006/0170770 A1 | 8/2006 | MacCarthy |
| 2006/0176149 A1 | 8/2006 | Douglas |
| 2006/0183505 A1 | 8/2006 | Willrich |
| 2006/0208857 A1 | 9/2006 | Wong |
| 2006/0220826 A1 | 10/2006 | Rast |
| 2006/0244601 A1 | 11/2006 | Nishimura |
| 2006/0256822 A1 | 11/2006 | Kwong et al. |
| 2006/0270465 A1 | 11/2006 | Lee et al. |
| 2006/0274828 A1 | 12/2006 | Siemens et al. |
| 2006/0282021 A1 | 12/2006 | DeVaul et al. |
| 2006/0287821 A1 | 12/2006 | Lin |
| 2006/0293571 A1 | 12/2006 | Bao et al. |
| 2007/0021134 A1 | 1/2007 | Liou |
| 2007/0037605 A1 | 2/2007 | Logan |
| 2007/0064108 A1 | 3/2007 | Haler |
| 2007/0067079 A1 | 3/2007 | Kosugi |
| 2007/0074438 A1 | 4/2007 | Parhofer |
| 2007/0102508 A1 | 5/2007 | Mcintosh |
| 2007/0117083 A1 | 5/2007 | Winneg et al. |
| 2007/0132567 A1 | 6/2007 | Schofield et al. |
| 2007/0152811 A1 | 7/2007 | Anderson |
| 2007/0172053 A1 | 7/2007 | Poirier |
| 2007/0177023 A1 | 8/2007 | Beuhler et al. |
| 2007/0180749 A1 | 8/2007 | Schumacher et al. |
| 2007/0211025 A1 | 9/2007 | Sato |
| 2007/0229350 A1 | 10/2007 | Scalisi et al. |
| 2007/0257781 A1 | 11/2007 | Denson |
| 2007/0257782 A1 | 11/2007 | Etcheson |
| 2007/0257804 A1 | 11/2007 | Gunderson et al. |
| 2007/0257815 A1 | 11/2007 | Gunderson et al. |
| 2007/0257987 A1* | 11/2007 | Wang .................. H04N 7/188 348/158 |
| 2007/0260361 A1 | 11/2007 | Etcheson |
| 2007/0268158 A1 | 11/2007 | Gunderson et al. |
| 2007/0271105 A1 | 11/2007 | Gunderson et al. |
| 2007/0271830 A1 | 11/2007 | Holt et al. |
| 2007/0271831 A1 | 11/2007 | Newkirk et al. |
| 2007/0277420 A1 | 12/2007 | Newkirk et al. |
| 2007/0284474 A1 | 12/2007 | Olson et al. |
| 2007/0285222 A1 | 12/2007 | Zadnikar |
| 2007/0287425 A1 | 12/2007 | Bates |
| 2007/0297320 A1 | 12/2007 | Brummette et al. |
| 2008/0001735 A1 | 1/2008 | Tran |
| 2008/0002599 A1 | 1/2008 | Yau et al. |
| 2008/0030580 A1 | 2/2008 | Kashiwa et al. |
| 2008/0032268 A1 | 2/2008 | Farrell et al. |
| 2008/0039962 A1 | 2/2008 | McRae |
| 2008/0042825 A1 | 2/2008 | Denny et al. |
| 2008/0043736 A1 | 2/2008 | Stanley |

(56) References Cited

U.S. PATENT DOCUMENTS

| | | |
|---|---|---|
| 2008/0049830 A1 | 2/2008 | Richardson |
| 2008/0061991 A1* | 3/2008 | Urban ................ F41C 33/0209 340/573.1 |
| 2008/0063252 A1 | 3/2008 | Dobbs et al. |
| 2008/0079581 A1 | 4/2008 | Price |
| 2008/0092610 A1 | 4/2008 | Kuo et al. |
| 2008/0100705 A1 | 5/2008 | Kister et al. |
| 2008/0120051 A1 | 5/2008 | Ivanesevic et al. |
| 2008/0121097 A1 | 5/2008 | Rudakevych et al. |
| 2008/0122603 A1 | 5/2008 | Plante et al. |
| 2008/0129518 A1 | 6/2008 | Carlton-Foss |
| 2008/0143481 A1 | 6/2008 | Abraham et al. |
| 2008/0144705 A1 | 6/2008 | Rackin et al. |
| 2008/0211906 A1 | 9/2008 | Lovric |
| 2008/0239064 A1 | 10/2008 | Iwasaki |
| 2008/0246656 A1 | 10/2008 | Ghazarian |
| 2008/0266118 A1 | 10/2008 | Pierson et al. |
| 2008/0289237 A1 | 11/2008 | Pikielny |
| 2009/0002491 A1 | 1/2009 | Haler |
| 2009/0002556 A1 | 1/2009 | Manapragada et al. |
| 2009/0037374 A1 | 2/2009 | Delia et al. |
| 2009/0064557 A1 | 3/2009 | Hughes et al. |
| 2009/0070820 A1 | 3/2009 | Li |
| 2009/0122142 A1 | 5/2009 | Shapley |
| 2009/0141129 A1 | 6/2009 | Dischinger |
| 2009/0169068 A1 | 7/2009 | Okamoto |
| 2009/0207252 A1 | 8/2009 | Raghunath |
| 2009/0213204 A1 | 8/2009 | Wong |
| 2009/0243794 A1 | 10/2009 | Morrow |
| 2009/0252486 A1 | 10/2009 | Ross, Jr. et al. |
| 2010/0060734 A1 | 3/2010 | Chou |
| 2010/0177891 A1 | 7/2010 | Keidar et al. |
| 2010/0188201 A1 | 7/2010 | Cook et al. |
| 2010/0191411 A1 | 7/2010 | Cook et al. |
| 2010/0192444 A1 | 8/2010 | Cabahug et al. |
| 2010/0238009 A1 | 9/2010 | Cook et al. |
| 2010/0238262 A1 | 9/2010 | Kurtz et al. |
| 2010/0242076 A1 | 9/2010 | Potesta et al. |
| 2010/0250021 A1 | 9/2010 | Cook et al. |
| 2010/0265331 A1 | 10/2010 | Tanaka |
| 2010/0284683 A1 | 11/2010 | Fressola et al. |
| 2010/0324859 A1 | 12/2010 | McNelis et al. |
| 2011/0006151 A1 | 1/2011 | Beard |
| 2011/0018493 A1 | 1/2011 | Bayne et al. |
| 2011/0030262 A1 | 2/2011 | O'Shaughnessy et al. |
| 2011/0056108 A1 | 3/2011 | McCord et al. |
| 2011/0061280 A1 | 3/2011 | Emde et al. |
| 2011/0069151 A1 | 3/2011 | Orimoto |
| 2011/0084820 A1 | 4/2011 | Walter et al. |
| 2011/0094003 A1 | 4/2011 | Spiewak et al. |
| 2011/0119979 A1 | 5/2011 | Gussalli et al. |
| 2011/0173869 A1 | 7/2011 | Uhm |
| 2011/0300944 A1 | 12/2011 | Raynal |
| 2012/0038689 A1 | 2/2012 | Ishii |
| 2012/0056722 A1 | 3/2012 | Kawaguchi |
| 2012/0063736 A1 | 3/2012 | Simmons et al. |
| 2012/0090038 A1 | 4/2012 | Pacella et al. |
| 2012/0142314 A1 | 6/2012 | Mohammed |
| 2012/0162436 A1 | 6/2012 | Cordell et al. |
| 2012/0189286 A1 | 7/2012 | Takayama et al. |
| 2012/0220307 A1 | 8/2012 | Wohlert et al. |
| 2012/0268259 A1 | 10/2012 | Igel et al. |
| 2012/0329538 A1 | 12/2012 | Hall |
| 2013/0021153 A1 | 1/2013 | Keays |
| 2013/0080836 A1 | 3/2013 | Stergiou et al. |
| 2013/0096731 A1 | 4/2013 | Tamari et al. |
| 2013/0222640 A1 | 8/2013 | Baek et al. |
| 2013/0239453 A1 | 9/2013 | Trimble |
| 2013/0318847 A1 | 12/2013 | Kelly |
| 2014/0037262 A1 | 2/2014 | Sako et al. |
| 2014/0049636 A1 | 2/2014 | O'Donnell et al. |
| 2014/0092299 A1 | 4/2014 | Phillips et al. |
| 2014/0094992 A1 | 4/2014 | Lambert et al. |
| 2014/0121958 A1 | 5/2014 | Schenken et al. |
| 2014/0162584 A1* | 6/2014 | Cope ................... F41C 33/0227 455/404.1 |
| 2014/0195105 A1 | 7/2014 | Lambert et al. |
| 2014/0210625 A1 | 7/2014 | Nemat-Nasser |
| 2014/0215885 A1 | 8/2014 | Sullivan et al. |
| 2014/0227671 A1 | 8/2014 | Olmstead et al. |
| 2014/0290110 A1 | 10/2014 | Stewart et al. |
| 2014/0311215 A1 | 10/2014 | Keays et al. |
| 2015/0040453 A1 | 2/2015 | Ballard et al. |
| 2015/0051502 A1 | 2/2015 | Ross |
| 2015/0063776 A1 | 3/2015 | Ross et al. |
| 2015/0068093 A1 | 3/2015 | Milde, Jr. et al. |
| 2015/0078727 A1 | 3/2015 | Ross et al. |
| 2015/0088335 A1 | 3/2015 | Lambert et al. |
| 2015/0103246 A1 | 4/2015 | Phillips et al. |
| 2015/0113851 A1 | 4/2015 | Bensayan et al. |
| 2015/0154556 A1 | 6/2015 | Skaaksrud |
| 2015/0241153 A1 | 8/2015 | Mardirossian |
| 2015/0256990 A1 | 9/2015 | Vilrokx et al. |
| 2015/0369554 A1 | 12/2015 | Kramer |
| 2016/0086472 A1 | 3/2016 | Herrera et al. |
| 2017/0059265 A1* | 3/2017 | Winter ................... F41A 17/08 |

FOREIGN PATENT DOCUMENTS

| | | | |
|---|---|---|---|
| GB | 2320389 A | 6/1998 | |
| GB | 2343252 A | 5/2000 | |
| GB | 2351055 A | 12/2000 | |
| GB | 2417151 A | 2/2006 | |
| GB | 2425427 A | 10/2006 | |
| GB | 2455885 A | 7/2009 | |
| GB | 2485804 A | 5/2012 | |
| JP | 08-153298 A | 6/1996 | |
| JP | 2000137263 A | 5/2000 | |
| RU | 2383915 C2 | 3/2010 | |
| WO | WO 90/05076 A1 | 5/1990 | |
| WO | WO 97/38526 A1 | 10/1997 | |
| WO | WO 98/31146 A1 | 7/1998 | |
| WO | WO 00/39556 A1 | 7/2000 | |
| WO | WO 00/51360 A1 | 8/2000 | |
| WO | WO 2001/84069 A1 | 4/2001 | |
| WO | WO 02/49881 A1 | 6/2002 | |
| WO | WO 02/095757 A2 | 11/2002 | |
| WO | WO 03/049446 A1 | 6/2003 | |
| WO | WO 2014/052898 A1 | 4/2014 | |
| WO | WO 2014/145079 A1 | 9/2014 | |
| WO | WO 2014/161083 A1 | 10/2014 | |
| WO | WO 2015156921 A1 * | 10/2015 | ............ F41C 33/029 |
| WO | 2016/048638 A1 | 3/2016 | |

OTHER PUBLICATIONS

"Controller Area Network (CAN) Overview", National Instruments White Paper (Aug. 1, 2014), 6 pages.

"Using In-Car Video, the Internet, and the Cloud to keep police officers safe is the subject of CopTrax live, free webinar." Stalker Press Room, Posted Date: Jul. 31, 2014, 14 pages.

Asian Wolf High Quality Angel Eye Body Video Spy Camera Recorder System, http://www.asianwolf.com/covert-bodycam-hq-angeleye.html, WayBack Machine captured Dec. 8, 2013, 3 pages.

Brick House Security Body Worn Cameras / Hidden Cameras / Covert Spy Cameras, http://www.brickhousesecurity.com, accessed Mar. 2, 2016, 3 pages.

Brown, "TP-LINK TL-WDR3500 Wireless N600 Router Review", Legitreviews.com, posted: Mar. 6, 2013, http://www.legitreviews.com/tp-link-tl-wdr3500-wireless-n600-router-review-under-50-wireless-router_2149, 5 pages.

Digital Ally First Vu Mountable Digital Camera Video Recorder, http://www.opticsplanet.com/digital-ally-first-vu-mountable-digital...CIKohcX05rkCFSio7AodUOIAOg &ef_id=UjCGEAAAAWGEjrQF:20130925155534:s, accessed Mar. 2, 2016, 6 pages.

Drift X170, http://driftinnovation.com/supportlfirmware-update/x170/, accessed Mar. 2, 2016, 5 pages.

Dyna Spy Inc. hidden cameras, https://www.dynaspy.com/hidden-cameras/spy-cameras/body-worn-wearable-spy-cameras, WayBack Machine captured Jan. 22, 2013.

(56) References Cited

OTHER PUBLICATIONS

ECplaza HY-001 HD law enforcement DVR, http://fireeye.en.ecplaza.net/law-enforcement-dvr--238185-1619696.html, accessed Mar. 2, 2016, 4 pages.
Edesix VideoBadge, http://www.edesix.com/edesix-products, WayBack Machine captured Sep. 28, 2013, 2 pages.
English abstract of Korean Utility Model Reg. No. 20-0236817. accessed Mar. 1, 2016, 3 pages.
English language translation of W02001/84069 A1 (Nov. 8, 2001) (Delsy Electronic Components AG), 158 pgs.
European Telecommunications Standards Institute, "Digital cellular telecommunications system; Unstructured Supplementary Service Data (USSD)—Stage 2 (GSM 03.90)," Dec. 1996, 35 pgs.
File History of U.S. Appl. No. 13/967,151, filed Aug. 14, 2013, entitled Computer Program, Method, and System for Managing Multiple Data Recording Devices; Inventor: Ross, Stanton E. et al., (1331 pages).
File History of U.S. Appl. No. 14/040,233, filed Sep. 27, 2013, entitled Computer Program, Method, and System for Managing Multiple Data Recording Devices; Inventor: Ross, Stanton E. et al., 168 pages).
File History of U.S. Appl. No. 14/040,329, filed Sep. 27, 2013, entitled Portable Video and Imaging System; Applicant: Digital Ally, Inc., 451 pages.
File History of U.S. Appl. No. 14/517,368, filed Oct. 17, 2014, entitled Forensic Video Recording With Presence Detection; Applicant: Digital Ally, Inc., 349 pages.
Freudenrich, Craig, Ph.D.; "How Breathalyzers Work—Why Test?." HowStuffWorks, http://electronics.howstuffworks.com/gadgets/automotive/breathalyzer1.htm, accessed Mar. 2, 2016, 6 pages.
GSM Overview (http://www.telecomspace.com/gsm.html), accessed May 27, 2014, 4 pgs.
Gunnegate, LLC, PCT/US2013/045002, filed Jun. 10, 2013, International Search Report and Written Opinion,ISAI KR, dated Dec. 17, 2013 (14 pg.).
http://www.k-h-b.com/sub1_02.html, WayBack Machine captured Mar. 22, 2006, 2 pages.
International Search Report and Written Opinion dated Feb. 12, 2016, from the International Searching Authority, for International Application No. PCT/US2015/065847 (filed Dec. 15, 2015), 11 pgs.
International Search Report and Written Opinion dated Feb. 16, 2016, from the International Searching Authority, for International Application No. PCT/US2015/065850 (filed Dec. 15, 2015), 15 pages.
International Search Report and Written Opinion dated Mar. 17, 2016, from the International Searching Authority, for International Patent Application No. PCT/US15/68295 (filed Dec. 31, 2015), 12 pages.
International Search Report and Written Opinion dated Feb. 26, 2016, from the International Searching Authority, for International Patent Application No. PCT/US15/65844 (filed Dec. 15, 2015), 15 pages.
Isaw Advance Hull HD EXtreme, www.isawcam.co.kr, WayBack Machine captured Aug. 7, 2013, 2 pages.
Jacobson; et al., "TCP Extensions for High Performance", Newtowrk Working Group (May 1992), Request for Comment 1323, https://www.ietf.org/rfc/rfc1323.txt, 37 pages.
Kopin Corporation; Home Page; Printed Date: Oct. 16, 2014; Posted Date: Unknown; <http://www.kopin.com>.
Korean Utility Model Reg. No. 20-0236817. published Oct. 8, 2001, 11 pages.
Kustom Signals VieVu, http://www.kustomsignals.com/index.php/mvideo/vievu, WayBack Machine captured Jun. 16, 2012, 3 pages.
Lea-Aid Scorpion Micro Recorder Patrol kit, http://www.leacorp.com/products/SCORPION-Micro-Recorder-Patrol- kit.html, accessed Mar. 1, 2016, 2 pages.
New Rearview-Mirror-Based Camera Display Takes the Guesswork Out of Backing Up, http://news.thomasnet.com/fullstory/rearview-mirror-display-eliminates-blind-spots-497750, accessed Feb. 26, 2016, 4 pages.

Notification Concerning Transmittal of International Preliminary Report on Patentability (Chapter I of the Patent Cooperation Treaty) dated Apr. 9, 2015; International Application No. PCT/US2013/062415; International Filing Date: Sep. 27, 2013; 6 pages.
Notification of Transmittal of the International Search Report and the Written Opinion of the International Searching Authority, or the Declaration dated Jan. 30, 2014; International Application No. PCT/US2013/062415; International Filing Date: Sep. 27, 2013; 7 pages.
Oregon Scientific ATC Chameleon Dual Lens HD Action Camera. http://www.oregonscientificstore.com/Oregon-Scientific-ATC-Chameleon-Duai-Lens-HD-Action-Camera.data, WayBack Machine captured Feb. 9, 2014, 4 pages.
Padgette; et al., "Guide to Bluetooth Security: Recommendations of the National Institute of Standards and Technology", National Institute of Standards and Technology, U.S. Dep't of Commerce, NIST Special Publication 800-121, Revision 1 (Jun. 2012), 47 pages.
Panasonic Handheld AVCCAM HD Recorder/Player, http://www.panasonic.com/business/provideo/ag-hmr10.asp, WayBack Machine captured Aug. 26, 2013, 2 pages.
Point of View Cameras Military & Police, http://pointofviewcameras.com/military-police, WayBack Machine captured Dec. 10, 2013.
POV.HD System Digital Video Camera, http://www.vio-pov.com/index.php, WayBack Machine captured Nov. 27, 2013, 6 pages.
Renstrom, Joel I; "Tiny 3D Projectors Allow You to Transmit Holograms From a Cell Phone." Giant Freakin Robot (Jun. 13, 2014), http://www.giantfreakinrobot.com/sci/coming-3d-projectors-transmit-holograms-cell-phone.html, 4 pages.
Reveal Media RS3-SX high definition video recorder, http://www.revealmedia.com/buy-t166/cameras/rs3-sx.aspx, WayBack Machine captured Jul. 31, 2013, 2 pages.
S.R. Lewis, "Future System Specifications for Traffic Enforcement Equipment", S.R. 1 Source: IEE Colloquium (Digest), N 252, Publication Date: Nov. 18, 1996, Abstract only (2 pgs.).
Salman; et al., "Overview of the IEEE 802.15.4 standards for Low rate Wireless Personal Area Networks", 2010 7th International Symposium on Wireless Communication Systems (ISWCS), Sep. 19-22, 2010, Abstract only (2 pgs.).
Samuel W. Daskam, Law Enforcement Armed Robbery Alarm System Utilizing Recorded Voice Addresses Via Police Radio Channels, Source: Univ. of Ky, Off of Res and Eng., Serv (UKY BU107), pp. 18-22, 1975, Abstract only (1 pg.).
Scorpion Micro DV Video Audio Recorder, http://www.leacorp.com/scorpion-micro-dv-video-audio-recorder/, accessed Feb. 22, 2016, 2 pages.
SIV Security in Vehicle Driving Partner, http://www.siv.co.kr/, accessed Mar. 4, 2016, 1 page.
Spy Chest Mini Spy Camera / Self Contained Mini camcorder / Audio & Video Recorder, http://www.spytechs.com/ spy_cameras/mini-spy-camera.htm, WayBack Machine captured May 9, 2013, 3 pages.
Stalker VUE Law Enforcement Grade Body Worn Video Camera/Recorder, http://www.stalkerradar.com/law_vue.shtml, WayBack Machine captured Sep. 28, 2013, 3 pages.
Supplementary European Search Report dated Sep. 28, 2010 in European Patent Application No. 06803645.8, 6 pages.
SUV Cam, http://www.elmo.co.jp/suv-cam/en/product/index.html, WayBack Machine captured Sep. 13, 2013, 2 pages.
Taser Axon Body on Officer Video/Police Body Camera, http://www.taser.com/products/on-officer-video/axon-body- on-officer-video, WayBack Machine captured Sep. 4, 2013.
Taser Axon Flex On-Officer Video/Police Video Camera, http://www.taser.com/products/on-officer-video/taser- axon, WayBack Machine captured Jul. 25, 2011, 3 pages.
Taser Cam Law Enforcement AudioNideo Recorder (gun mounted), http://www.taser.com/products/on-officer-video/ laser-cam,WayBack Machine captured Sep. 8, 2013, 4 pages.
Tide Leader police body worn camera, http://tideleader.en.forbuyers.com/product/14899076, accessed Mar. 2, 2016, 3 pages.
U.S. Appl. No. 90/013,489, filed Apr. 16, 2015, Re-Examination of U.S. Pat. No. 8,781,292, 1362 pages.

(56) References Cited

OTHER PUBLICATIONS

UCorder Pockito Wearabel Mini Peke! Camcorder, http://www.ucorder.com/, WayBack Machine captured Aug. 27, 2013, 17 pages.
Veho MUVI HD, http://veho-uk.fastnet.co.uk/main/shop.aspx?category=CAMMUVIHD, WayBack Machine captured Mar. 10, 2013, 6 pages.
Veho MUVI portable wireless speaker with dock, http://veho-uk.fastnet.co.uk/main/shop.aspx?category=camcorder, WayBack Machine captures Mar. 10, 2013, 7 pages.
Vidmic Officer Worn Video & Radio Accessories, http://www.vidmic.com/, WayBack Machine captures Jul. 17, 2013, 1 page.
VIEVU Products, http://www.vievu.com/vievu-products/vievu-squared, WayBack Machine captured Oct. 1, 2013, 2 pages.
W. Fincham, "Data Recorders for Accident Investigation", Monitoring of Driver and Vehicle Performance (Digest No. 1997/122), Publication Date: Apr. 10, 1997, Abstract Only (2 pgs.).
Wasson, Brian; "Digital Eyewearfor Law Enforcement."Wassom.com (Dec. 9, 2013), http://www.wassom.com/digital-eyewear-for-law-enforcement.html, 4 pages.
WatchGuard CopVu Wearable Video Camera System, http://watchguardvideo.com/copvu/overview, WayBack Machine captured Sep. 22, 2013, 2 pages.
Wikipedia Signalling System No. 7 (http://web.archive.org/web/20121128195932/https://en.wikipedia.org/wiki/Signalling_System_No._7), web on the internet archive Nov. 28, 2012, 7 pgs.
WolfCom 3rd Eye, X1 AN Recorder for Police and Military, http://wolfcomusa.com/Products/Products.html, WayBack Machine captured Jul. 19, 2013, 3 pages.
Zepcam Wearable Video Technology, Zepam Mobile Video Technology, http://www.zepcam.com/product.aspx, accessed: Mar. 3, 2016, 2 pages.

* cited by examiner

A.

B.

A.

B.

A.

B.

TELEMATICS SENSORS AND CAMERA ACTIVATION IN CONNECTION WITH FIREARM ACTIVITY

CROSS-REFERENCE TO RELATED APPLICATIONS

This application is a continuation-in-part of: (1) U.S. patent application Ser. No. 14/970,104, filed Dec. 15, 2015, which claims the benefit of U.S. Provisional Application No. 62/092,133, filed Dec. 15, 2014, (2) U.S. patent application Ser. No. 14/970,109, filed Dec. 15, 2015, which claims the benefit of U.S. Provisional Application No. 62/092,153, filed Dec. 15, 2014, (3) U.S. patent application Ser. No. 14/970,112, filed Dec. 15, 2015, which claims the benefit of U.S. Provisional Application No. 62/092,167, filed Dec. 15, 2014, (4) U.S. patent application Ser. No. 14/986,139, filed Dec. 31, 2015, which claims the benefit of U.S. Provisional Application No. 62/283,807, filed Sep. 14, 2015 and (5) U.S. patent application Ser. No. 15/189,917, filed Jun. 22, 2016, which is a continuation of U.S. patent application Ser. No. 14/023,371, now U.S. Pat. No. 9,395,132, filed Sep. 10, 2013, which is a continuation-in-part of U.S. patent application Ser. No. 13/954,903, now U.S. Pat. No. 9,404,698, filed Jul. 30, 2013, which is a continuation-in-part of U.S. patent application Ser. No. 13/913,478, now U.S. Pat. No. 9,400,150, filed Jun. 9, 2013, which claims the benefit of: (a) U.S. Provisional Pat. Appl. No. 61/853,179, filed Apr. 1, 2013, (b) U.S. Provisional Pat. Appl. No. 61/853,971, filed Apr. 16, 2013, and (c) U.S. Provisional Pat. Appl. No. 61/825,985, filed May 21, 2013; the disclosure of each of these applications is incorporated by reference in its entirety.

FIELD OF THE INVENTION

The present invention relates to apparatuses, systems, computer readable media, and methods for: providing services concerning control of a portable camera in response to activity involving a firearm, using an improved mechanism for providing electricity to electronic circuitry within a firearm, providing services concerning identifying the individual who discharged a firearm based on data from a firearm telematics sensor device, providing services concerning detecting and tracking holstering and unholstering, and monitoring and, optionally, controlling, handheld firearms and other instruments using embedded sensor devices that are configured to send and receive signals over a wireless communications network.

BACKGROUND

Personal video recorders as used by security and law enforcement personnel, hereafter referred to as body cameras, face many challenges in practical use. Easily portable sources of power, such as batteries, are limited in capacity and adversely impact the duration of body-camera operation. Storage media are limited in capacity and constrain the amount of video information that may be recorded. When the cameras do operate and can store their video data, it can be challenging to identify the portion of video information relevant to a specific event or incident.

Serious incidents for security and law enforcement personnel often involve use or anticipated use of a firearm.

Systems involving linking firearms and video recording have been contemplated—for example, in U.S. Pat. No. 9,140,509 to Sullivan et al., a gun-mounted "electronic evidence-collecting device"—e.g., a camera—is activated by the removal of the gun from its holster. Specifically, a light sensor mounted on the gun is covered when the gun is holstered, and when the gun is removed from its holster, the light sensor receives light and initiates the collection of gun-related data from sensors on the gun, and the sensed, gun-related data is forwarded to a portable device (e.g., a smartphone), which may then automatically call the user's partner and/or the central station to request assistance and backup. However, Sullivan's system has drawbacks—for example, it only contemplates activating data recording in response to unholstering as measured by a light sensor, and the only types of sensors it discloses are a holster sensor, a video camera, a microphone, a direction finder, a clock, and a GPS component. Additionally, Sullivan's system does not contemplate data sensing and recording devices that are not mounted on a handgun, or enabling real-time, granular event and location-based remote monitoring by integrating with a distributed system. The Sullivan system further does not contemplate metadata, or associating metadata with recorded video, as included in certain embodiments of the invention described below.

There is a need for devices and systems that facilitate reducing unnecessary power consumption (e.g., turning off or powering down the camera when needed), and reducing the amount of irrelevant or unnecessary video data to be stored and analyzed, as well as services that enable granular, real-time monitoring of firearm-related activity by a local team as well as by a remote command center. When video is generated, there is a need for facilitating review and analysis of recorded video from cameras that may concern firearm-related activity. Disclosed herein are embodiments of an invention that address those needs.

Although fundamentally mechanical in their operation, modern firearms increasingly make use of electronic circuitry. Sometimes these electronics are embedded in the firearm itself, and other times they are found in accessories attached to the firearm; examples include tactical lights and lasers, electronic scopes, and onboard computer and sensor arrays. With such electronics may come the need for electrical power, most commonly delivered by rechargeable or replaceable batteries.

The need to recharge or replace such batteries imposes compromises on the design of said electronic accessories. These design compromises introduce drawbacks—for example, allowances must be made to facilitate access to the battery or means of charging (e.g., either by removing the accessory from the firearm entirely, removing the battery from the accessory, or connecting a charging cable to the accessory). Moreover, providing readily accessible charging sockets and/or battery compartments can compromise an accessory's resistance to water, dust, and debris. Additionally, frequent removal and reattachment of the accessory to the firearm is inconvenient and a source of increased wear and fragility.

There is a need for devices and systems that facilitate charging of a wide variety of firearm electronics that avoid or minimize these drawbacks. Disclosed herein are embodiments of an invention that address those needs.

Serious incidents for security and law enforcement personnel often involve use or anticipated use of a firearm, which may be initiated by an operator removing a firearm or other implement from a mount (e.g., a holster), and thus it may be helpful to enable real-time communication of such events. The ability to communicate, in real-time, whether an operator has drawn the operator's weapon or other implements has many important applications. For example, real-time communication of an unholstering event may help to keep a command center or supervisor apprised of the status of activities in the field. Such communication may also be useful for a team of operators to stay on top of a coordinated operation, particularly in situations where the team members are unable to speak (e.g., they may be wearing gas masks, staying hidden, or are out-of-earshot) or unable to directly observe what other team members are doing.

Systems involving detecting unholstering have been contemplated—for example, U.S. Pat. Pub. No. 2015/0256990 A1 to Vilrokx et al., describes a system for processing incoming messages from a "smart holster." The smart holster detects unholstering of a weapon using a pressure sensor (or alternatively, a contact switch). A predictive model is used to process the incoming wireless signals to generate real-time alerts, which alerts are in turn sent to the wireless-enabled holster. The system includes a rule server configured to query a database to retrieve one or more rules, and to apply the one or more rules over the incoming wireless signals. However, this system has drawbacks—for example, it doesn't teach or suggest techniques for detecting unholstering other than use of a pressure sensor or a contact switch. Additionally, it does not suggest coordination of sensor devices using a hub device, such as a mobile device, or local communication between sensor devices worn by separate operators, or pre-loading rules for controlling alerting and other outcomes at the smart holster or a hub device, which would permit faster reaction time and would allow a team to share communications even in the absence of a communication/data connection to a remote server or command center.

Drawbacks that are particularly relevant to contact-related unholstering detection techniques relate to the fact that contact-related sensors as taught in Vilrokx et al. would typically be positioned inside the holster (such as the pressure sensor 114(2)) or at a latch of the holster (such as contact switch sensor 114(3)). This design may have dangerous consequences: If dislodged or damaged, the components of the mechanism could cause items, parts, or debris within the holster to impede drawing a firearm, or possibly enter a trigger guard area, leading to a discharge event.

Detecting and interpreting of the status of weapons, and associated equipment, as might be found on the belt or in the vehicle of a police officer or security guard or soldier, presents unique challenges which this invention addresses. For example, embodiments of the invention described below enable real-time monitoring of drawing a weapon or other mounted implement both locally by a team, as well as remotely, by, for example, a command center. Embodiments of the invention additionally provide for holster sensor devices that do not interfere with a holster or require permanent modification of a holster to function, to facilitate installation and compatibility with existing equipment.

In some circumstances, a firearm has been discharged, but the person who operated the firearm is unknown. For example, an identified firearm may have been used to injure a person or to cause property damage, but there are no witnesses to the event. In some cases, a person may be accused of firing the weapon, but the accused person disputes this. In such circumstances, it would be advantageous to have a way to identify whether a candidate operator is likely to have fired the weapon, or to exclude the candidate operator.

There is a need for devices and systems, including firearm telematics sensor devices, that facilitate such an identification. Disclosed herein are embodiments of an invention that address those needs.

Firearm safety is a topic of political and societal debate in the United States. Prior efforts to improve the safety of handheld firearms have included devices such as manual safeties, decockers, drop safeties, safety notches, firing pin blocks, hammer blocks, magazine disconnects, trigger guards, fingerprint sensors, loaded chamber indicators and even radio controlled proximity activation devices which permit operation of the firearm only when it is within range of a fob or similar device. While these devices offer varying degrees of physical safety, none are concerned with defining an area within and for which a firearm may be enabled or disabled from operation or with notifying an owner of an attempt to access, move or operate the owner's firearm. Further, no existing solutions communicatively couple a firearm to its owner via a wireless telecommunications network and a machine-to-machine ("M2M") component located within the firearm so as to control a firearm safety mechanism or its equivalent. Nor do any existing solutions establish a network-based (e.g., cloud-based) rule-set through which a firearm owner can establish and/or customize firearm control variables, such as a default trigger safety status. Further, no existing solutions enable a firearm owner to be provided with location, movement, and/or similar information regarding the location and/or status of the firearm (e.g., via a wireless communication network) and further enable the owner to disable the firearm via a user interface of a wireless device (e.g., mobile phone) applet.

BRIEF DESCRIPTION OF THE DRAWINGS

The aspects and advantages of the invention will become more apparent upon consideration of the following detailed description, taken in conjunction with the accompanying drawings, in which like reference characters refer to like parts throughout, and in which.

DETAILED DESCRIPTION

Figure 1:
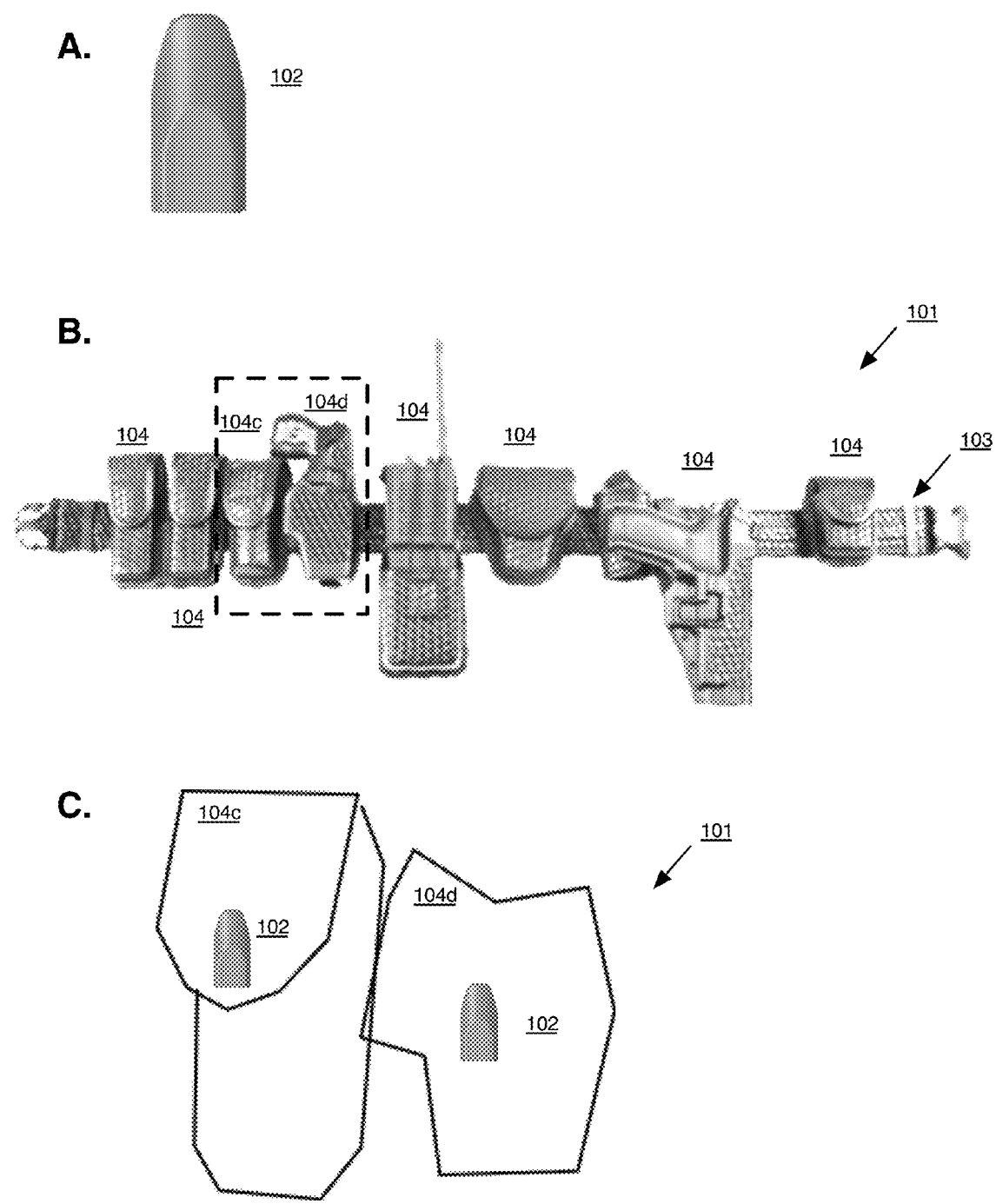
FIG. 1 shows views of exemplary holster telematics sensor devices, in accordance with some embodiments of the invention.

Disclosed herein are devices/apparatuses, systems, methods, and machine readable media for implementing and using an improved service for controlling a camera. Embodiments of the present invention provide a firearm equipped with certain specialized electronic circuitry, hereafter referred to as a telematics sensor device. In certain embodiments, the telematics sensor device detects when a firearm is in motion, is being discharged (fired), and, in the case of handguns, the firearm's position within its holster.

Disclosed herein are devices/apparatuses, systems, methods, and machine readable media for implementing and using a system for identifying an individual who discharged a firearm, and for recording, assessing, identifying, and transmitting information related to the firing of a firearm. More specifically, the present invention relates to firearm telemetry, and in certain embodiments includes assessing the predictive nature of a trigger-pull and associated activities, which are unique to individual users when firing a weapon. In certain embodiments, using the techniques described herein, it is possible to uniquely identify the individual that fired a firearm. Systems configured according to embodiments of the present invention may thus find application in the forensic analysis of firearm discharges.

Disclosed herein are systems, and methods for implementing a device and service for monitoring the status of an implement on a mount. Embodiments of the present invention provide a mount, such as a holster, equipped with certain specialized electronic circuitry, hereafter referred to as a telematics device. In certain embodiments, the telematics device detects when a firearm or other implement is present or absent from a mount.

Disclosed herein are devices/apparatuses, systems, methods, and machine readable media for implementing and using an improved mechanism for providing power to electronic circuitry within a firearm. Embodiments of the present invention provide a charging unit for a firearm, such as a semi-automatic handgun or rifle, shaped to resemble the form of an ammunition magazine or clip for the firearm. As the shape of an ammunition magazine or clip varies between specific firearms, so too can the charging unit be shaped for individual makes and models of firearms.

The charging device may be shaped to resemble an ammunition magazine. This form facilitates a simple and secure connection to the firearm by repurposing magazine attachment mechanisms already present on or within the firearm. The charging device may be inserted into the firearm while it is not in use, providing power to the firearm's electronics and/or batteries thereof. The charging unit is then removed, leaving the firearm mechanically unchanged and ready for normal operation and use.

As used herein, a "firearm" refers to a ranged weapon, including a handgun, rifle, Taser®, Conducted Electrical Weapon (CEW), or additional types of weapons capable of firing a bullet. Certain embodiments of the disclosure may be specifically adapted for one or more of handguns, rifles, or Tasers. Examples of nonlethal weapons include CEWs and batons. Examples of lethal weapons include handguns and rifles.

As used herein, a "firearm accessory device" refers to an electronic device requiring power that is mounted on or within a firearm. In certain embodiments, firearm accessories may be a telematics sensor device, a laser sight, a fingerprint sensor, a pressure sensor, a taclight (tactical light), a tactical laser, an electronic scope, an onboard computer, sensor arrays, and the like.

As used herein, a "charging device" refers to a removable charging unit for delivering electrical power to a firearm accessory.

As used herein, a "camera" refers to a device comprising electrical and optical components for recording still images, video, and/or audio by imaging light from the visual spectrum, infrared spectrum, and/or other spectra. A "body camera" refers to a camera that is worn by a user.

As used herein, a "telematics sensor device" or "telematics device" refers to a device for detecting and/or recording information derived from the environment of the device, and where the device has two-way wireless communications capability.

As used herein, a "mount" refers to a structure for holding a firearm or other implement. A mount may include a holster, gun rack (e.g., for longarm weapons), vest, or flak jacket.

As used herein, "real time" means information that is updated at least once every five seconds.

As used herein, "off-the-shelf" means a product not specifically designed to accommodate or work with a telematics device—for example, a stock weapon holster or mount with neither means for attaching nor otherwise accommodating a telematics device.

In certain embodiments, the telematics sensor device is equipped with a wireless transceiver. In some embodiments, the transceiver communicates directly with a body camera; in others it communicates indirectly, via an intermediary device, or devices, and one or more network topologies. One embodiment includes the telematics sensor device communicating with a smartphone, which relays the telematics sensor device's messages via wide-area or personal-area networks, which in turn connect with and relay the telematics sensor device's messages to the body camera.

In certain embodiments, unholstering of a firearm (as detected by a telematics sensor device) initiates recording of video by a body camera. That is, when the firearm is unholstered, the sensor device detects the event and signals the body camera (either directly or indirectly) to power up (or wake from standby) and begin recording video information. The recording may be saved locally and/or may be transmitted to a remote facility where it is stored.

In certain embodiments, unholstering of a firearm (as detected by a holster telematics sensor device) "wakes up" a firearm telematics sensor device from standby or low-power mode, and causes the firearm telematics sensor device to switch over to an active state, and may initiate detection or recording of data (including, for example, inertial measurements) by a firearm telematics sensor device. The recording may be saved locally at the firearm telematics sensor device and/or may be transmitted to another device where it is stored.

Telematics devices may operate in various power/activity states, for example, in order to conserve battery life. For example, telematics devices may have an "off" state with no function, and a low power or "sleep" state, in which only limited function is available, such as the function of receiving an instruction to wake to transition to an active state. Telematics devices may have full functionality in an active state. Telematics devices may have additional intermediate states in which only certain functions are active, for example some sensing functions but not others, or some communications functions but not others.

In some embodiments, the body camera is able to record additional, non-video metadata as part of its functionality. The telematics sensor device and/or associated software may discover and detect when a camera possesses such capabilities. Upon detection, the telematics sensor device may provide additional metadata and other data to the body camera for storage with its video recording. Examples of such data may include: time, date, event identifiers, location coordinates, altitude, temperature, ammunition discharged, ammunition remaining, ammunition reloads, firearm orientation, firearm movement, firearm translation, firearm bearing, recorded audio in front of and around the firearm, and recorded video in front of and around the firearm.

Firearm telemetry is a new field of forensic analysis. Sensor circuitry may be embedded within a firearm such that the presence of the circuitry is transparent to (i.e., does not interfere with) the normal operation of the firearm but which is configured to transmit data concerning the operation of the firearm in real-time to a command or dispatch center for real time mapping, observation of certain, perhaps mission-critical, events, (e.g., un-holstering, direction of aim, and firing), and other applications.

Using firearm telematics sensor devices embedded within firearms to capture and relay information concerning the firing event and through subsequent scrutiny of that information, in some embodiments, by analyzing the information (represented in the form of a three-axis waveform) one can uniquely determine the identity of the individual that fired the firearm. That is, the present inventors have determined that each individual firing the same firearm under similar circumstances does so in a manner that creates a unique data signature associated with the predictive nature of the individual's trigger pull. For example, just before firing, an individual's trigger finger begins to move very slightly in a tensing fashion in preparation for (or anticipation of) the firearm's recoil. How each person's trigger finger squeezes the trigger and then relaxes is also unique, and can be recorded and relayed as a firearm sensor device data transmission. This trigger-pull "finger print," if you will, can be stored in a database for subsequent use, e.g., comparison with an unknown trigger pull finger print as part of a forensic investigation.

Disclosed are new methods and systems for remote detection of, for example, any belt holstered asset and its un-holstering and re-holstering. For example, consider the belted and holstered assets of a law enforcement officer, military personnel, or security guard. Such belt holster assets might include implements including firearms (e.g., ranged weapons, including handguns, rifles, and CEWs), ammunition-related implements such as ammunition clips, magazines, or cartridges for said firearms as well as pepper spray, flashlights, radios, cell phones, night sticks, or handcuffs. Some of these assets are removed or un-holstered for use only in unusual and potentially critical situations, else they are left in-place or holstered.

In one aspect, a monitoring service may include a sensor-based wireless communication device, e.g., a telematics device, so that un-holstering (or holstering) of a belted asset triggers wireless real-time wireless communication and/or notification of the un-holstering event to a remote command or dispatch center, or the like. The purpose of notification may be to enable informed command center decisions relative to the un-holstering event occurring in the field. The decisions might be to come to the immediate aid and assistance to the field personnel, thereby saving lives. Without a telematics device and monitoring service, command and dispatch may remain unaware of a mission critical event unfolding in the field during the most important timeframe, as radio communication may not be possible when personnel are busy and focused on the unfolding event, perhaps with two hands on their firearm or another asset/implement.

In certain embodiments, the telematics device is self-contained, self-powered, and logically connected, via wired or wireless means, to a listening device (e.g., a hub/mobile device, or a server). Further, in certain embodiments, the telematics device may support various methods for replenishing its power source, for example, direct cable or contact charging, inductive wireless charging, or harvesting the motion energy of an operator while deployed. In some embodiments, the telematics device is of 'universal design': capable of detecting a firearm or other weapon regardless of make and model, and independent of the cavity or container or holster used to house said weapon. In other embodiments, the telematics device may be optimized to the specifics of a weapon or container; for instance, optimizing for size and mechanical characteristics of specific cavities or containers or holsters.

The telematics device is mechanically sound. Some embodiments feature a hardened design, by means of remaining within the confines of the outer shape of the mount (e.g., container or pouch or holster). Some versions fully encapsulate their electronics within a moisture-proof and water-proof over-molded enclosure.

In certain embodiments, the apparatus is not internal to the cavity or container or holster or pouch, and thereby does not impede or endanger normal operation of the cavity or container or holster or pouch.

The apparatus makes use of a plurality of means of detection. These may be used alone or in combination, generically or in response to specific combinations of weapons and container.

In certain embodiments, the telematics device is equipped with a wireless transceiver. One embodiment includes the telematics device communicating with a smartphone, which relays the telematics sensor device's messages via wide-area or personal-area networks, which in turn connect with and relay the telematics sensor device's messages to other client devices (including mobile clients) and remote servers.

FIG. 1 shows views of exemplary holster telematics sensor devices 102, e.g., for mounting on a mount. FIG. 1A shows an isolated exemplary holster telematics sensor device 102. FIG. 1B shows components of an exemplary system 101 that makes use of holster telematics sensor devices 102. System 101 includes a utility belt 103 with attached holsters 104. Each of holsters 104 may incorporate a holster telematics sensor device 102, for use in detecting when an instrument, such as a firearm, pepper spray, baton, handcuffs, or a radio, is present or absent from the respective holster 104. As shown in FIG. 1C, for example, holsters 104c and 104d from system 101 may each be associated with a respective holster sensor device 102. A holster sensor device 102 may be attached to a flap of holster 104, or may be attached to the exterior of holster 104, or may be integrated between or within the materials of holster 104. In certain embodiments, the telematics device 102 may be mounted on other types of mounts, such as a gun rack, vest, or flak jacket.

Figure 2:
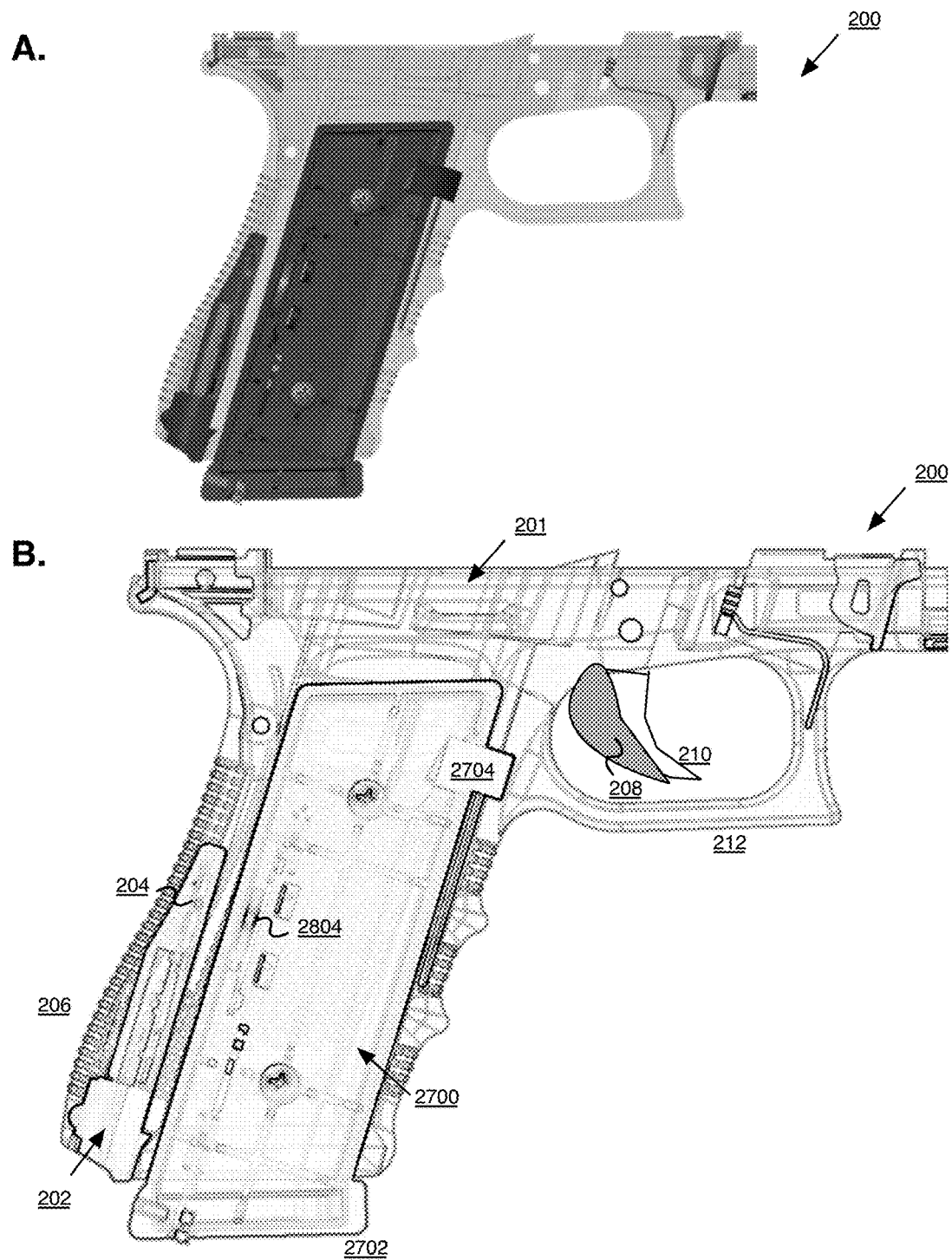
FIG. 2 shows views of a system containing an exemplary firearm telematics sensor device and a charging device, in accordance with some embodiments of the invention.

FIG. 2 shows side profile views of an exemplary system 200 including a handgun 201, a firearm accessory device (e.g., exemplary firearm telematics sensor device 202), and a charging device 2700. Firearm telematics sensor devices may be associated with a firearm, for example, through attachment to a firearm, or they may be integrated within the firearm. In certain embodiments, more than one firearm telematics sensor device may be associated with the same firearm, and may be measuring different types of data or aspects of the environment. As shown in View 2B, firearm telematics sensor device 202 may be integrated into the grip 206 of a handgun 201. In certain embodiments, firearm telematics sensor device 202 may be mounted to the slide or sight, or the trigger guide 212 of handgun 201. In certain embodiments, firearm telematics sensor device 202 may be charged by a charging device 2700 that may be inserted into the magazine chamber of handgun 201. In certain embodiments, a firearm telematics sensor device 202 may be used to detect, for example, one or more of: ambient temperature; firearm movement, translation, and bearing; and events such as discharge of a weapon (e.g., firing a bullet) and holstering or unholstering of the firearm.

Upon removal of a magazine or clip from a firearm, the charging device 2700 may be inserted into the empty magazine chamber as shown in FIG. 2. A protrusion (e.g., a lip) at base 2702 of device 2700 forms a tight coupling with the opening to the handgun 201 magazine chamber. Upon insertion, the charging device 2700 may be secured within the magazine chamber using the same means by which an actual ammunition magazine or clip is secured (e.g., notch 2704 that may interact with a spring-loaded magazine catch). In certain embodiments, the device 2700 is secured within the magazine chamber using an after-market catch or latch, or by placing the firearm onto a mount supporting the device 2700. FIG. 2 shows an exemplary firearm accessory device (e.g., a firearm telematics sensor device 202 that is attached to handgun 201 through insertion into an existing cavity within grip 206, by comprising a grip replacement for a firearm, or by attachment to or integration within a backstrap replacement for a firearm). Exemplary accessory device/telematics sensor device 202 contains a power receiving coil 204 that is positioned proximal to and parallel to inductive charging coil 2804 of charging device 2700. In certain embodiments, the entire housing 2706, or just the portion of housing 2706 between coils 2804 and 204 may be formed from plastic or another low dielectric material to facilitate transmission of current between the coils. In certain embodiments, the portion of housing 2706 between the coils may be thinner than other portions of the housing 2706.

In certain embodiments, the charging coil 2804 or receiving coil 204 may be stacked with one or more layers of windings. In certain embodiments, the coil is formed from copper, silver, or gold. In certain embodiments, the coil windings of coil 2804 and coil 204 may range from 17 to 27 winds, for example, 22 winds. In certain embodiments, the gauge of the wire in coil 2804 and coil 204 may range from 28-32 gauge, for example, 30 gauge or 0.266 mm. In certain embodiments, the inductive charging coil is formed using integrated traces upon a printed circuit board.

In certain embodiments, the charging device 2700 may detect when it has been inserted into a firearm and initiate operation. For example, charging device 2700 may automatically start to charge a firearm accessory upon insertion. In certain embodiments, insertion of the device 2700 may cause a switch to be physically flipped, causing device 2700 to activate. In certain embodiments, the charging device 2700 will activate (e.g., begin charging an accessory 2902) in response to a manually triggered event or control. For example, in certain embodiments, base 2702 contains a switch that may used to activate charging when switched on. In certain embodiments, device 2700 may receive a signal from a mobile device or a server instructing device 2700 to activate. In certain embodiments, device 2700 may detect that it is within close proximity to an accessory device 2902 (e.g., with detection based on radio frequency identification (RFID), Near Field Communication (NFC), Bluetooth Low Energy (BLE) or iBeacon™ protocols between the device 2700 and accessory device 2902), and may activate accordingly.

In certain embodiments, charging device 2700 may automatically power down or stop charging when the accessory device 2902 is fully charged in order to facilitate thermal management and avoid overheating. In certain embodiments, charging device 2700 may incorporate a heat sink.

In certain embodiments, charging device 2700 may be used to power two or more accessory devices 302 either simultaneously or in parallel. For example, charging device 2700 may inductively power one or more accessory devices and additionally support lines out from device 2700 to power/charge additional accessory devices 2902.

In certain embodiments, upon insertion of charging device 2700, the firing mechanism of the firearm is disabled. In certain embodiments, the firing mechanism of the firearm is disabled only during active charging. For example, handgun 201 may include a trigger 208 and trigger safety 210, such that in normal operation, a finger is inserted into the trigger guard 212 and used to pull trigger 208 to fire a bullet from the handgun. In certain embodiments, device 2700 may physically interfere with the firing mechanism when mounted on or within a firearm. For example, in certain embodiments, device 2700 may include a protrusion on or near the distal end 2708 that interferes with the movement of the trigger mechanism of the firearm once it is secured in place, or as it is being inserted into a magazine cavity. In certain embodiments, device 2700 may include an extending structure that arrests trigger bar movement. Such a mechanism may prevent or reduce accidental discharge of the firearm during handling of the firearm, and/or while charging.

In certain embodiments, electricity is supplied to the charging device 2700 by means of a socket, plug, or wire connection at a location on the charging device which remains exposed when inserted into a firearm (e.g., port 2703). In some embodiments, the charging device 2700 may accept electrical power in the form of alternating current (AC) and convert this current as required by means of an embedded AC to direct current (DC) conversion circuit. In certain embodiments, the device 2700 will accept power from an already-converted DC power source. Some embodiments may make use of common power and plug standards, such as the USB power specification and connector. In certain embodiments, the charging device 2700 may receive power from a solar panel.

Figure 28:
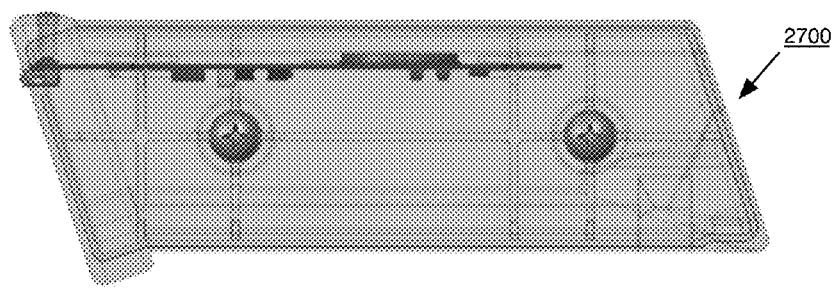
FIG. 28 shows views of a charging device, in accordance with some embodiments of the invention.
Figure 28:
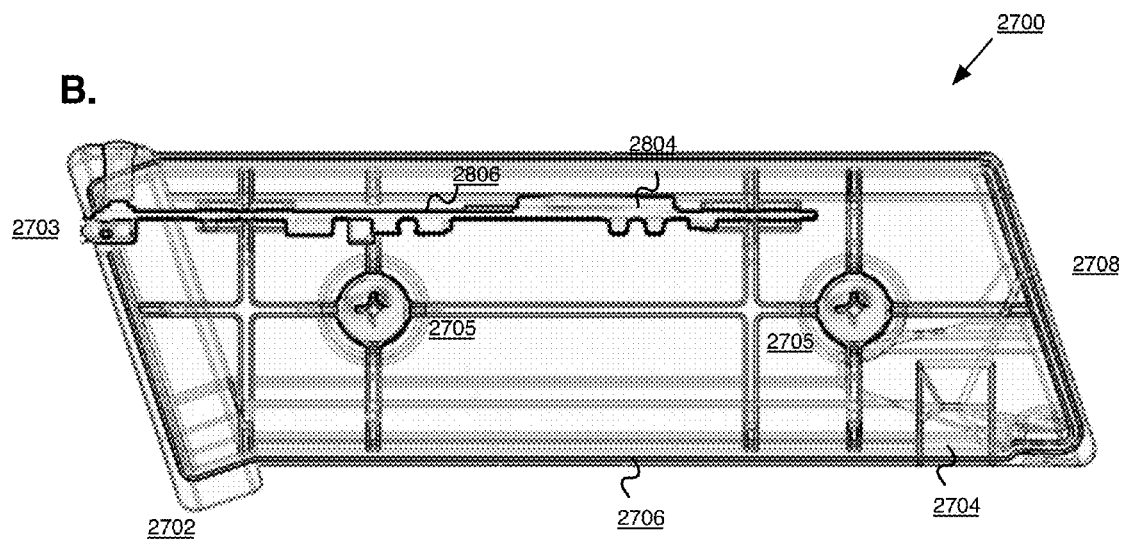

In certain embodiments, the charging unit supplies electrical power to batteries and/or electronics in or attached to a firearm, such as a firearm accessory. In some embodiments, power is provided to the circuitry by means of direct connection, such as metal leads or contacts in direct physical proximity to similar contacts within the firearm, to form a closed circuit. In other embodiments, the charging device 2700 may provide power by means of wireless transmission. For example, as shown in FIGS. 2 and 28, an exemplary handgun variant of the charging device 2700 is portrayed with an inductive charging coil 2804 that functions as a power transmitting antenna. In certain embodiments, when supplied with power, the charging device 2700 activates its circuitry (e.g. companion circuitry 2806) and transmits power via charging coil 2804. As depicted in FIG. 2, an exemplary electronic firearm accessory is able to receive power from the charging device 2700 by way of its own power receiving coil 204. In certain embodiments, charging device 2700 includes a rechargeable battery, and the battery of device 2700 may be charged separately from the accessory, and then later device 2700 may be inserted into a firearm to supply power to the accessory using the charge in the rechargeable battery.

In certain embodiments, the system may be used to charge an accessory overnight. In certain embodiments, the system may be used to charge the battery of an accessory within 8 hours, within 6 hours, within 4 hours, within 2 hours, within 1 hour, or within 30 minutes.

Figure 3:
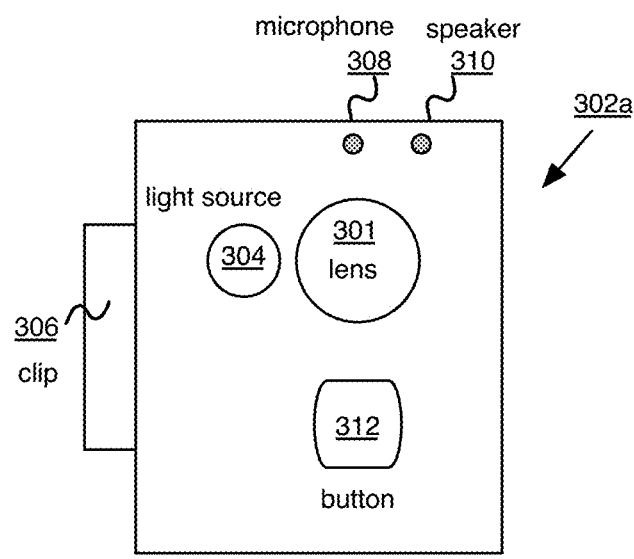
FIG. 3 shows exemplary cameras, in accordance with some embodiments of the invention.
Figure 3:
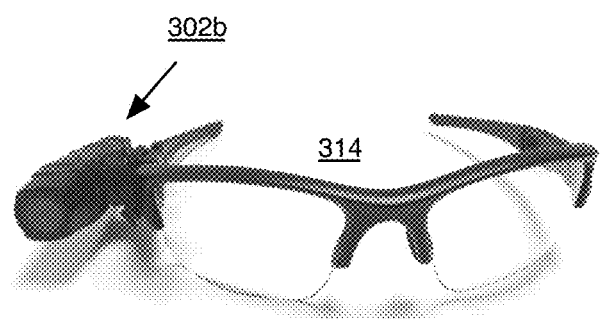

FIG. 3 shows exemplary cameras for use in a service of the invention. FIG. 3A shows a camera 302*a* that includes a lens 301 that may be covered by a lens cover that is transparent or is remotely controlled; one or more light sources 304, e.g., a light-emitting diode (LED), that may provide a flash or infrared illumination for night vision. Camera 302*a* may include a clip 306 for attaching the camera to a vest, lapel, or epaulet. In certain embodiments, the camera 302 is worn on a lanyard or strapped to the body of a user such as a police officer or security personnel. Camera 302*a* may include a microphone 308 for recording audio, and a speaker 310 for playing audio or providing audio feedback. Camera 302*a* may further include one or more buttons 312, or switches, or other user interface elements for directly controlling the camera's operation, such as for starting or stopping a recording. FIG. 3B shows a camera 302*b* mounted to glasses 314. In certain embodiments, a user may wear more than one camera 302 (such as both chest-mounted camera 302*a* and glasses-mounted camera 302*b*) that are all controlled by embodiments of the system described herein.

Figure 4:
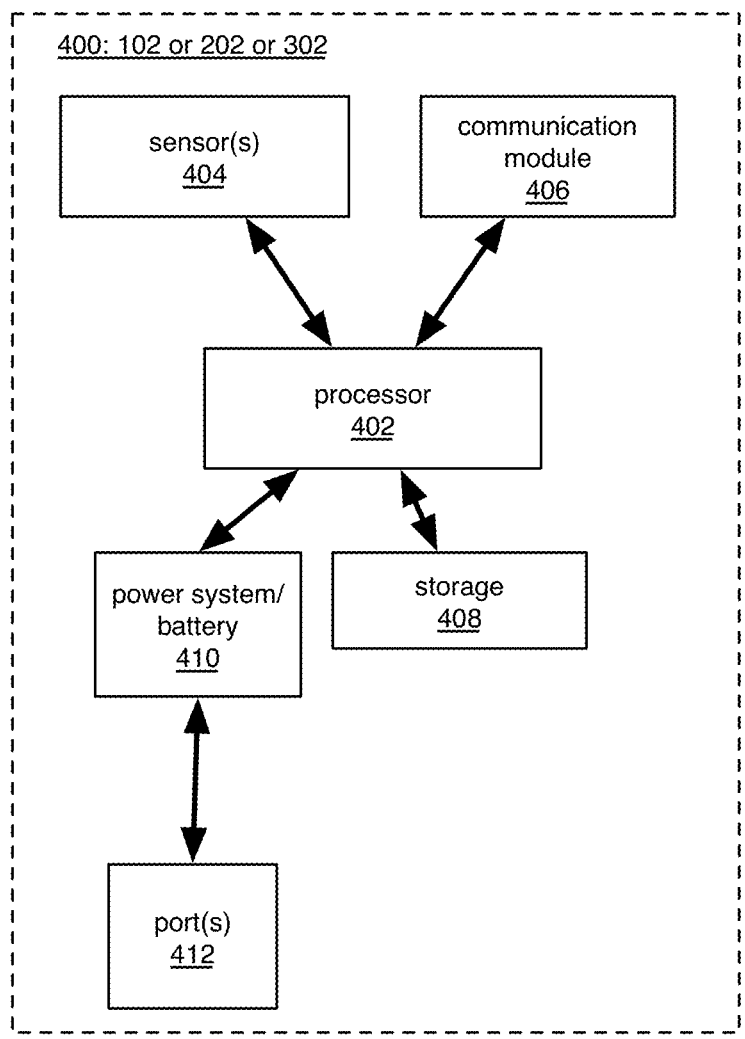
FIG. 4 shows a block diagram of a device that may embody a telematics sensor device or a camera, in accordance with some embodiments of the invention.

FIG. 4 shows a block diagram of a device 400 that may embody a telematics sensor device (e.g., holster telematics sensor device 102 or firearm telematics sensor device 202) or a camera 302. Device 400 includes a processor 402 that may be in communication with one or more sensors 404, a communication module 406, a storage component 408, and a power system and/or battery 410. The power system/battery 410 may be in communication with one or more port(s) 412.

Device 400 may include one or more sensors 404—e.g., a temperature sensor for monitoring thermal load or ambient temperature, an accelerometer, a magnetometer, a gyroscope, a metal sensor (e.g., pulse induction sensor components), optical/light sensor, microphone, etc. Communication module 406 may include a subscriber identity module (SIM) card, cellular radio, Bluetooth radio, ZigBee radio, Near Field Communication (NFC) radio, wireless local area network (WLAN) radio, GPS receiver, and antennas used by each for communicating data over various networks. Storage 408 may include one or more types of computer readable medium, such as RAM, optical storage devices, or flash memory, and may store an operating system, applications, and communication procedures. The power system/battery 410 may include a power management system, one or more power sources such as a battery and recharging system, AC, DC, a power status indicator, and the like.

Figure 5:
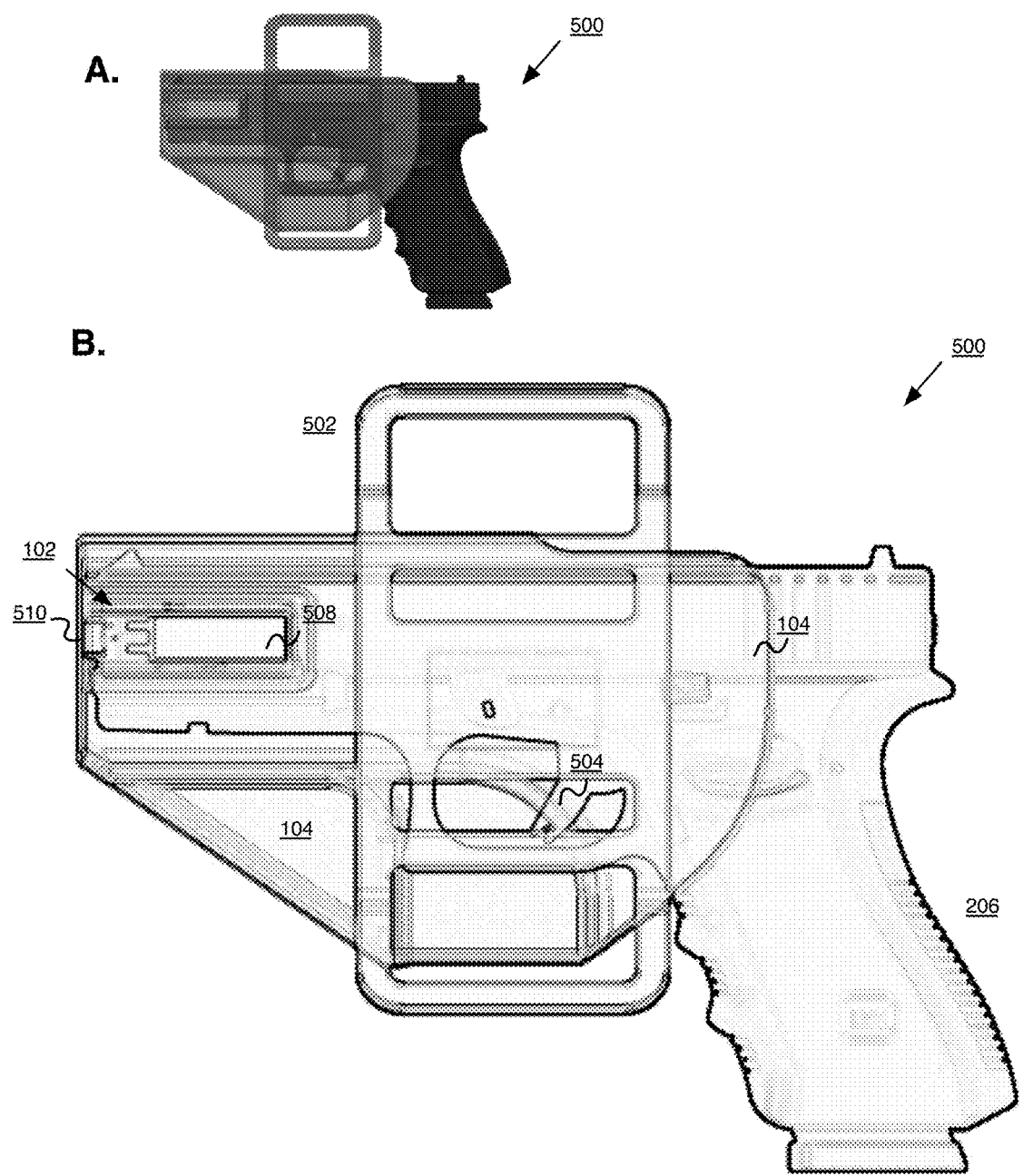
FIG. 5 shows views of an exemplary holster telematics sensor device, in accordance with some embodiments of the invention.

FIG. 5 shows views of an exemplary holster telematics sensor device system 500, including a holster telematics sensor device 102 attached to a holster 104 having a belt clip 502, and where the holster 104 is shown to contain a holstered handgun with trigger 504 and grip 206. Holster telematics sensor device 102 may include a battery 508 and a port 510. Port 510 may be, e.g., a coaxial power connector, a Universal Serial Bus (USB) port, a microUSB port, a Lightning™ port, and the like.

Figure 6:
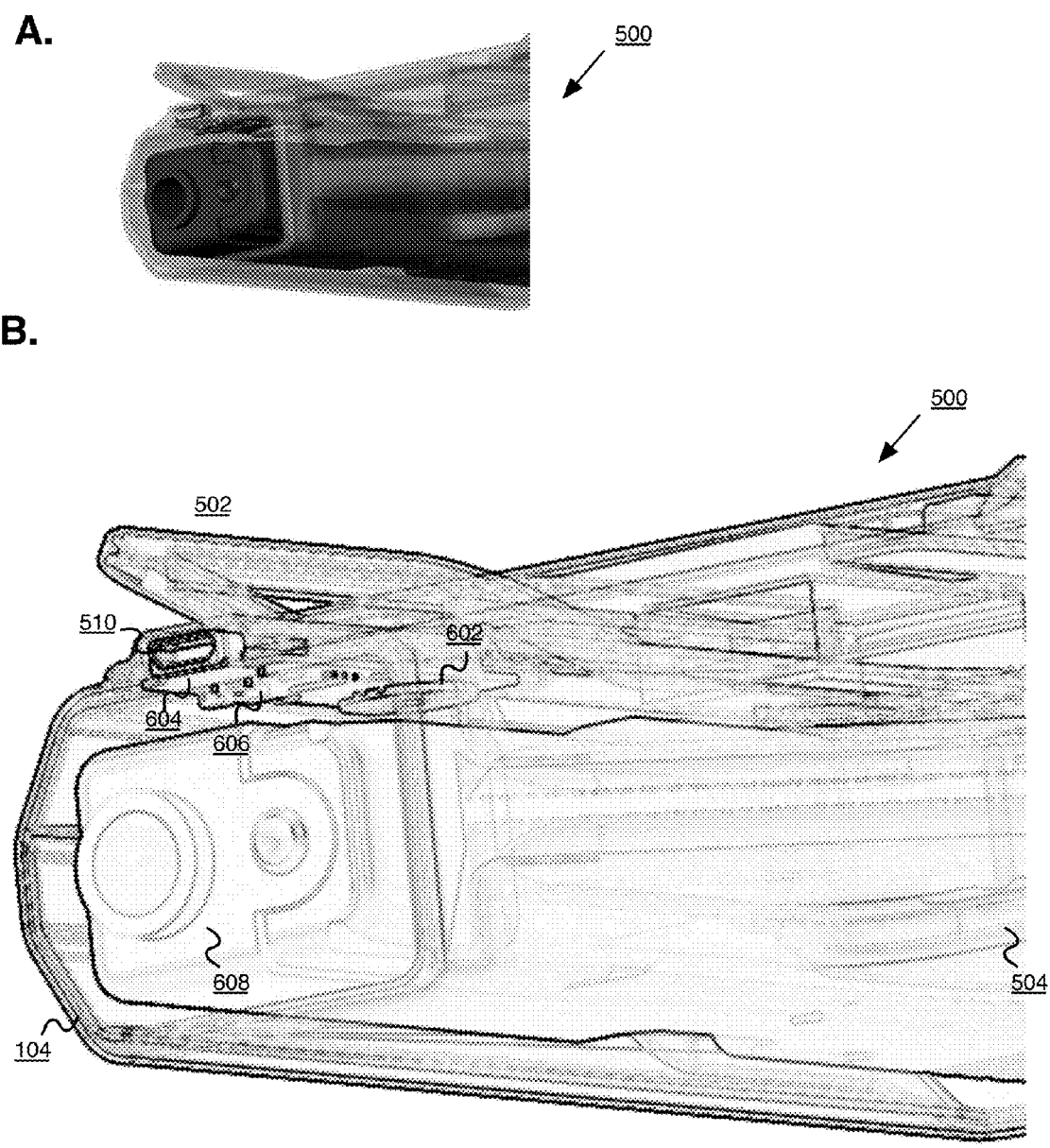
FIG. 6 shows views of an exemplary holster telematics sensor device, in accordance with some embodiments of the invention.

FIG. 6 shows views of an exemplary holster telematics sensor device system 500. FIG. 6B shows a rotated view of the system 500 shown in FIG. 5. In the embodiment shown here, holster telematics sensor device 102 includes an inductive coil 602 mounted on circuit board 604 with companion circuitry 606 for detecting the presence of a firearm based on the presence of the metal of the firearm (e.g., the receiver, muzzle 608, etc.). In other examples, holster telematics sensor device 102 may use inductive coupling, such as pulse induction or very low frequency (VLF) technology to detect whether a firearm is present based on the presence of metal, or components to measure the dielectric change when metal is present or absent, NFC to communicate between telematics sensor devices on a firearm and a holster, or a light sensor to detect whether light is absent, indicating a firearm is holstered.

In certain embodiments, a telematics device 102 may be installed at standard attachment sites on a mount, such as a holster, as described below with respect to FIGS. 24-26. Such an attachment may constitute one example of mounting a telematics device 102 on a mount. In certain other embodiments, mounting a telematics device on a mount may include integrating the telematics device within a customized or standard mount, or otherwise embedding the telematics device within the mount.

In some embodiments, the detection by telematics device 102 involves a passive radiating device, such as a magnet. Other times an active radiating device is used, such as a radio frequency transmitter. Sometimes the active radiating device is an RFID (Radio-frequency identification) element. When using a radiating device, a component is attached to the weapon or implement in question, and the proximity (distance) between the weapon/implement and the radiating device is determined.

In other embodiments an inductive coupling mechanism is used, whereby the presence or absence of metallic substance is determined.

Some embodiments employ a photo interruption mechanism (a.k.a. an "optical" method), whereby a beam of visible or invisible light is directed or reflected and its presence or absence is determined.

Still other embodiments measure for change in capacitance, also known as dielectric shift. Some embodiments track the similarities or differences in measurements reported by a chained set of accelerometers.

Certain embodiments opt for a strain gauge or a pressure gauge, while others utilize a mechanically-activated switch. Other embodiments may utilize biometric sensing mechanisms to determine the presence and arrangement of the human user of the weapon or object.

Some means of detection necessitate the use of one or more antennas. When this is the case, some embodiments will utilize antennas external and remote to the primary apparatus (i.e., telematics device 102), enabling independent placement for optimal sensing integrity. Other embodiments will integrate and house antennas within the body of the telematics device 102.

Figure 7:
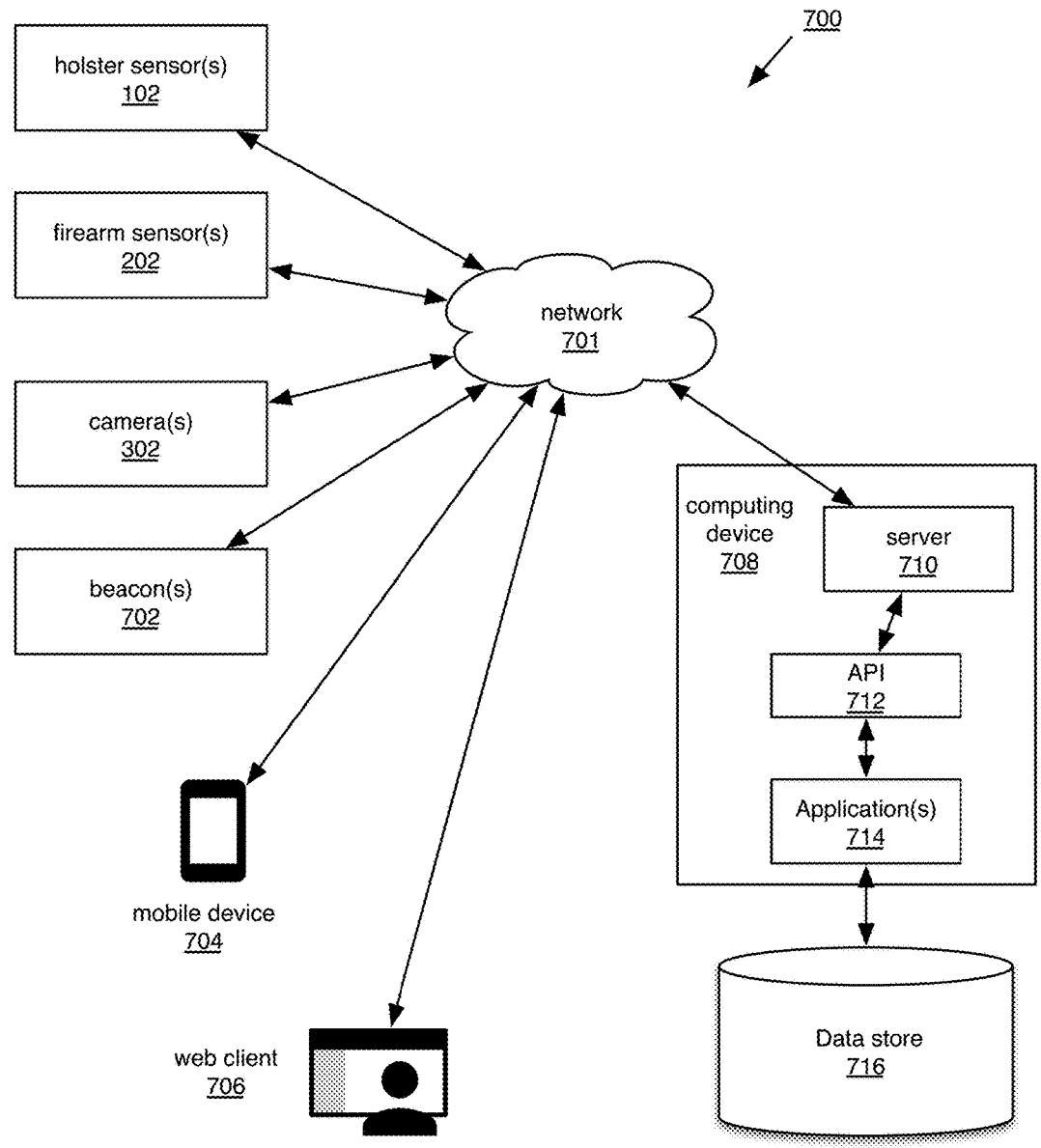
FIG. 7 is a block diagram showing exemplary data flows for an exemplary system in accordance with some embodiments of the invention.

FIG. 7 is a block diagram showing exemplary data flows for an exemplary system 700. In certain embodiments, data regarding the status of a component of system 700 and or the environment of system 700 (including, for example, a firearm and a holster) may be generated at holster telematics sensor device(s) 102, firearm telematics sensor device(s) 202, camera(s) 302, beacon 702, and/or mobile device 704. In certain embodiments, this data may be shared between components of the system (e.g., holster telematics sensor device(s) 102, firearm telematics sensor device(s) 202, camera(s) 302, beacon 702, and/or mobile device 704) on a local area network such as a Bluetooth or ZigBee even in the absence of a wireless connection providing communication with geographically remote devices (e.g., the device executing web client 706 or computing device 708 hosting server 710).

In certain embodiments, beacon(s) 702 may be proximity beacons, such as devices using the Google Eddystone™, iBeacon™, FlyBell™, and/or BLE protocols for monitoring and ranging proximity of components of the system (e.g. holster telematics sensor device(s) 102, firearm telematics sensor device(s) 202, camera(s) 302, and/or mobile device 704) with respect to one or more beacons 702. In certain embodiments, one or more beacons 702 may be positioned at a fixed location or a moving location such as a vehicle.

In certain embodiments, mobile device 704 may be a smartphone, a tablet computer, or a radio, such as a police radio, and web client 706 may be executed at a command and control center (e.g., for police, military, or security professionals). All components of the system 700 are directly or indirectly connected using a combination of communication protocols represented by network 701. Network 701 may include a LAN, wired or wireless network, private or public network, or the internet, including wireless communication protocols such as General Packet Radio Service (GPRS), Enhanced Data rates for GSM Evolution (EDGE), 3G, 4G, Long Term Evolution (LTE) protocols, and communication standards such as Project 25 (P25), Terrestrial Trunked Radio (TETRA), and satellite and/or field radio protocols.

In certain embodiments, one or more computing devices 708 hosts a server 710, such as an HTTP server, and an application 714 that implements aspects of the remote monitoring system (e.g., a situational intelligence platform). For example, status-related files and/or user account information may be stored in data store 716. Application 714 may support an Application Programming Interface (API) 712 providing external access to methods for accessing data store 716. In certain embodiments, client applications running on client devices 102, 202, 302, 702, 704, and 706 may access API 712 via server 710 using protocols such as HTTP or FTP.

Figure 8:
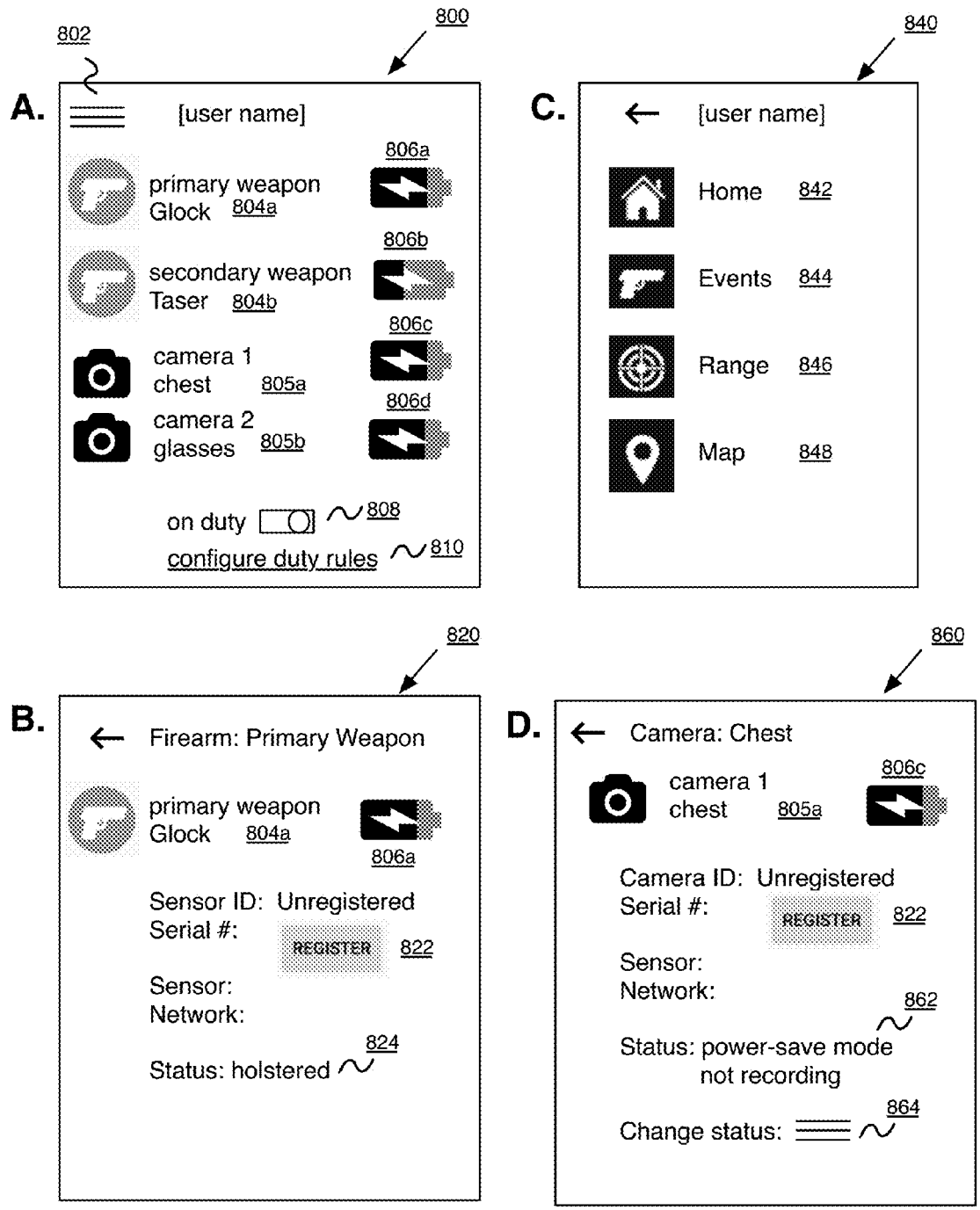
FIG. 8 shows four exemplary user interfaces for use in a system including camera control relating to firearm activity and control and display of data collection relating to firearm activity, in accordance with some embodiments of the invention.

FIG. 8 shows four exemplary user interfaces for use in a system including camera control relating to firearm activity or monitoring of implement status on a mount. FIG. 8A shows a user interface 800 displaying a list of firearms 804(*a,b*) and cameras 805(*a,b*) (e.g., representing cameras 302) available in a firearm remote monitoring system. In one embodiment of such a system, each firearm 804 is associated with a battery-powered accessory device, and the status of the battery for each device is shown using icons 806(*a-d*). Icons 806 may also be used to represent the remaining battery life for the respective cameras 302. As shown, the accessory device associated with firearm 804*a* has greater charge remaining than firearm 804*b*. In certain embodiments, user interface 800 could further display the charging status for one or more accessory devices (e.g., charging, not charging, firearm/accessory co-localized with charging device 2700 vs. separated from charging device, etc.). User interface 800 further includes an on-duty toggle 808 to control whether the system should monitor the associated firearms in "on duty mode" vs. "off duty mode". For example, a user may desire a different rule set to apply with respect to camera activation while the user is on duty vs. off duty—for example, a user may desire to have an associated camera not be activated while the user is off duty (e.g., at the shooting range) and an associated firearm is discharged, because the resulting camera footage may not be of interest. In another example, a user may desire an alert message to be provided to the user and additional recipients such as a supervisor when the firearm/accessory are separated from the charging device in "off duty mode", because this may indicate that the firearm is potentially in use but is not authorized to be in use. Embodiments of the system may be configured to generate such a message. User interface 800 may include a link to a settings menu 810 allowing the user to configure rules for on- and off-duty states. User interface 800 may further provide a drop-down menu 802 to access additional options, e.g., user interface 840 shown in FIG. 8C.

In certain embodiments, telematics device 102 may monitor/detect an implement's presence in the mount (e.g., holster 104) and may, for example, record related data in storage 408 at a frequency of: at least once every second, five times every second, or 20 times every second.

In certain embodiments, telematics device 102 may communicate the current status of the implement's presence in the mount (e.g., whether a firearm is holstered or not) to another device over network 701 at a frequency of: at least once per minute, once every 20 seconds, every five seconds, every second, or five times every second.

In certain embodiments, the system may distribute an updated rule set in real time to one or more local systems (where a local system is one or more of the following devices that may be associated with a single user: holster telematics sensor devices 102, firearm sensor devices 202, cameras 302, and mobile device 702). An updated rule set may be distributed at any time, for example, on a regular schedule or on an as-needed basis. The updated rule set may change the configuration of behavior in response to the identification of one or more types of events, or may change how an event is identified. In certain embodiments, an updated rule set may include an instruction to change the status of the camera upon receiving the updated rule set. In certain embodiments, distribution of the updated rule set may be triggered by an instruction from a remote command center (e.g., by way of web client 706 and/or server 710). In certain embodiments, an updated rule set may include an instruction to generate a notification upon receiving the updated rule set. In certain embodiments, distribution of the updated rule set may be triggered by an instruction from a remote command center (e.g., by way of web client 706 and/or server 710). For example, if a team of users is entering a dangerous area, a user at a remote command center may cause the system to distribute an updated rule set to all users of the team instructing each local system to immediately turn on all cameras 302 and ensure that if a weapon discharge is identified at any single local system of the team, a notification is provided to all other members of the team and to the remote command center. For example, if a team of users is entering a dangerous area, a user at a remote command center may cause the system to distribute an updated rule set to all users of the team instructing each local system to immediately send a notification to all users of the team and to the command center upon any unholstering event.

In certain embodiments, telematics sensor device 102 is capable of identifying one or more of the following potential states concerning unholstering: holstered; implement holstered and not being touched by operator; implement holstered and touched by operator (e.g., hand on weapon); implement partially unholstered; implement fully unholstered; implement unholstered and touched by operator (e.g., weapon drawn).

In some embodiments, selecting a particular firearm 804 (a,b) in user interface 800 may display user interface 820, shown in FIG. 8B. User interface 820 may be used to register a firearm telematics sensor device 202 upon selecting register button 822. Such an interface may be further modified to display additional information about the charging status for the firearm telematics sensor device 202 that is associated with firearm 804a and/or the corresponding charging device 2700. User interface 820 may also display additional information about a firearm and its associated system components—e.g., firearm telematics sensor device 202, charging devices, hub devices—e.g., that the current status of the firearm is "holstered" based upon the status information provided by a holster telematics sensor device 102 (824). A hub device may be a mobile device that is paired with or local to firearm telematics sensor device 202 and/or holster telematics sensor device 102, e.g., mobile device 704. For example, the information may include the location of each component plotted on a map, the serial number or ID for the components, the user associated with each component, whether/how each component is connected to a network and/or links to other UIs for displaying such information, such as the interfaces shown in FIGS. 9-10).

Figure 9:
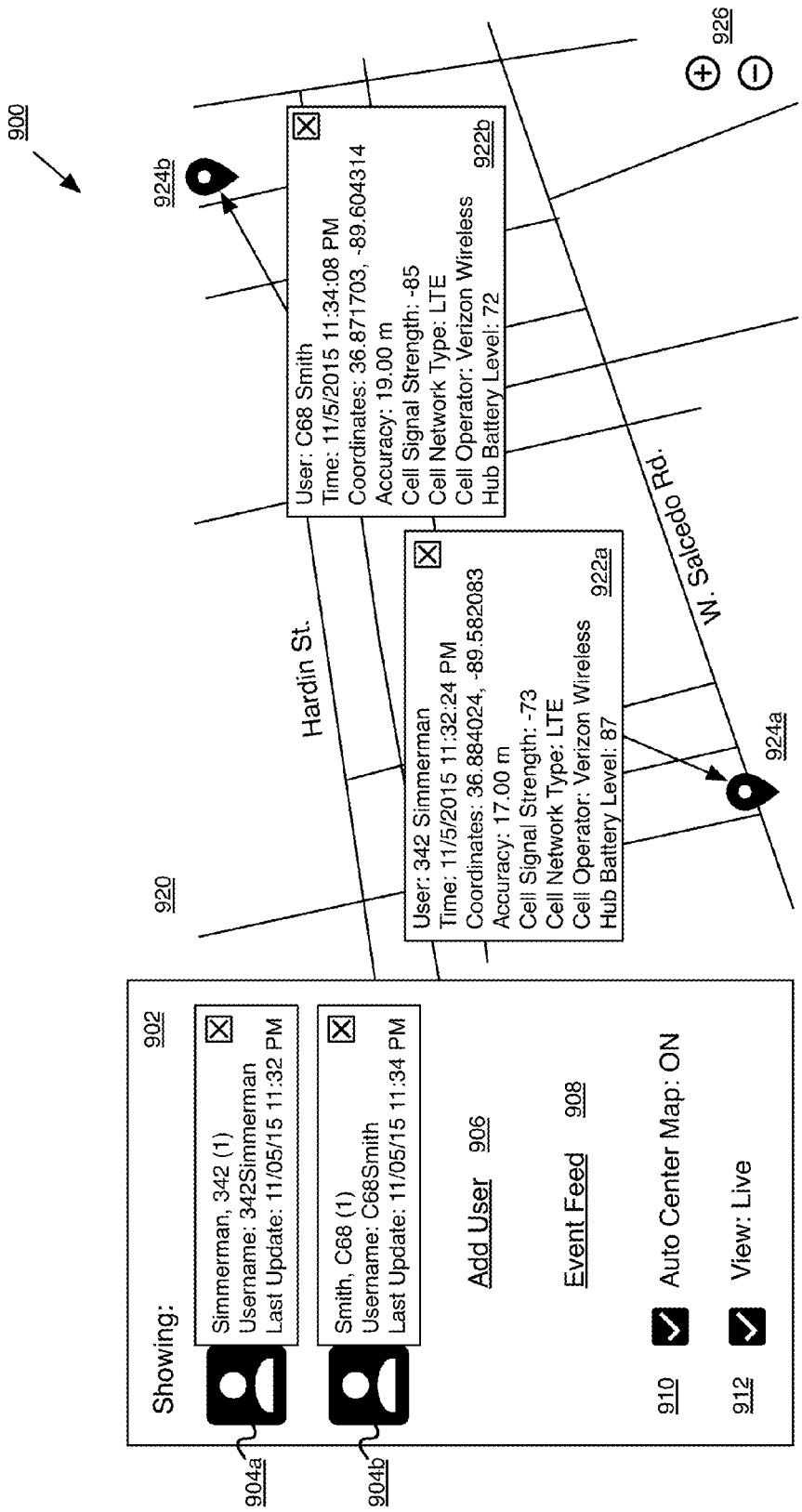
FIG. 9 shows an exemplary user interface for use in a system including camera control relating to firearm activity and control and display of data collection relating to firearm activity, in accordance with some embodiments of the invention.
Figure 10:
FIG. 10 shows an exemplary user interface for use in a system including camera control relating to firearm activity, and control and display of data collection relating to firearm activity in accordance with some embodiments of the invention.

FIG. 8C shows an exemplary user interface 840 providing access to a home link 842, an events link 844 (see, e.g., FIG. 10), a range link 846 concerning use at a gun range, and a map link 848 for accessing a display of the locations of system components (see, e.g., FIGS. 9-10).

In some embodiments, selecting a particular camera 805 (a,b) in user interface 800 may display user interface 860, shown in FIG. 8D. User interface 860 may be used to register a physical camera 302 upon selecting register button 822. User interface 860 may further display information about the status of a camera (see, e.g., status indicator 862 indicating that the camera represented by 805a is in power save mode and is not currently recording video or audio). Possible status information may include the location of the camera, camera is powered down, camera is in power save mode, active, ready to record, in infrared/night vision mode, currently recording audio and/or video, not currently recording, in playback mode, recording a firearm-related event, and the like. Menu 864 may provide a mechanism for a user to change the status of camera 302, e.g., from mobile device 704 or web client 706.

FIG. 9 shows an exemplary user interface for use in a system including camera control relating to firearm activity or monitoring of implement status on a mount. Such an interface may be used for displaying the locations of system components (e.g., a firearm and associated telematics sensor devices 102 and 202, cameras 302, and charging devices 2700). Panel 902 provides a listing of two users 904a and 904b; components associated with those users are displayed on a map in panel 920. Panel 902 further provides a link 906 to add an additional user to the display, and a link 908 to access an event feed (see FIG. 10). Toggle 910 controls a map centering option and toggle 912 controls whether the display in panel 920 updates to display live information or stops refreshing.

Map panel 920 marks the location of the components associated with the users on the map using location markers 924(a,b). The map may be stylized as shown, or may constitute a satellite photograph. A user may adjust the scale of the map using controls 926. Additional information associated with the components at each location 924 is displayed in an overlay window 922(*a,b*). For example, the overlay window 922 provides information about (1) the user associated with the component(s) at the location; (2) the time stamp associated with the information; (3) the coordinates of the location; (4) the accuracy/error estimate for the location; (5) information about the network type, strength, and operator; (6) hub device battery status. In certain embodiments, additional information about charging status or camera status could be provided as well.

FIG. 10 shows an exemplary user interface 1000 for use in a system including camera control relating to firearm activity or monitoring of implement status on a mount. User interface 1000 may be used to view an event feed (panel 1002) alongside the locations associated with each event (displayed in panel 1010, showing a satellite image for the map). Panel 1002 may display individual events 1006(*a-e*) (e.g., status change from "Weapon Holstered" to "Weapon Unholstered", or the reverse; status change from "Weapon active" to "Weapon charging", or the reverse; or simply a list of the status for each component being monitored each time it is reported by a hub device or directly from another component such as a holster telematics sensor device 102 or a charging device 2700), along with additional information such as the associated user name, a time stamp, and the event type. Events may be associated with icons 1008(*a,b*) to quickly indicate the category of event. An event feed may be manually refreshed using a control 1004—for example, in certain embodiments, this may cause the system to poll each component to report its current status, or in other embodiments, it may update the list of components being tracked and/or displayed in user interface 1000. Events or event types that could be monitored using user interface 1000 in FIG. 10 may be, for example, user exits a vehicle with a firearm, user enters a vehicle with a firearm, holstering a firearm, unholstering a firearm, holstering or unholstering a policing implement such as a radio, discharging a firearm (e.g., discharging a Taser or firing a bullet), approaching a second user of the system, a firearm is separated from the user, loud noise is detected, and receiving a notification from a second user of the system or dispatch or command.

Figure 11:
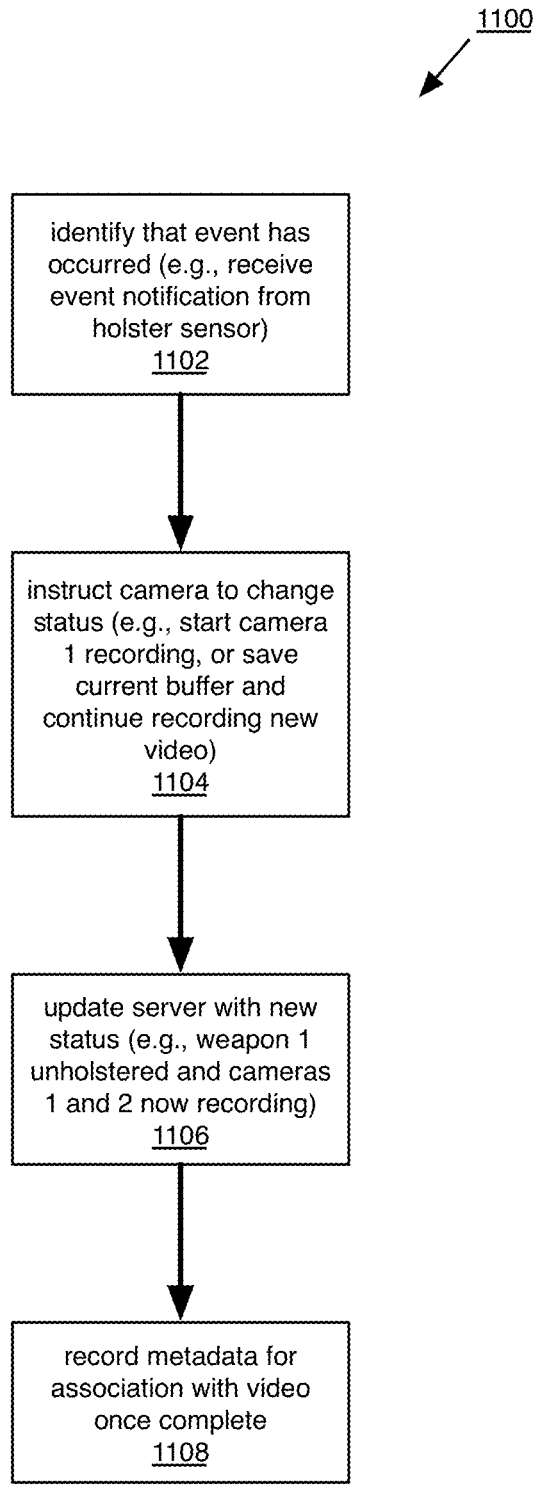
FIG. 11 is a flow chart depicting an exemplary method for controlling a camera, in accordance with some embodiments of the invention.

FIG. 11 is a flow chart depicting an exemplary process 1100 for controlling a camera. The process begins when the system has identified that a firearm-related event has occurred (1102). For example, one or more of holster telematics sensor devices 102, firearm sensor devices 202, beacons 702, or mobile device 702 may have detected an event. Events or event types that could be monitored using user interface 1000 in FIG. 10 above, or concern step 1102 in process 1100 may be, for example, user exits a vehicle with a firearm, user enters a vehicle with a firearm, holstering a firearm, unholstering a firearm, holstering or unholstering a policing implement such as a radio, discharging a firearm (e.g., discharging a Taser or firing a bullet), approaching a second user of the system, a firearm is separated from the user, loud noise is detected, and receiving a notification from a second user of the system or dispatch or command.

Additional examples regarding step 1102 may be, for example, using geofencing techniques and a beacon 702 located at a user's vehicle, when one or more of holster telematics sensor devices 102, firearm sensor devices 202, or mobile device 702 is no longer within range of the beacon 702 at the vehicle, or moves beyond a certain distance (e.g., 3, 5, 7, 10, 15 feet) from the beacon 702, the system may identify that the user has exited the vehicle (e.g., with a firearm). In another example, a holster telematics sensor device 102 may detect the event of a user unholstering the firearm. In another example, a telematics sensor device or mobile device 702 may detect the proximity of another user, causing the system to identify the event of approaching a second user of the system. In another example, dispatch or another member of the unit that the user is a member of, perhaps aware of a dangerous situation or that another user has unholstered her weapon, may cause the event of a notification having been received by the system by transmitting such a notification via a mobile device 702 or web client 706. In certain embodiments, the system may be configured to automatically provide a notification to all members of a group upon detecting an event concerning another member of the group.

In step 1104, the system may instruct one or more cameras 302 to change status in response to the event. For example, the instruction may be to turn on the camera, wake the camera, activate recording of video at the camera, mark existing video to be retained, and/or mark new video to be retained. In certain embodiments, the camera is constantly or usually recording (e.g., the camera may always be in a recording state when the user is in an on-duty status), and the old video may be periodically overwritten by newly recorded video. In such an embodiment, identification of an event (step 1102) may cause the existing video recording to be marked to be retained (e.g., prevent it from being overwritten by new video). In certain embodiments, a set buffer of recorded video is maintained by the camera 302, and identification of an event will cause the camera to save the existing buffer as well as video recorded after identification of the event. In certain embodiments, the buffer is 5, 10, 30, 60, 120, or 500 seconds. In certain embodiments, the buffer is 5, 10, or 15 minutes. In certain embodiments, the video may be saved by the camera, and in certain embodiments, the video may be streamed or transmitted to mobile device 704 or server 710. In certain embodiments, an instruction to change the status of a camera 302 may be received from mobile device 704 or computing device 708. Such a request may also be initiated by web client 706. In certain embodiments, an instruction to change the status of a camera 302 may be received by the camera from a telematics device.

In step 1106, a component of the local system (e.g., holster telematics sensor devices 102, firearm sensor devices 202, cameras 302, or mobile device 702) may notify server 710 with the updated status for the camera(s). By this step, the system enables real time, remote monitoring of events and recording of events by the camera(s). In the absence of an available connection with remote devices (e.g., computing device 708/server 710), other local users, e.g., within a unit in the same geographical area, may share updated status across the unit using personal area networks and/or local area networks. In certain embodiments, the notification may constitute or include an alert message to communicate a dangerous situation to dispatch and/or unit members. An alert may be a prominent notification displayed on, for example, a mobile device 704 or web client 706.

In step 1108, a component of the local system (e.g., holster telematics sensor devices 102, firearm sensor devices 202, cameras 302, or mobile device 702) may record various metadata for association with the event and recorded video concerning the event. In certain embodiments, metadata are constantly recorded, and by step 1108 they are associated with the event and video. In certain embodiments, one or more types of metadata commence being recorded upon identification of the event in step 1102. In certain embodiments, each category of metadata may be saved as a separate track—for example, each category of metadata may be separately associated with the video recording. In one example, for each metadata measurement, the information is associated with a start time and an end time (or a single time point) that corresponds to the time parameter for the video recorded by each camera 302. In certain embodiments, the system may provide a user interface for selecting which categories of metadata should be displayed with the video recording (e.g., using the same mechanism used for displaying subtitles). In certain embodiments, the system may provide a user interface for rendering a video file that is "watermarked" with selected categories of metadata.

Categories of metadata may include, for example, a time stamp, the category of event, the current date, coordinates for the location of one or more components of the local system, altitude, temperature, firearm orientation, firearm movement, firearm translation, and firearm bearing (e.g., N30° E). Metadata may further include the ammunition type (e.g., 0.380 ACP, 0.45 ACP), and/or the remaining ammunition (e.g., 10 of 15 rounds).

The consequence of identifying an event (e.g., the rules concerning each event, and the particulars of process 1100 and, e.g., steps 1104 and 1106) may be configured, e.g. through a user interface accessed via link 810 in user interface 800, and such configurations may be retained in data store 716 and/or mobile device 704.

Figure 12:
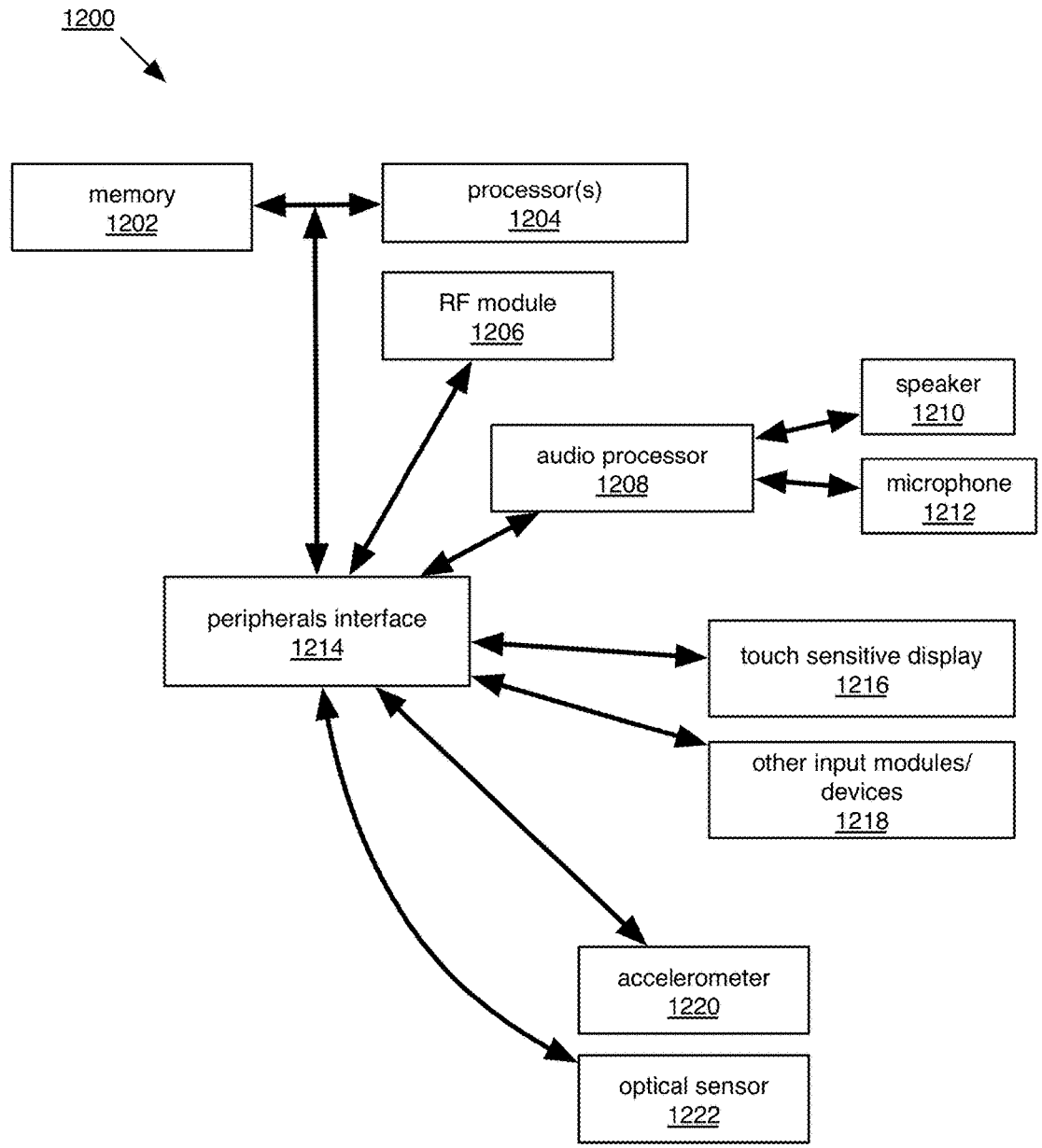
FIG. 12 is a block diagram showing an exemplary mobile computing device, consistent with some embodiments of the invention.

FIG. 12 is a block diagram showing an exemplary mobile computing device (e.g., mobile device 704). The device 1200 may have a memory 1202 which may include one or more types of computer readable medium, such as RAM, optical storage devices, or flash memory. Memory 1202 may store an operating system, applications, and communication procedures. Device 1200 may include one or more data processors, image processors, or central processing units 1204. Device 1200 may include peripherals interface 1214 coupled to RF module 1206, audio processor 1208, touch sensitive display 1216, other input modules/devices 1218, accelerometer 1220 and optical sensor 1222.

RF module 1206 may include a cellular radio, Bluetooth radio, NFC radio, WLAN radio, GPS receiver, and antennas used by each for communicating data over various networks.

Audio processor 1208 may be coupled to a speaker 1210 and microphone 1212. Touch sensitive display 1216 receives touch-based input. Other input modules or devices 1218 may include, for example, a stylus, voice recognition via microphone 1212, or an external keyboard.

Accelerometer 1220 may be capable of detecting changes in orientation of the device, or movements due to the gait of a user. Optical sensor 1222 may sense ambient light conditions, and acquire still images and video.

Figure 13:
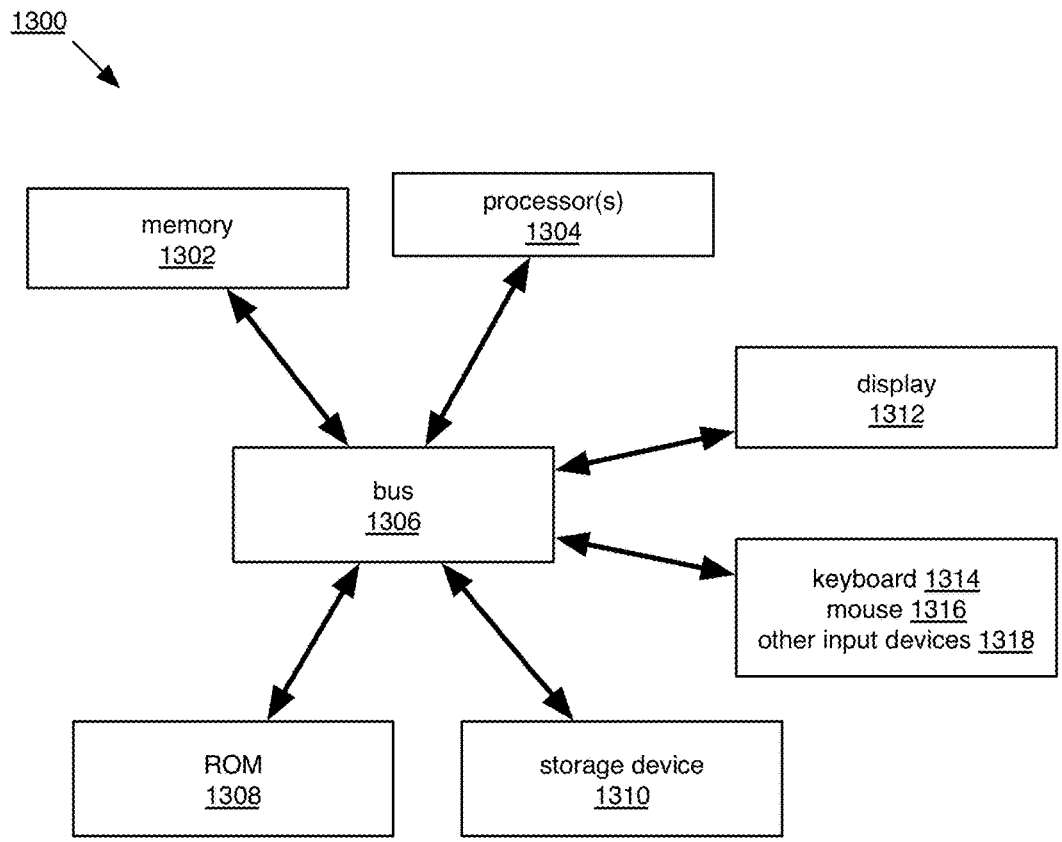
FIG. 13 is a block diagram showing an exemplary computing device, consistent with some embodiments of the invention.

FIG. 13 is a block diagram showing an exemplary computing system 1300 that is representative any of the computer systems or electronic devices discussed herein. Note, not all of the various computer systems have all of the features of system 1300. For example, systems may not include a display inasmuch as the display function may be provided by a client computer communicatively coupled to the computer system or a display function may be unnecessary.

System 1300 includes a bus 1306 or other communication mechanism for communicating information, and a processor 1304 coupled with the bus 1306 for processing information. Computer system 1300 also includes a main memory 1302, such as a random access memory or other dynamic storage device, coupled to the bus 1306 for storing information and instructions to be executed by processor 1304. Main memory 1302 also may be used for storing temporary variables or other intermediate information during execution of instructions to be executed by processor 1304.

System 1300 includes a read only memory 1308 or other static storage device coupled to the bus 1306 for storing static information and instructions for the processor 1304. A storage device 1310, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 1304 can read, is provided and coupled to the bus 1306 for storing information and instructions (e.g., operating systems, applications programs and the like).

Computer system 1300 may be coupled via the bus 1306 to a display 1312 for displaying information to a computer user. An input device such as keyboard 1314, mouse 1316, or other input devices 1318 may be coupled to the bus 1306 for communicating information and command selections to the processor 1304.

The processes referred to herein may be implemented by processor 1304 executing appropriate sequences of computer-readable instructions contained in main memory 1304. Such instructions may be read into main memory 1304 from another computer-readable medium, such as storage device 1310, and execution of the sequences of instructions contained in the main memory 1304 causes the processor 1304 to perform the associated actions. In alternative embodiments, hard-wired circuitry or firmware-controlled processing units (e.g., field programmable gate arrays) may be used in place of or in combination with processor 1304 and its associated computer software instructions to implement the invention. The computer-readable instructions may be rendered in any computer language including, without limitation, Objective C, C#, C/C++, Java, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1300 or similar electronic computing device, that manipulates and transforms data represented as physical (electronic) quantities within its registers and memories into other data similarly represented as physical quantities within its memories or registers or other such information storage, transmission or display devices.

Figure 14:
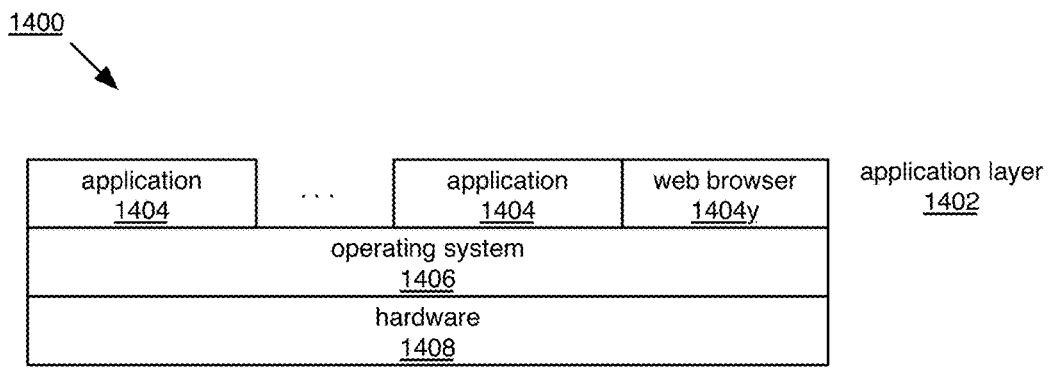
FIG. 14 is a block diagram showing an exemplary computing system, consistent with some embodiments of the invention.

FIG. 14 illustrates a computer system 1400 from the point of view of its software architecture. Computer system 1400 may be any of the electronic devices or, with appropriate applications comprising a software application layer 1402, may be a computer system for use with the monitoring system described herein. The various hardware components of computer system 1400 are represented as a hardware layer 1408. An operating system 1406 abstracts the hardware layer and acts as a host for various applications 1404, that run on computer system 1400. The operating system may host a web browser application 1404y, which may provide access for the user interfaces, etc.

Figure 15:
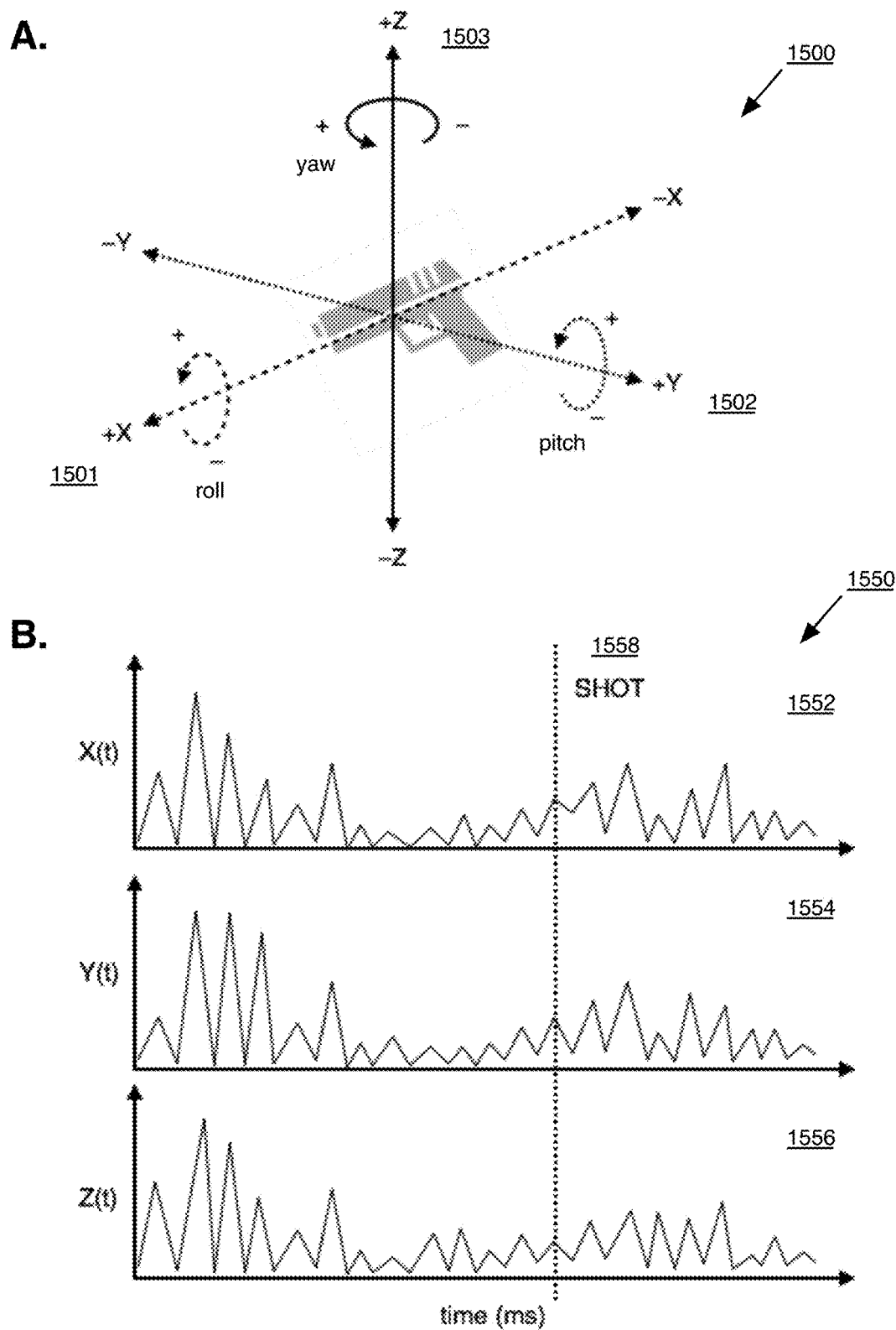
FIG. 15 shows diagrams concerning measurements by a firearm telematics sensor device, in accordance with some embodiments of the invention.

FIG. 15 shows exemplary diagrams concerning measurements by a firearm telematics sensor device 202. In certain embodiments, a firearm telematics sensor device 202 may be used to detect and/or record measurements related to a firearm. For example, a firearm telematics sensor device 202 may wake up from standby upon unholstering of the associated firearm. In some examples, unholstering may be detected by a separate holster telematics sensor device 102, e.g., mounted on a holster, that in turn contacts a firearm telematics sensor device 202, causing sensor device 202 to change to a more active state in which it has additional or full functionality with respect to detection. In some examples, unholstering is detected by the firearm telematics sensor device 202.

In some embodiments, a firearm telematics sensor device 202 may be capable of detecting inertial measurements such as the movements depicted in the system 1500 with a firearm shown at the origin of the axes as depicted in FIG. 15A. As shown, the firearm may be translated along three dimensional axes: X (1501), Y (1502), and Z (1503). Measurements concerning translation may be captured as position, velocity, and/or acceleration. In certain embodiments, such measurements may be inferred from measurements of directional acceleration, for example by integrating the acceleration or performing other inferential calculations; in some embodiments translation is directly detected.

A firearm may also be rotated, and measurements of rotation within system 300 may be detected as roll (e.g., rotation around X axis 1501), pitch (e.g., rotation around Y axis 1502), and yaw (e.g., rotation around Z axis 1503). The absolute orientation of a firearm (e.g., detected as a compass bearing) may also be detected by certain embodiments of a firearm telematics sensor device (e.g., resulting in measurements such as N76° E, referring to the direction the barrel is pointed toward—i.e., the direction of aim; along the positive X axis in FIG. 15A). In certain embodiments, a firearm's global location may be detected by, e.g., a firearm telematics sensor device 202, or another component of the systems described here, and that location may be recorded in decimal degrees with respect to the Prime Meridian and equator— e.g., 38.889722°, −77.008889° or in terms of cardinal coordinates such as 38° 53' 35" N, 77° 00' 32" W.

In certain embodiments, inertial measurements such as acceleration, velocity, or displacement of the firearm along a spatial axis may be plotted, such as the exemplary plots shown in FIG. 15B. In one example, the plots 1550 shown in FIG. 15B may represent the absolute value of the acceleration in terms of standard gravity (g, 9.8 m/s$^2$) along the X, Y, and Z spatial axes of system 1500 during a time window that includes discharge of the firearm. A time point corresponding to the firearm discharge is marked using a dashed line 1558. In other examples, X(t) shown in plot 1552 may represent the magnitude (e.g., an unsigned scaled value C*acceleration) of acceleration, velocity, or lateral displacement along X axis 301, or the rotational acceleration about X axis 1501, or a combination of the lateral and rotational acceleration (or velocity, or displacement) with respect to X axis 1501. Plots 1554 and 1556, representing Y(t) and Z(t) may represent corresponding functions concerning the other two spatial dimensions. In certain embodiments, three plots representing a weapon discharge (e.g., X(t), Y(t), Z(t) of plots 1550) may constitute all or part of a firearm signature that represents a particular individual's characteristic pattern of firing a weapon under similar conditions.

In certain embodiments, the inertial measurements and other measurements may be associated with a time point. Firearm telematics sensor device 202 may have an internal clock to relate each measurement along a time point, or in certain embodiments the measurements are related by their order in time, and may be associated with a time point at another component of the systems of the invention.

In some embodiments, when active, firearm telematics sensor device 202 may scan each data series (e.g., raw data such as acceleration measurements, or one or more of X(t), Y(t), and Z(t)) to identify windows of time that represent a firearm discharge (e.g., as distinguished from dropping the firearm, running while carrying the firearm, or unholstering the firearm). A discharge event may be associated with a characteristic pattern that is generally associated with firing of a weapon, and more specifically associated with a particular person's signature when firing a particular make and model of firearm under similar conditions. Stated another way, in some embodiments, the firearm telematics sensor device 202 is able to diagnose whether a shot has been fired, and firearm telematics sensor device 202, or another component may conduct a finer level of classification concerning whether the same person fired a type of weapon, of if a different person fired the type of weapon.

Similar conditions may refer to, for example: firing of a firearm having the same make and model; firing of a firearm of the same category of firearm (e.g., a handgun vs. a rifle); firing of a firearm where the operator is under a similar level of physical and/or emotional stress—e.g., weapon fired immediately after operator has jogged 500 feet vs. weapon fired without any physical activity.

Figure 16:
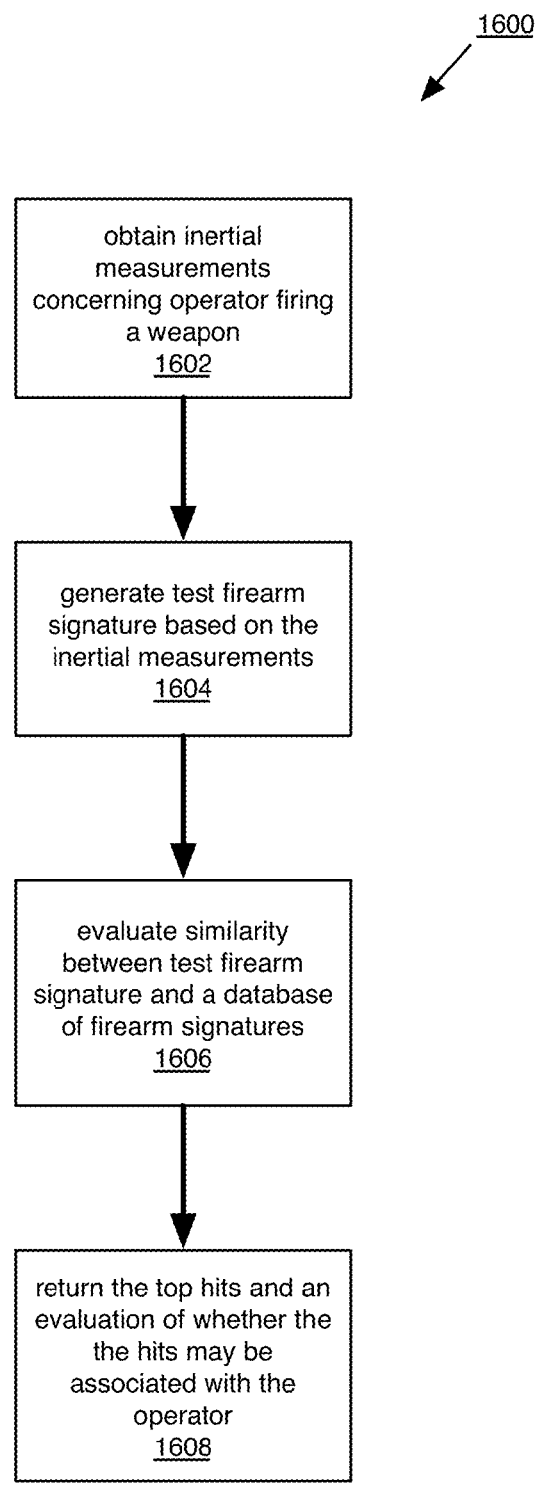
FIG. 16 is a flow chart depicting an exemplary method for identifying an individual who discharged a firearm, in accordance with some embodiments of the invention.

FIG. 16 is a flow chart depicting an exemplary process 1600 for identifying an individual who discharged a firearm. The process begins when one or more firearm telematics sensor devices 202 obtain inertial measurements for a firearm, and determine that the firearm has been discharged (e.g., by detecting a set of inertial measurements at with a very high magnitude) (1602).

Next, a test firearm signature is generated based on the inertial measurements during the discharge event (1604). E.g., three plots representing a weapon discharge (e.g., X(t), Y(t), Z(t) of plots 1550) may constitute all or part of a firearm signature that represents a particular individual's characteristic pattern of firing a weapon under similar conditions. Generating the signature may involve filtering the raw measurements using a band pass filter, or normalizing the data, and/or using other data processing steps.

Next, a database of existing firearm signatures is searched using the test firearm signature. That is, the similarity between the test firearm signature and the signatures in the database is evaluated (1606). Similarity between the signatures may be evaluated using methods such as a least-squares comparison, principal component analysis, or Pearson correlation.

In some embodiments, the entire database of signatures is evaluated, and information about a ranked list of signatures is provided. In some embodiments, only information about the top hits (e.g., the most likely hits to the test signature) is provided (1608). The top hits may be information about the firearm signatures that were more similar than a threshold value of similarity. The threshold value may correspond to a likelihood that the test signature and the top hits are associated with the same firearm operator. In some embodiments, the top hits may represent a greater than 50%, 75%, 90%, 95%, or 99% chance that the operator for the test signature is the same operator associated with the top hits.

Examples

Figure 17:
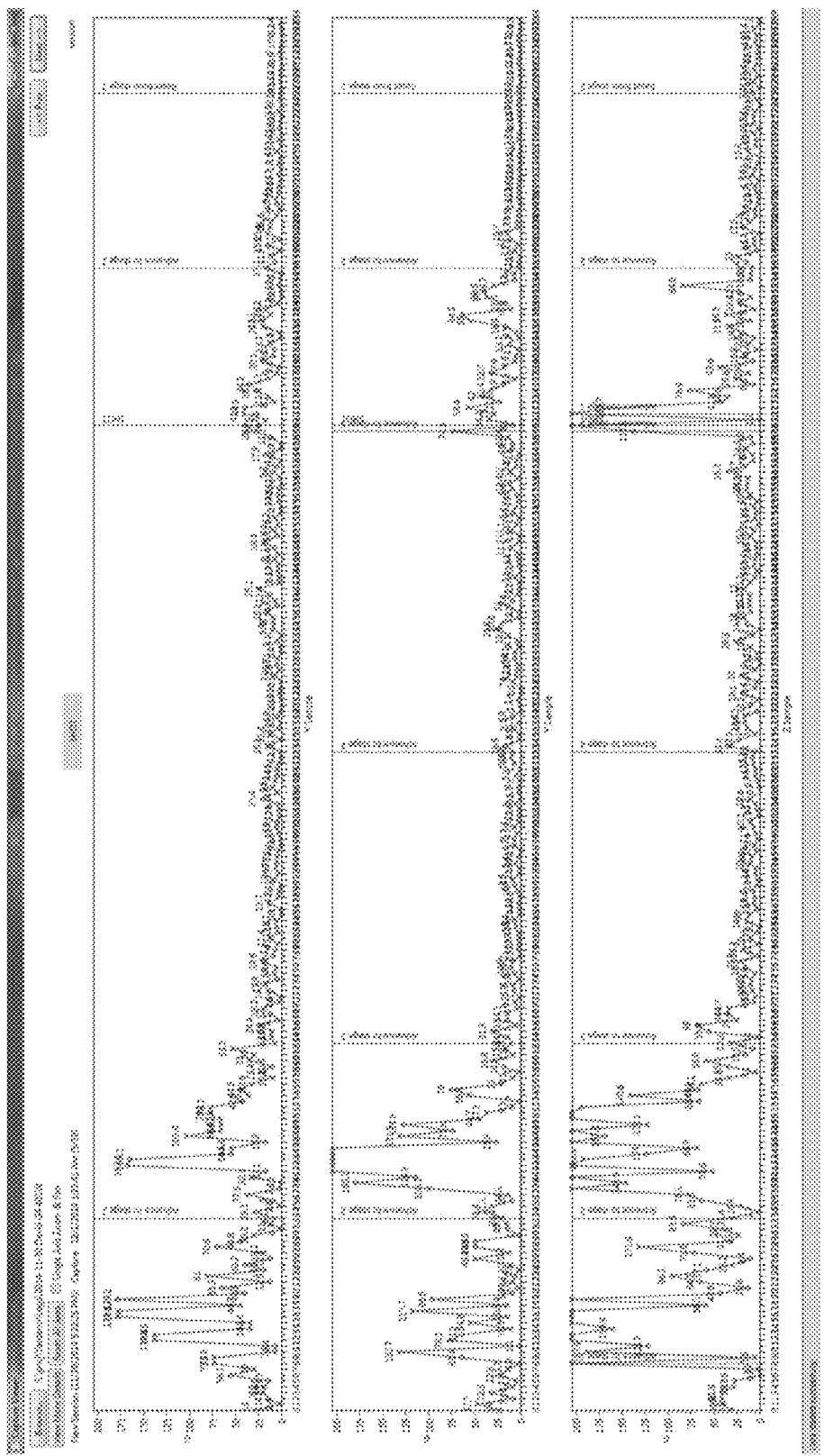
FIG. 17 is an exemplary data set associated with discharge of a firearm, consistent with some embodiments of the invention.
Figure 18:
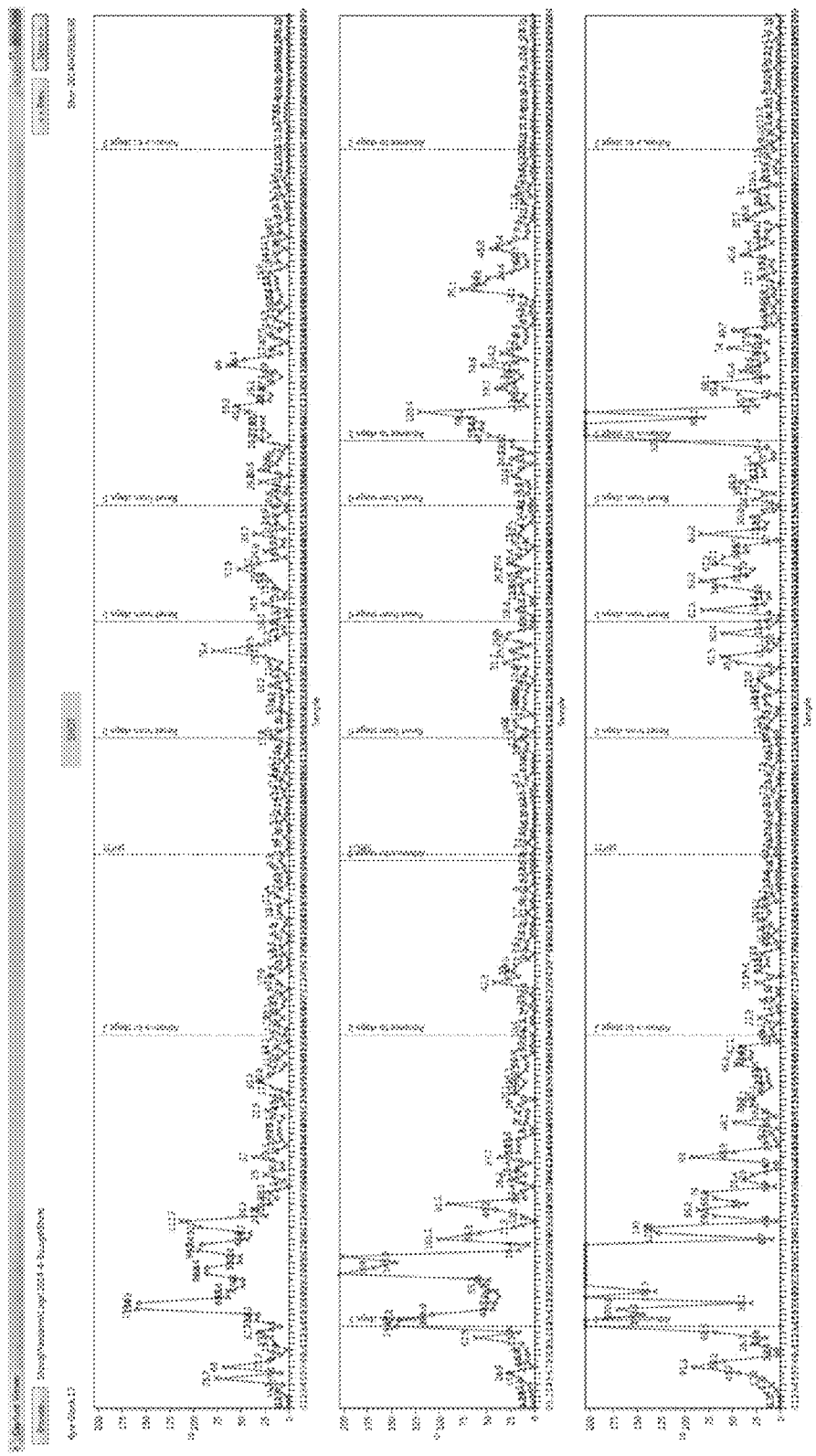
FIG. 18 is an exemplary data set associated with discharge of a firearm, consistent with some embodiments of the invention.

FIGS. 17 and 18 show plots of variables associated with three-axis waveforms of the kind indicative of different individuals' trigger pull finger prints relating to the firing of a firearm by the different individuals under similar circumstances and conditions. In these illustrations an "X-axis" parameter is represented in the uppermost graph, a "Y-axis" parameter is represented in the center graph, and a "Z-axis" parameter is represented in the lowermost graph. The vertical axis of each graph is a scale that indicates the magnitude of the corresponding parameter at a particular time. X, Y and Z are labels given to the axes of a three-axis coordinate system that plots these parameters against one another. In one embodiment of the invention, (1) X is an independent variable relative to time, and is a horizontal axis;

(2) Y is a dependent variable relative to magnitude of direction of each of the axes, and is a vertical axis; and (3) Z is a dependent variable relative to acceleration and amplitude of X and Y, and is an axis orthogonal to both X and Y.

In certain embodiments, the firearm telematics sensor device is configured to measure, capture, and transmit information relating to the slightest movement of the firearm in the three spatial dimensions (denoted X, Y, and Z herein) over the course of time. The present invention involves determining and measuring any changes in the position and orientation of the firearm during three distinct timeframes: prior to (e.g., in anticipation of) firing the firearm, the firing of the firearm (the firing event), and subsequent to (e.g., immediately after) the firing event. We call the information captured during these time periods the "trigger pull associated telemetry."

In this example, the trigger pull telemetry is a three-axis waveform, which is a byproduct of digital transmission, and includes the digital interpretation of finger discipline toward controlling the recoil or flipping motion associated with the firing of a firearm. The finger trigger motion just prior to and during the squeezing of a firearm trigger is measured as an event (acceleration over time), which appears as an impulse of energy followed by a three-axis waveform.

For example, 100 different users of the same firearm, with each user firing the firearm at the same target (or similar targets) under similar circumstances. Assume that firearm telemetry for each firing event is captured and relayed to a central facility separately by the sensor device circuitry as trigger pull telemetry. The trigger pull telemetry (e.g., the three-axis trigger pull fingerprints) for each user is then stored in a database. Each instance of trigger pull telemetry is stored so as to be associated with the identity of the user whose trigger pull fingerprint it is.

Now assume that any one of the 100 users again fired the same firearm, but this time did so anonymously. In this example the newly captured trigger pull telemetry is evaluated against the database of previously captured trigger pull telemetry to identify a matching three-axis trigger pull fingerprint. Such matching may involve a least squares analysis or similar form of graphical analysis to identify the trigger pull fingerprint from the database most closely matching the anonymous trigger pull fingerprint.

Further, if the trigger pull fingerprint associated with an anonymous user is determined to not match any of the trigger pull fingerprints stored in the database, the lack of a match can be used as evidence to demonstrate that none of the users registered in the database fired the firearm.

Figure 19:
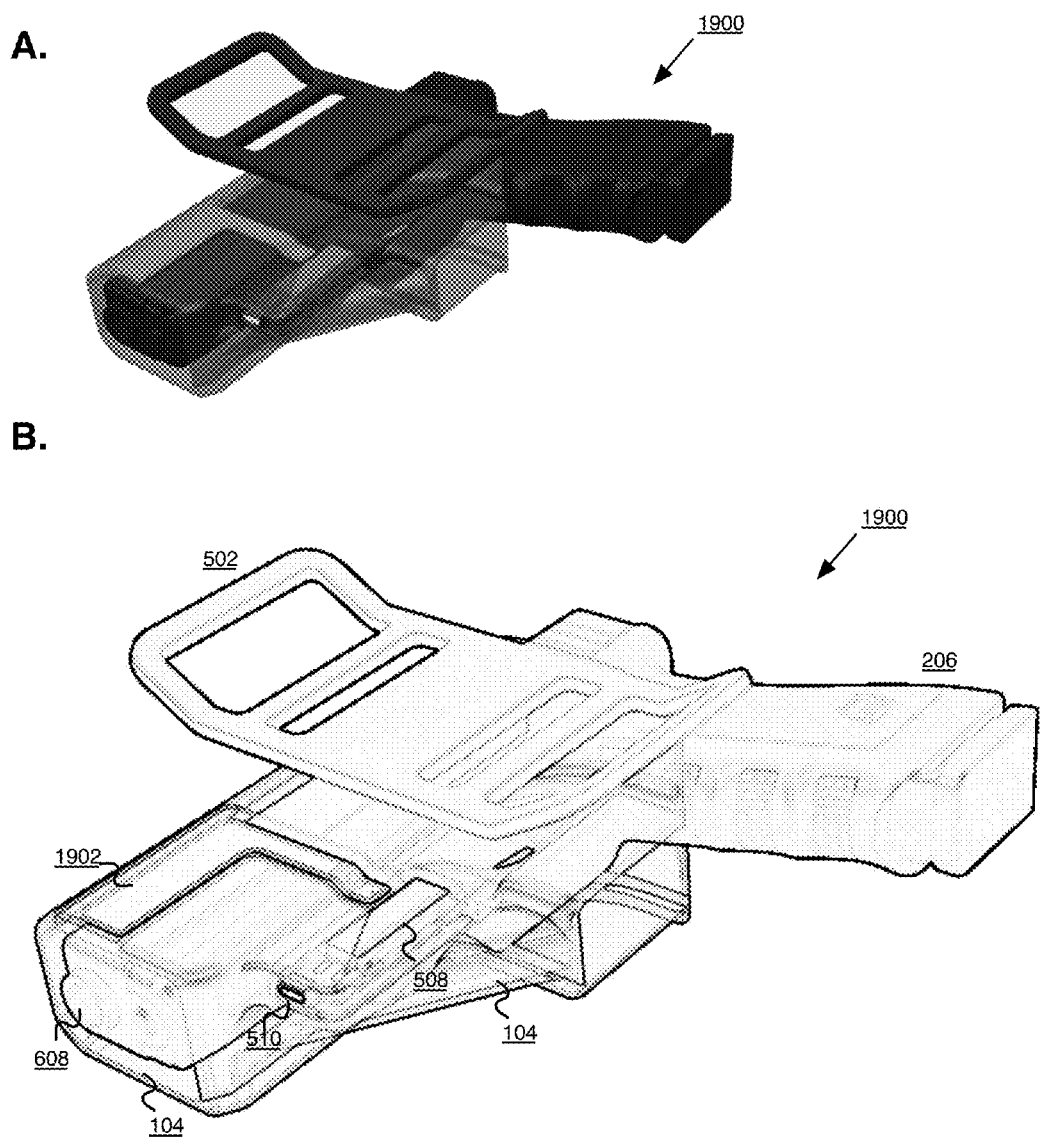
FIG. 19 shows views of an exemplary holster telematics device, in accordance with some embodiments of the invention.

FIG. 19 shows views of an exemplary holster telematics system 1900. In the embodiment shown here, holster telematics device 102 includes an antenna 1902 (in addition to battery 508 and port 510), for detecting the presence of a firearm by monitoring changes in capacitance (dielectric shift). In certain embodiments, antenna 1902 may be directly integrated into the materials of the holster; in other embodiments, antenna 1902 is attached to the surface of holster 104, e.g., using an adhesive material.

Figure 20:
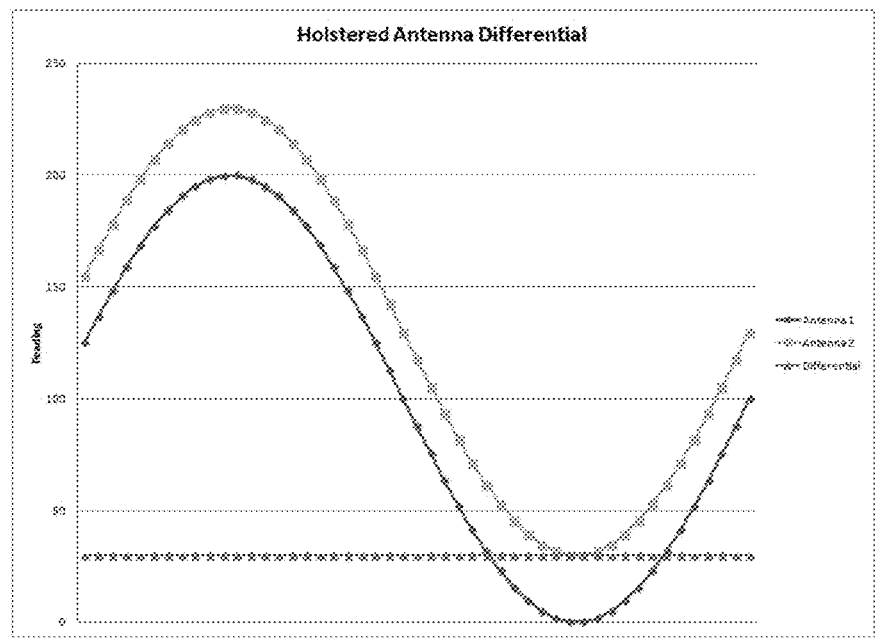
FIG. 20 shows exemplary data concerning monitoring the status of an implement on a mount using a dielectric-shift-based mechanism, in accordance with some embodiments of the invention.
Figure 20:
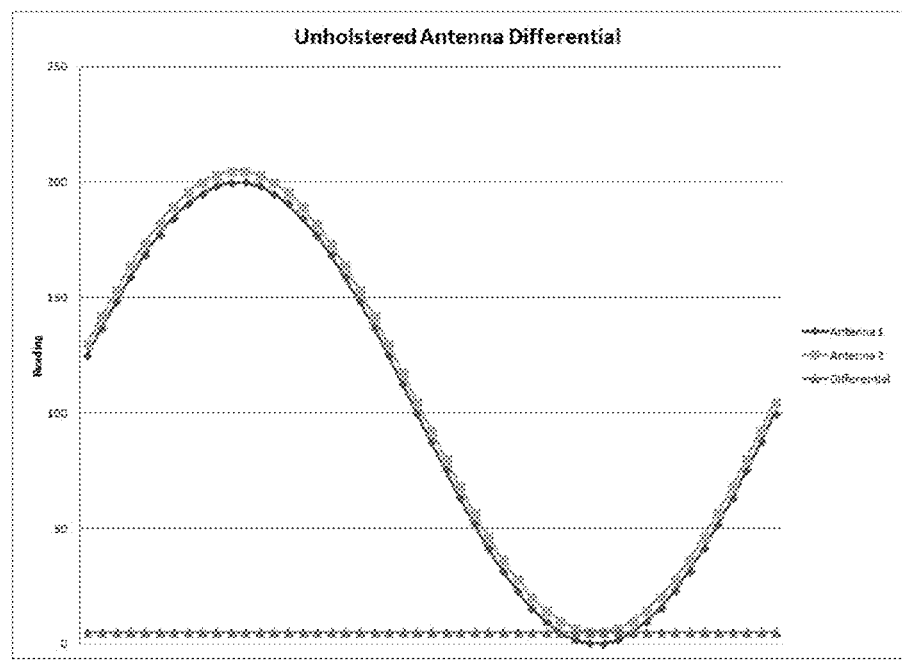

FIG. 20 shows exemplary data concerning monitoring the status of an implement on a mount using a dielectric-shift-based mechanism. Detecting dielectric environmental changes may be used to detect the near-presence of conductive materials, including metals. Water/humidity exhibits a similar electric field disruption to that of metal. In certain embodiments, telematics device 102 resolves such water/humidity issues through design use of a dual-antenna system, where one antenna senses the "ambient" dielectric measurement (and is positioned further away from the holstered implement). The other antenna is positioned closer to the holstered asset such as the barrel. This dual antenna configuration allows software calibration to identify and compensate for environmental effects. As shown in FIG. 20B, when the firearm is not holstered, both antennas exhibit identical results. As shown in FIG. 20A, when the firearm is holstered (even in the presence of high humidity), the antenna closest to the barrel will exhibit a signal that is differentially higher. In certain embodiments (e.g., in the system 1900 shown in FIG. 19) antenna 1902 may include two antennae side by side or sandwiched to implement a dielectric-shift-based sensor.

Figure 21:
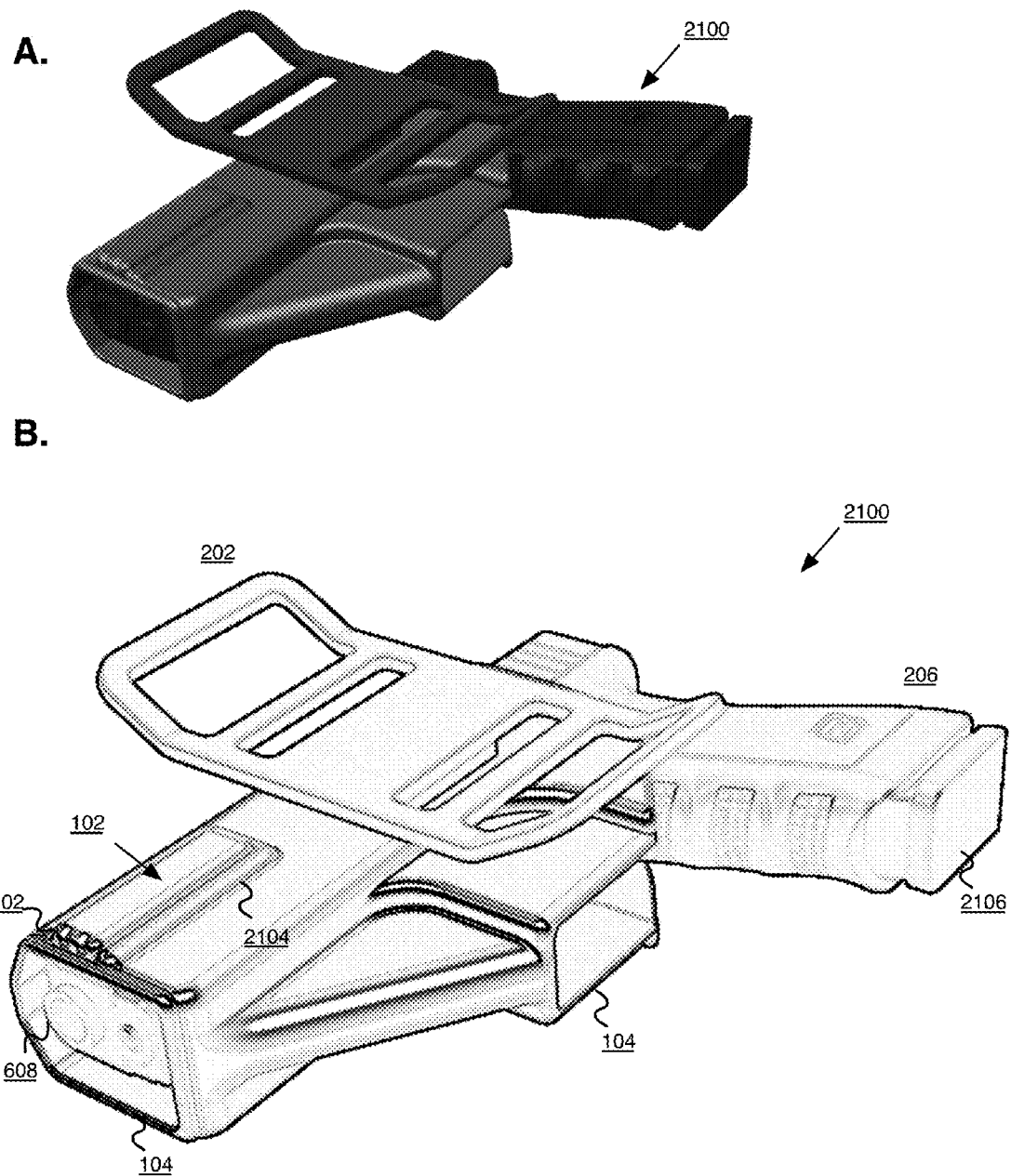
FIG. 21 shows views of an exemplary holster telematics device, in accordance with some embodiments of the invention.

FIG. 21 shows views of an exemplary holster telematics system 2100. In the embodiment shown here, telematics device 102 is encased within a rubberized casing or attachment structure 2104. Also shown are exposed contacts 2102, which pair to contacts on a charger that may be used to charge device 102. In this view, magazine 2106 of the holstered handgun is shown.

Figure 22:
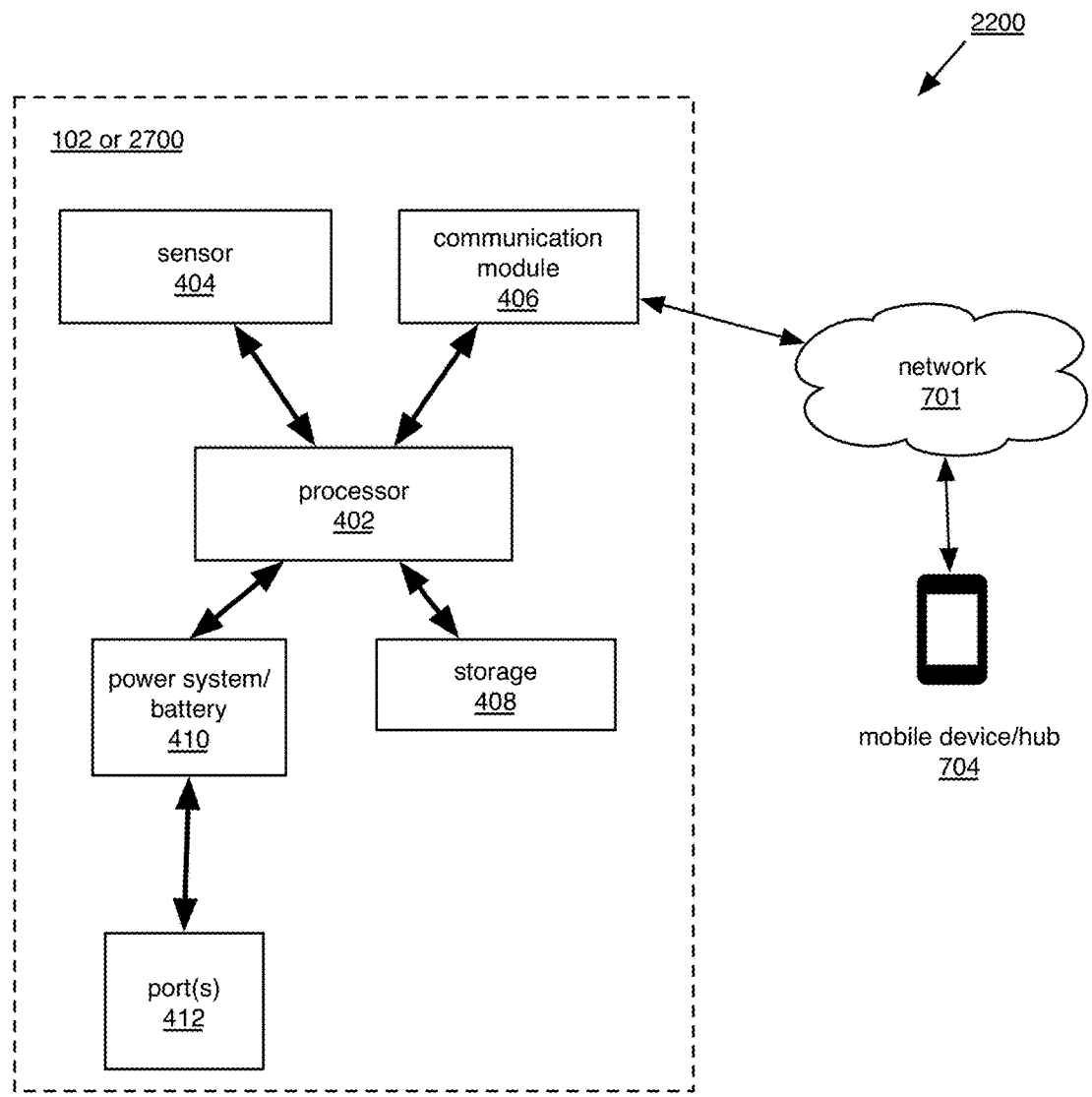
FIG. 22 shows a block diagram of a telematics device in communication with a mobile device/hub, in accordance with some embodiments of the invention.

FIG. 22 shows a block diagram of a telematics device 102 or charger device 2700 in communication with a mobile device/hub 704. Exemplary telematics device 102 or charger device 2700 includes a processor 402 that may be in communication with one or more sensors 404, a communication module 406, a storage component 408, and a power system and/or battery 410. The power system/battery 410 may be in communication with one or more port(s) 412 (e.g., port 2703 described below).

Charging device 2700 may include a sensor/detector 404—e.g., a temperature sensor for monitoring thermal load, or a mechanism for detecting over-current or over-voltage or other improper charging conditions which would adversely affect the battery.

Certain embodiments, such as system 2200, include mobile device 704 as well as telematics device 102 and/or charging device 2700. In certain embodiments, mobile device 704 (which may function as a hub device relative to telematics device 102 and any other telematics devices or charging device 2700 associated with the operator) may be a smartphone, a smart watch, a tablet computer, or a radio, such as a police radio. In system 2200, mobile device 704 is in communication with telematics device 102 via network 701. Network 701 may include a personal area network (PAN) such as Bluetooth or ZigBee, a local area network (LAN), a wired or wireless network, private or public network, or the internet, including wireless communication protocols such as General Packet Radio Service (GPRS), Enhanced Data rates for GSM Evolution (EDGE), 3G, 4G, Long Term Evolution (LTE) protocols, and communication standards such as Project 25 (P25), Terrestrial Trunked Radio (TETRA), and satellite and/or field radio protocols.

In certain embodiments, charging device 2700 is in communication with a mobile device 704 via a network 701. (In certain embodiments, charging device 2700 is alternately or additionally in communication with a remote server (not shown in FIG. 22)). Network 701 may include a local area network (LAN), wired or wireless network, private or public network, or the internet. In one example, mobile device 704 may be used to monitor or control the activity state of charging device 2700.

Figure 23:
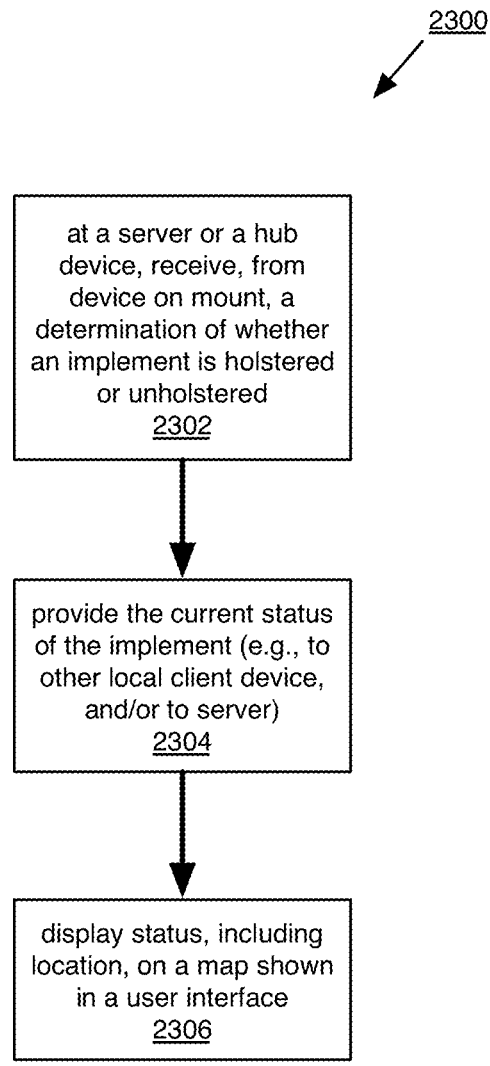
FIG. 23 is a flow chart depicting an exemplary method for monitoring the status of an implement on a mount, in accordance with some embodiments of the invention.

FIG. 23 is a flow chart depicting an exemplary method 2300 for monitoring the status of an implement on a mount. First, in step 2302, a server (e.g., server 710) or hub device (e.g., mobile device 704) receives a status update from telematics device 102 at a mount, such as a holster. The status update indicates whether the implement corresponding to telematics device 102 is present at the mount, or absent (i.e., unholstered). In certain embodiments, such a status update communication is triggered by a change in status (e.g., device 102 detects that a weapon is no longer holstered, or device 102 changes geographic location). Current geographic location may be assessed using GPS (global positioning service), as assessed by, e.g., telematics device 102 or mobile device 704. In certain embodiments, a change in location may be assessed by either of telematics device 102 or mobile device 704. In certain embodiments, device 102 provides such an update on a regular frequency, such as every 5 seconds, 1 second, half second, or the like.

In step 2304, the receiving device (e.g., server 710 or mobile device 704) provides the current status of the implement (e.g., holstered/unholstered and/or location of the implement) to another device, such as a client device of a team member (e.g., another mobile device), or distributes the status system-wide to other client devices, via server 710.

In step 2306, a receiving client device displays the status to a user, e.g., using a user interface plotting the location and other status information regarding an implement and its operator such as user interface 900 or 1000 shown in FIGS. 9 and 10. In certain embodiments, rather than providing the status via a map-oriented user interface, the receiving device will instead display an alert or a notification. In certain embodiments, the notification may constitute or include an alert message to communicate a dangerous situation to dispatch and/or unit members. An alert may be a prominent notification displayed on, for example, a mobile device 704 or web client 706.

The consequence of identifying a holstering or unholstering event may be configured, e.g. through a user interface accessed via link 810 in user interface 800, and such configurations may be retained in data store 716, telematics device 102, and/or mobile device 704.

Figure 24:
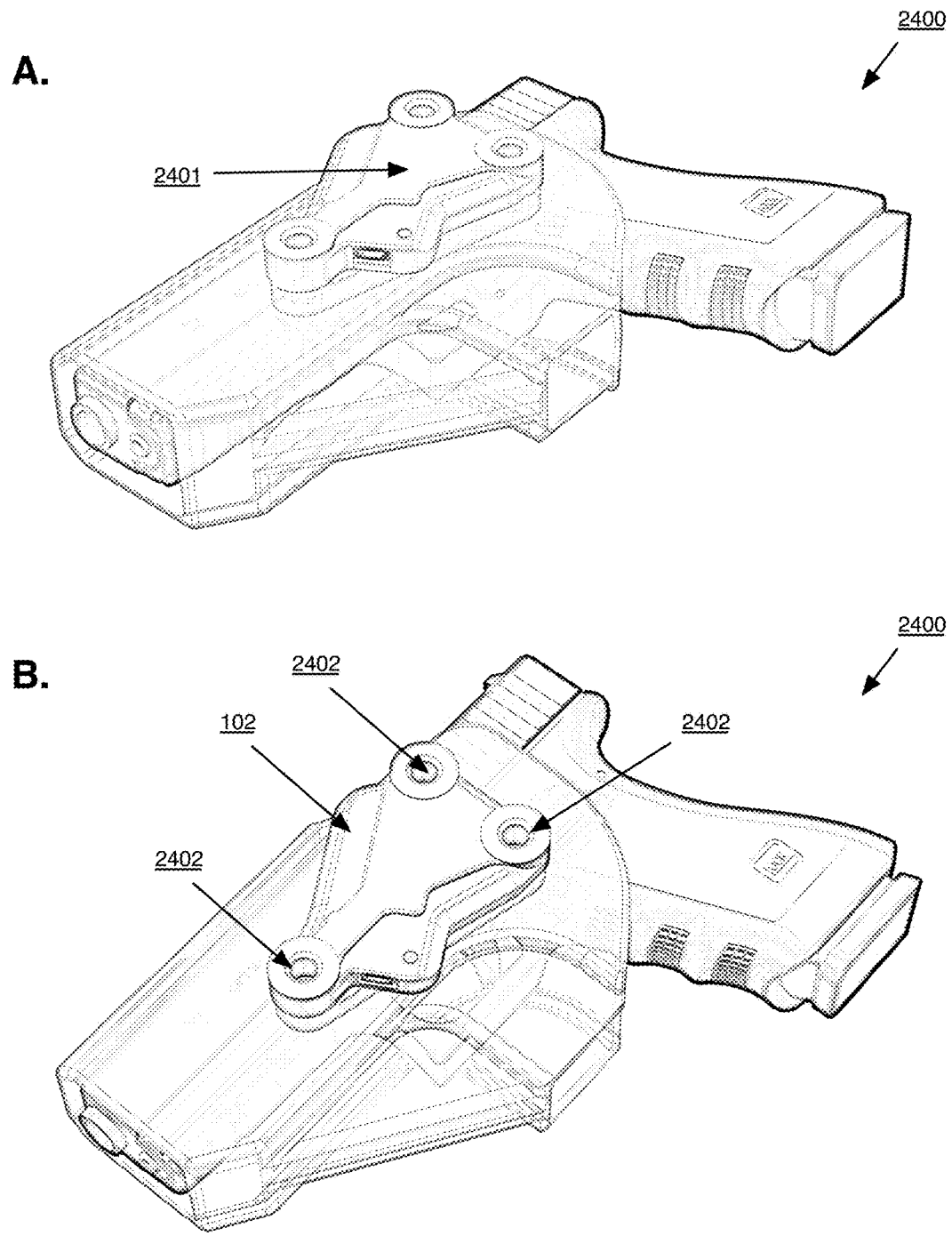
FIG. 24 shows views of an exemplary holster telematics device, in accordance with some embodiments of the invention.

FIG. 24 shows views of an exemplary holster telematics device within a holster system 2400. In certain embodiments, telematics device 102 is attached within an interposer 2401 that sits between the holster and, for example, a utility belt (e.g., utility belt 103). Such an attachment may constitute one example of mounting a telematics device 102 on a mount. For example, certain off-the-shelf holsters attach to an attachment site on a utility belt using a standard attachment mechanism, for example, one or more screws, rivets, or bolts. The embodiment shown here is designed for an attachment mechanism using three screws. The screws may be inserted into screw holes 2402 of an interposer 2401 containing the embodiment of telematics device 102 shown in FIG. 24.

Figure 25:
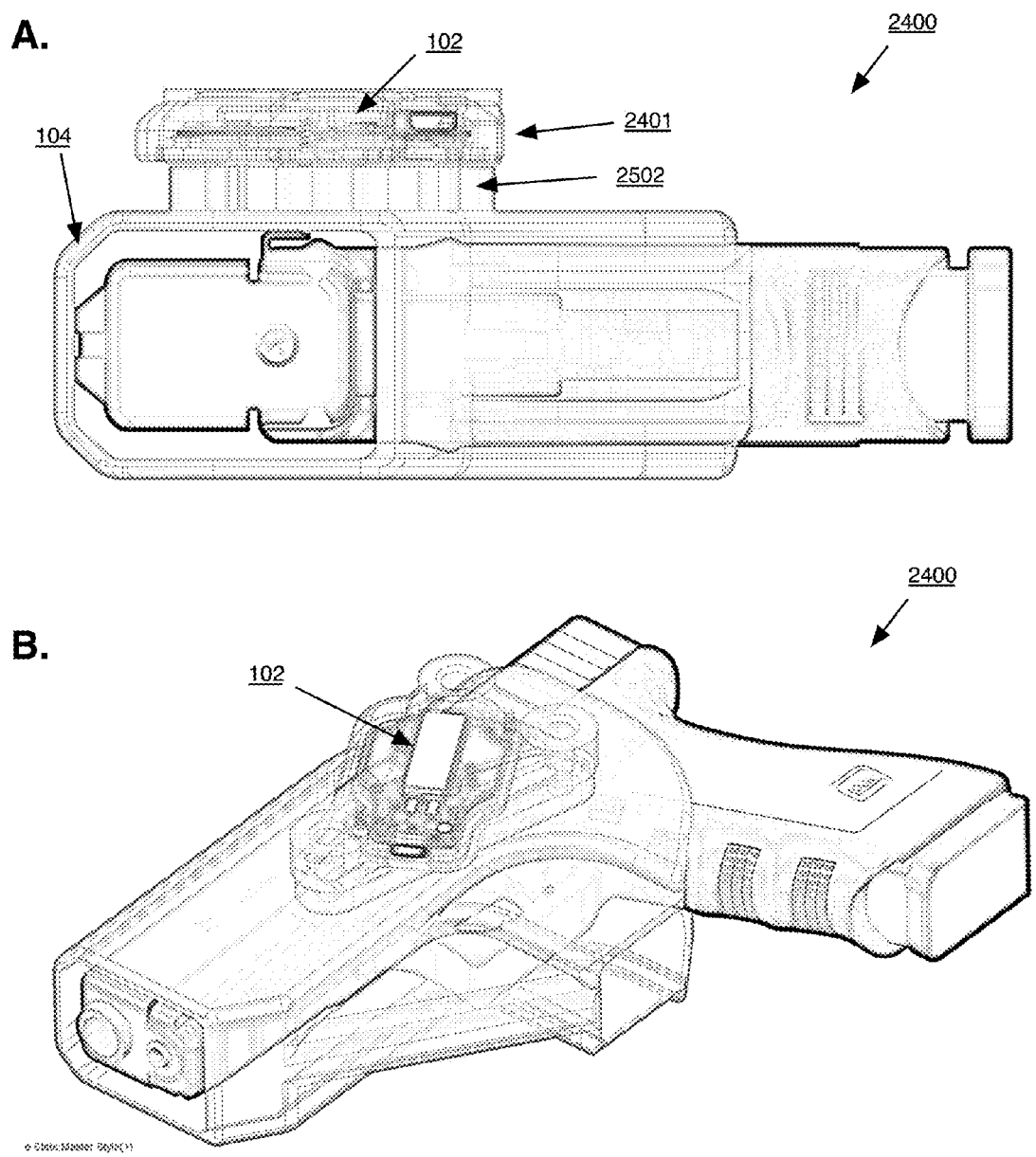
FIG. 25 shows views of an exemplary holster telematics device, in accordance with some embodiments of the invention.

FIG. 25 shows views of an exemplary holster telematics device within a holster system 2400. View 25A shows a rear view of holster system 2400, including interposer 2401 that provides screw holes 2402 that may correspond to both an attachment site on an off-the-shelf holster (e.g., holster attachment point 2502) and a belt attachment site (not shown). The telematics device 102 may thus be held within interposer 2401 and be attached to the standard attachment mechanism for a utility belt and holster or other type of mount. In certain embodiments, screws may be used to attach the interposer 2401, telematics device 102, and holster 104. View 25B shows some of the components of telematics device 102, including battery 508.

Figure 26:
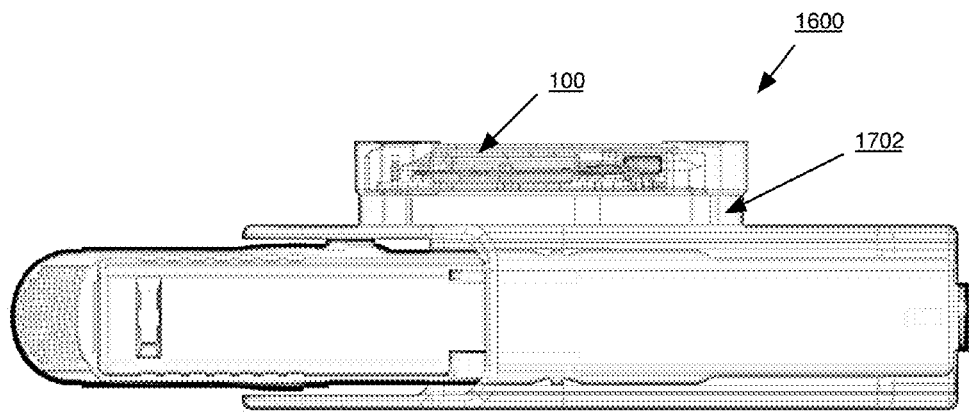
FIG. 26 shows views of an exemplary holster telematics device, in accordance with some embodiments of the invention.
Figure 26:
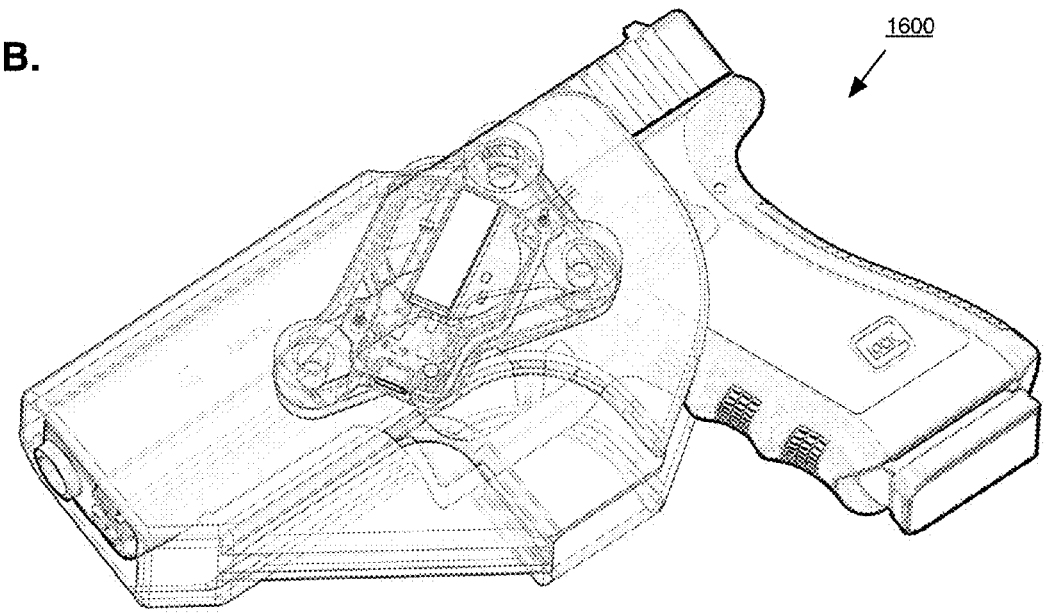

FIG. 26 shows views of an exemplary holster telematics device within a holster system 2400. View 26A shows a top view of holster system 2400, including a structure providing holster attachment point 2502.

Examples

Figure 27:
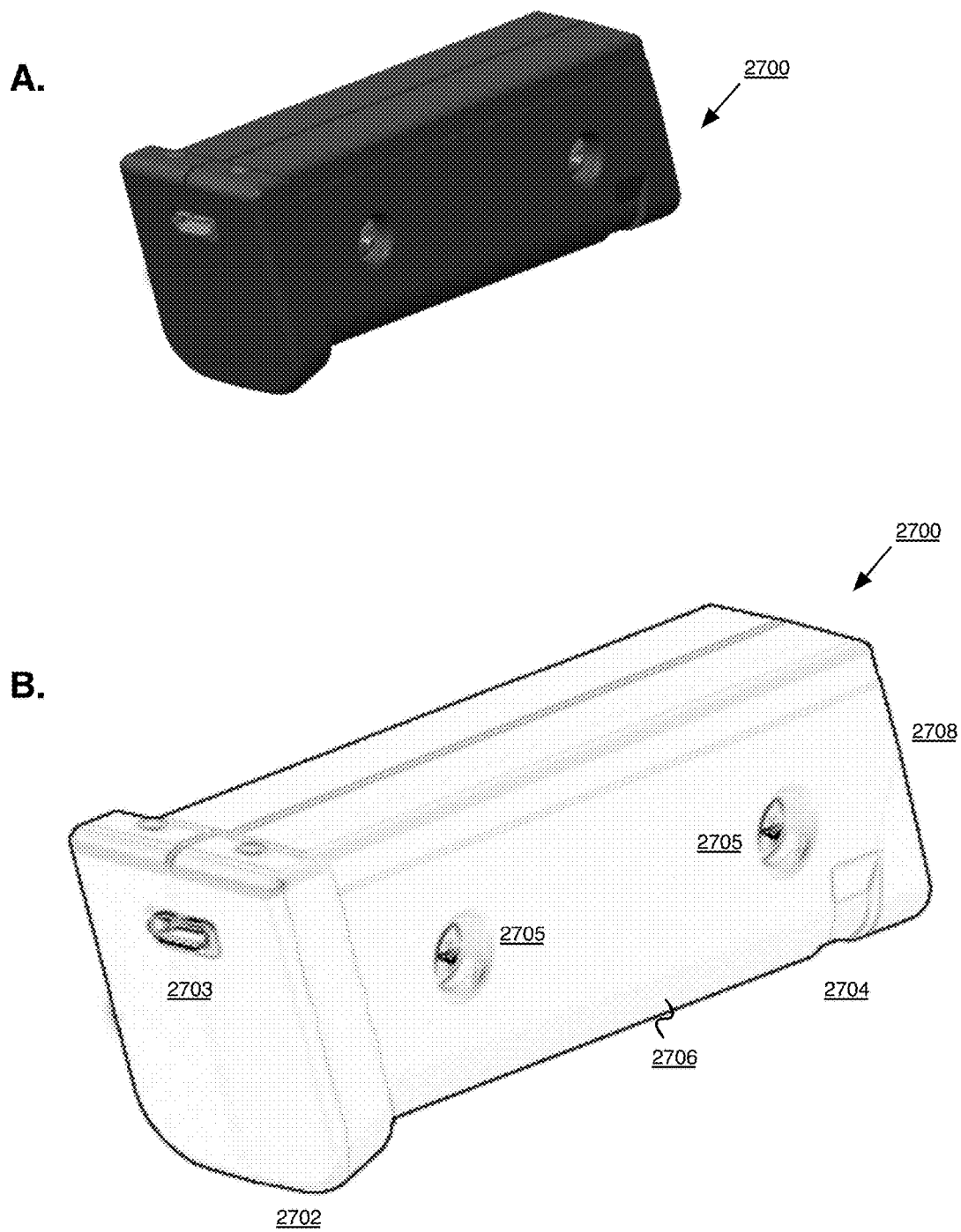
FIG. 27 shows views of a charging device, in accordance with some embodiments of the invention.

Exemplary procedure to enable function of one embodiment of telematics sensor device 102:
(1) CPU initialization and power-up
(2) Self-calibration
(3) Duty-cycle for power savings
Set timer
Sleep
Timer fires; sensor device wakes up
Conduct measurement
Decision Point:
Compare measurement against previous state
If necessary, determine sub-state (no touch; hand on weapon; weapon drawn)
Store result
Compile results into an aggregate result, a 'profile'
Report State
Jump to beginning of duty-cycle and repeat
If REPORT, examine report
Determine whether REPORT belongs to subset of types of REPORTs configured to be reported
Store and transmit REPORT
Monitor power
If power is low, indicate as such and transmit status
Jump to (3) and repeat FIG. 27 shows two views of an exemplary charging device 2700. In the embodiments shown in FIG. 27, device 2700 is generally shaped to resemble the outer contour of the magazine for a Glock™ handgun. In view 27B, charging device 2700 is shown to include a base 2702 at the proximal end of device 2700, with a port 2703 to receive power and/or data. Base 2702 refers to the portion of device 2700 that may be exposed when device 2700 is mounted to a firearm. Base 2702 may include one or more visual indicators such as lights to indicate the status of device 2700 (e.g., a solid or flashing green or red light may indicate that the device 2700 is currently charging a device, that it is powered on but not currently charging, that it is wirelessly paired or unpaired with another device, and the like). Port 2703 may be, e.g., a coaxial power connector, a Universal Serial Bus (USB) port, a microUSB port, a Lightning™ port, and the like. Device 2700 may include a locking mechanism to secure the charging device 2700 within the empty magazine chamber of a firearm—e.g., it may include a notch 2704 that interacts with a magazine catch. Device 2700 may further include bolts 2705 to help hold together the housing 2706 of device 2700. The distal end 2708 of device 2700 may be inserted into a magazine chamber.

FIG. 28 shows side-profile views of an exemplary charging device 2700. As shown in view 28B, base 2702 may include port 2703, such that port 2703 is directly or indirectly in communication with an inductive charging coil 2804 and companion circuitry 2806 mounted on an internal circuit board.

Figure 29:
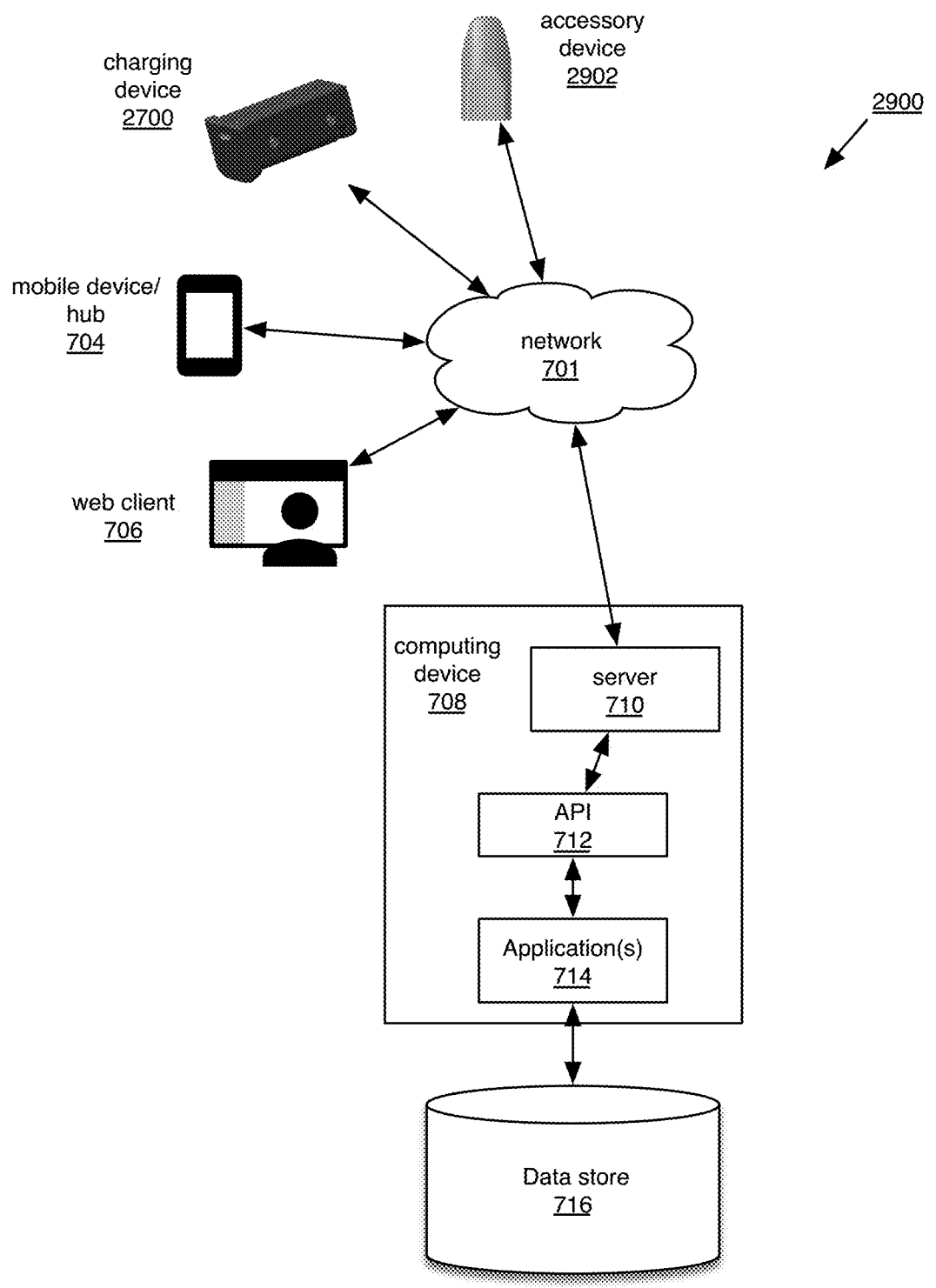
FIG. 29 is a block diagram showing exemplary data flows for an exemplary system, in accordance with some embodiments of the invention.

FIG. 29 is a block diagram showing exemplary data flows for an exemplary system 2900. In certain embodiments, data regarding the status of a component may be generated at charging device 2700, accessory device 2902, and/or mobile device/hub 704. In certain embodiments, this data may be shared between components of the system (e.g., charging device 2700, accessory device 2902, mobile device 704) on a local area network such as a Bluetooth network even in the absence of a wireless connection providing communication with geographically remote devices (e.g., the device executing web client 706 or computing device 708 hosting server 710). All components of the system 2900 are directly or indirectly connected using a combination of communication protocols represented by network 701.

Figure 30:
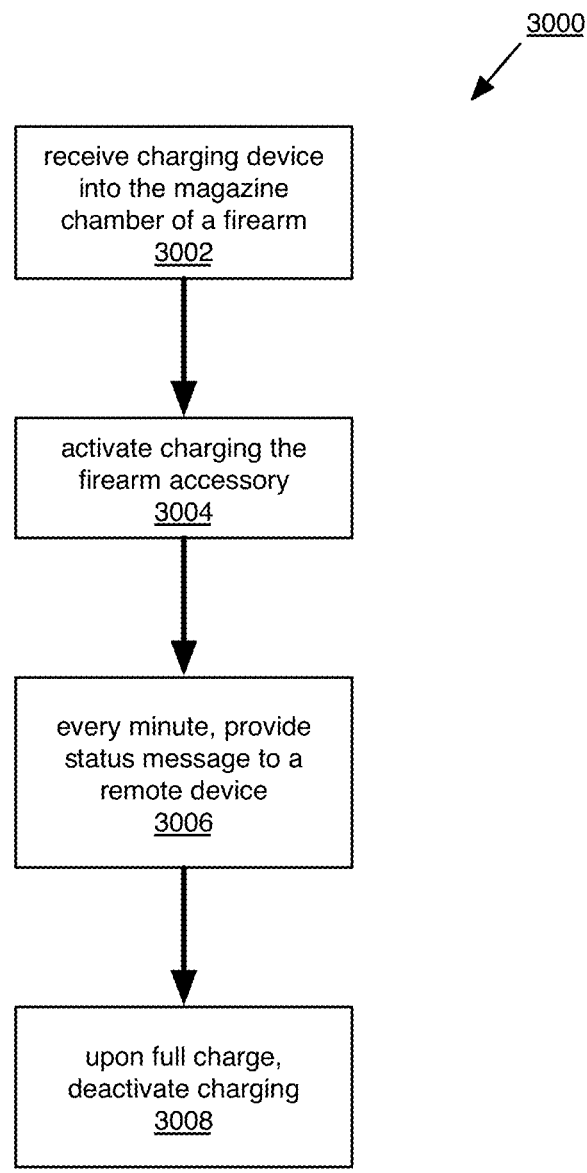
FIG. 30 is a flow chart depicting an exemplary method for charging a firearm accessory, in accordance with some embodiments of the invention.

FIG. 30 is a flow chart depicting an exemplary process 3000 for charging a firearm accessory. The process begins when a charging device 2700 is received into a magazine chamber of a firearm (3002). The charging device 2700 may automatically detect it has been inserted into the magazine and/or is in position to charge an accessory, and activate charging (3004). In certain embodiments, if the charging device 2700 has a low battery or is not plugged into a power source, charging device 2700 or accessory device 2902 may provide an error message to mobile device 704 or computing device 708. While the accessory is being charged, charging device 2700 or accessory device 2902 may provide a status message to mobile device 704 or computing device 708 on a regular basis (3006). For example, the charging device 2700 or accessory device 2902 may report charging status every second, every 5 seconds, every 30 seconds, every minute, every 5 minutes, or every 15 minutes. In certain embodiments, mobile device 704 or computing device 708 may poll the status of charging device 2700 or accessory device 2902 every second, every 5 seconds, every 30 seconds, every minute, every 5 minutes, or every 15 minutes. When accessory device 2902 is fully charged, charging device 2700 automatically deactivates charging (3008). In certain embodiments, the system components continue to receive charging status updates before and/or after the charging process is active.

In certain embodiments, an instruction to activate or deactivate charging may be received from mobile device 704 or computing device 708. Such a request may be initiated by web client 706.

In the above-referenced U.S. application Ser. No. 13/954, 903, methods and systems for monitoring and, optionally, controlling, handheld firearms using embedded telematics sensor devices configured to send and receive signals over a signaling channel of a wireless communications network were described. Briefly, a firearm configured in accordance with the invention described in the '903 Application includes a firing mechanism and a telematics sensor device. The telematics sensor device includes a subscriber identity module (SIM) configured to communicate with a server over a signaling channel of a wireless communications network. The telematics sensor device is configured to enable/disable the firing mechanism in accordance with instructions received by the SIM from the server.

Described herein are methods and systems for monitoring and, optionally, controlling, multiple handheld firearms or related instruments using embedded telematics sensor devices which communicate with a personal hub device worn or carried by an individual utilizing the firearms or related instruments. The hub is configured to send and receive signals over a signaling channel of a first wireless communications network in the fashion described in the '903 Application and to communicate with the embedded telematics sensor devices in each of the firearms and other instruments over one or more second wireless communications networks. The first wireless communications network is preferably a mobile telecommunications network, that includes a common signaling channel, such as one compliant with signaling system 7 (SS-7), which refers to a set of standards defining telephony signaling protocols. Thus, in one embodiment, the first wireless communication network may be a Global System for Mobile Communications (GSM) telecommunications network. The second wireless communication network(s) may be short-range radio frequency (RF) communications networks, such as those compliant with Bluetooth or Bluetooth Low Energy (BLE) wireless communication protocols. The second wireless communication network may be a single network through which all of the firearms and related instruments carried by an individual communicate with the hub device or it may be a plurality of ad hoc wireless communications networks by which each individual firearm or other instrument communicates with the hub device but not with others of the firearms or related instruments. For purposes of the present description, a single, second wireless communication network will be referred to, but readers should recognize that this is simply for purposes of ease of description and actual instantiations of the invention may include multiple such networks.

Figure 31:
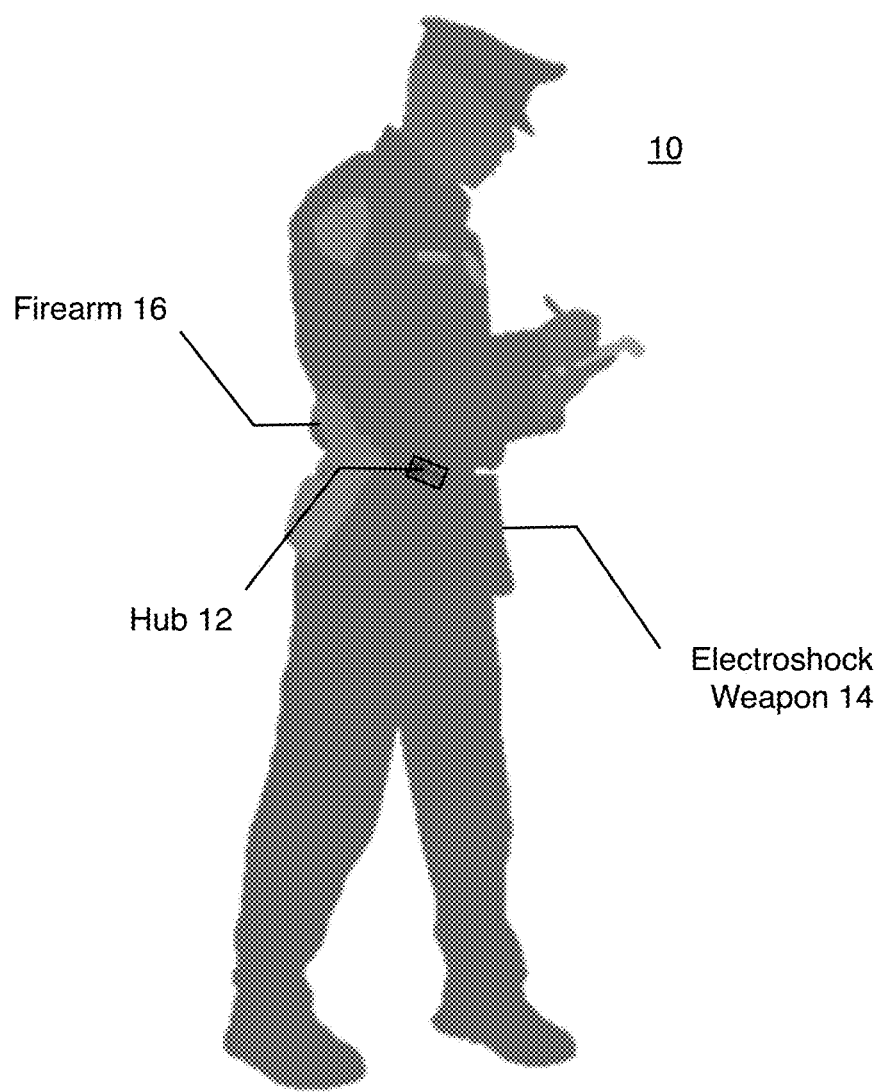
FIG. 31 illustrates an example of an individual outfitted with components of a system configured for monitoring and, optionally, controlling, handheld firearms and other instruments using embedded sensor devices in accordance with embodiments of the present invention.

FIG. 31 illustrates an example of an individual 10, in this case a police officer, wearing a utility belt on which is included a personal hub 12 configured in accordance with an embodiment of the present invention. In other embodiments the hub 12 may be integrated into an article of clothing (for example a belt buckle or utility belt) or a firearm and need not necessarily be a separate unit. In other instances, the hub may be designed to be carried in a pocket or on a lanyard worn around an individual's neck. In still other embodiments, the hub may be integrated in another instrument, such as a portable radio, mobile phone, or other device.

In the example illustrated in FIG. 31, the police officer 10 is also equipped with a non-lethal, electroshock weapon 14, such as a Taser™, as sold by Taser International, Inc. of Scottsdale, Ariz., and a firearm 16. In other examples, police officers, private security guards and other individuals may be equipped with additional or different instruments, such as batons, rifles, etc. In accordance with embodiments of the present invention, firearm 16 and electroshock weapon 14 (and, optionally, other instruments worn or carried by police officer 10) are configured with embedded telematics sensor devices that are communicatively coupled to hub 12 over a wireless communications network, such as a Bluetooth or BLE network. In the case of an embedded telematics sensor device in firearm 16, such a telematics sensor device may be configured to act as an integrated electrical and mechanical gating device to control the function of a firing pin or equivalent, preventing the firearm from being fired in the absence of an authorization signal received by the telematics sensor device (or, disabling the firearm upon receipt of a disable signal). Alternatively, or in addition, the embedded telematics sensor device may be configured to transmit a signal upon the respective firearm being moved and/or a safety mechanism being deactivated or mode selection mechanism being engaged. Likewise, the embedded telematics sensor device in electroshock weapon 14 may be configured to exert control over the firing mechanism of the device, preventing such firing in the absence of an authorization signal (or permitting firing only in the absence of a disable signal) and/or reporting on operation and/or movement of the weapon.

Although intended primarily for use with handheld firearms and related instruments, for example, pistols, revolvers, rifles, electroshock weapons, etc., the present invention may be adapted for use with any firearm or similar instrument. Therefore, as used herein, the term firearm should be understood as including handheld firearms, electroshock weapons, and other, similar instruments, as may be used by law enforcement personnel, private security personnel, military personnel, hunters, individuals engaged in personal safety activities, and others. Further, while the embedded telematics sensor device may be a separate module that is integrated into the firearm as an after-market accessory, in some instances the functionality provided by the embedded telematics sensor device may be integrated within the firearm at the time of its manufacture, either as a separate module or as an embedded part of the mode selection or safety mechanism. Therefore, the use of the term embedded telematics sensor device is for convenience only and should be understood to include integrated modules and similar mechanisms providing the functionality described herein. Such telematics sensor devices and the hub 12 may find application in both consumer as well as commercial applications.

Figure 32:
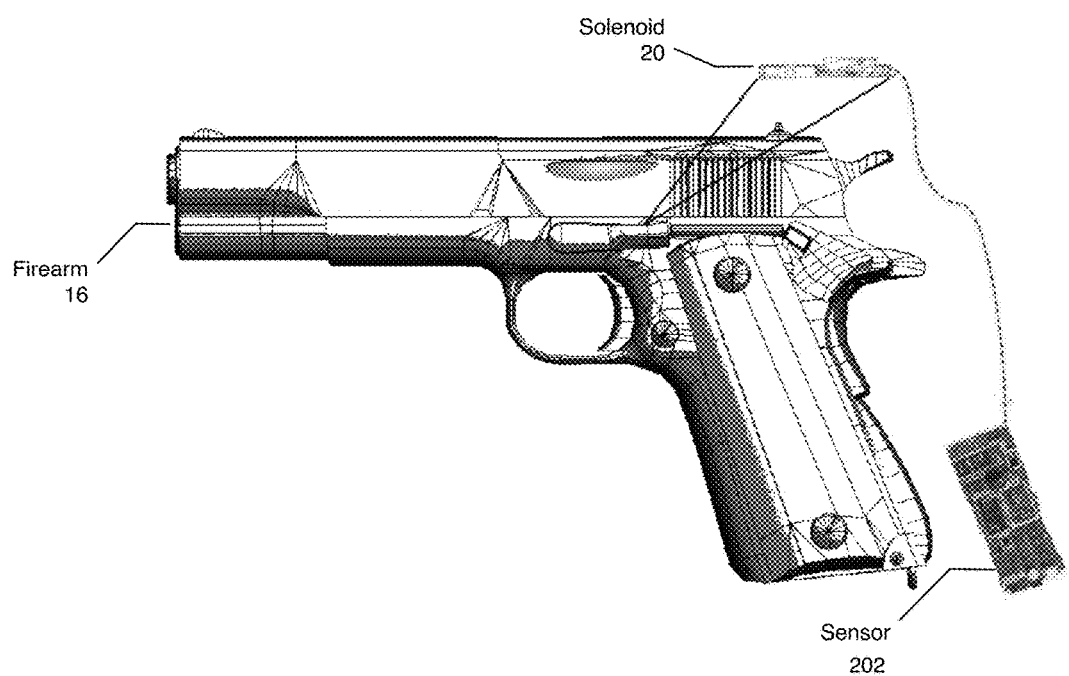
FIG. 32 illustrates an example of a firearm having an embedded sensor device, in accordance with an embodiment of the present invention.

FIG. 32 illustrates an example of an embedded telematics sensor device 202 for a firearm 16. In this example, the telematics sensor device 202 has an associated solenoid 20, which acts as a mechanical gating device (under the control of telematics sensor device 202) to control the function of a firing pin or equivalent, preventing the firearm 16 from being fired in the absence of an authorization signal received by the telematics sensor device 202. In other examples, the telematics sensor device simply monitors the operation of the firearm 16.

Because different firearms have different safety mechanisms, a detailed discussion of such mechanisms is not included herein. For purposes of the present invention, it is sufficient to recognize that virtually all firearms include such safety mechanisms and it is intended that in some embodiments of the invention the embedded telematics sensor devices will be included in a firing enable pathway and use a solenoid so as to act as an electrical-mechanical trigger safety gating means to permit or prevent such firing. In some instances this may require retrofitting of the firearm to include a suitable firing detent mechanism that can be enabled or disabled through an electronic signal from the telematics sensor device. In other instances, new firearms may be designed and constructed for inclusion of such enable/disable means. For firearms with electrical firing mechanisms, the telematics sensor device may be coupled to a switch in an electrical pathway in the firing mechanism and may be used to close or open the switch in accordance with firing authorization having been received or not.

More specifically, in one embodiment of the invention a blocking or gating means (which in one embodiment may be a cylindrical metal bar or rod) moves along an axis between a safety position and a firing position initiated by the action of a solenoid (energized/not energized), responsive to communications via the electronic components of the telematics sensor device (e.g., an electrical pulse). The blocking or gating means is movable between a first position, where the firing pin is operable to discharge the firearm, to a second position, where it is not. A first electric pulse causes the solenoid to move the blocking or gating means from the first position to the second, and a second electric pulse causes solenoid to return the blocking or gating means to its original position.

Although not shown in detail in FIG. 32, it should be appreciated that each telematics sensor device 202 may be integrated within a firearm or similar instrument and provided a power source. For example, the telematics sensor device may include its own battery. The battery may be rechargeable, in which case facilities for recharging same may be integrated within the firearm. For example, the firearm may be configured with a port to permit coupling to an external power source to facilitate recharging of an integrated battery. In another example, a battery charger clip (not shown) may be provided as a temporary replacement of an ammo clip or magazine. The firearm owner may be notified of battery status via an indicator light or other means (e.g., by a signal issued from the telematics sensor device to the hub and, optionally, subsequently reported by the hub to a mobile device or website that can be reviewed by the user). Recharging of the battery may then be accomplished by replacing an ammunition clip with the charging clip. The charging clip may include a battery, so as to recharge the telematics sensor device battery therefrom, and/or may include a transformer so as to recharge the telematics sensor device battery from a power line outlet. In practice, the telematics sensor device is designed to consume very little power so that recharging is needed only infrequently. As indicated above, in embodiments of the invention the telematics sensor device 202 is configured with a short range radio frequency communications transceiver (or equivalent), such as a Bluetooth or BLE transceiver.

Figure 33:
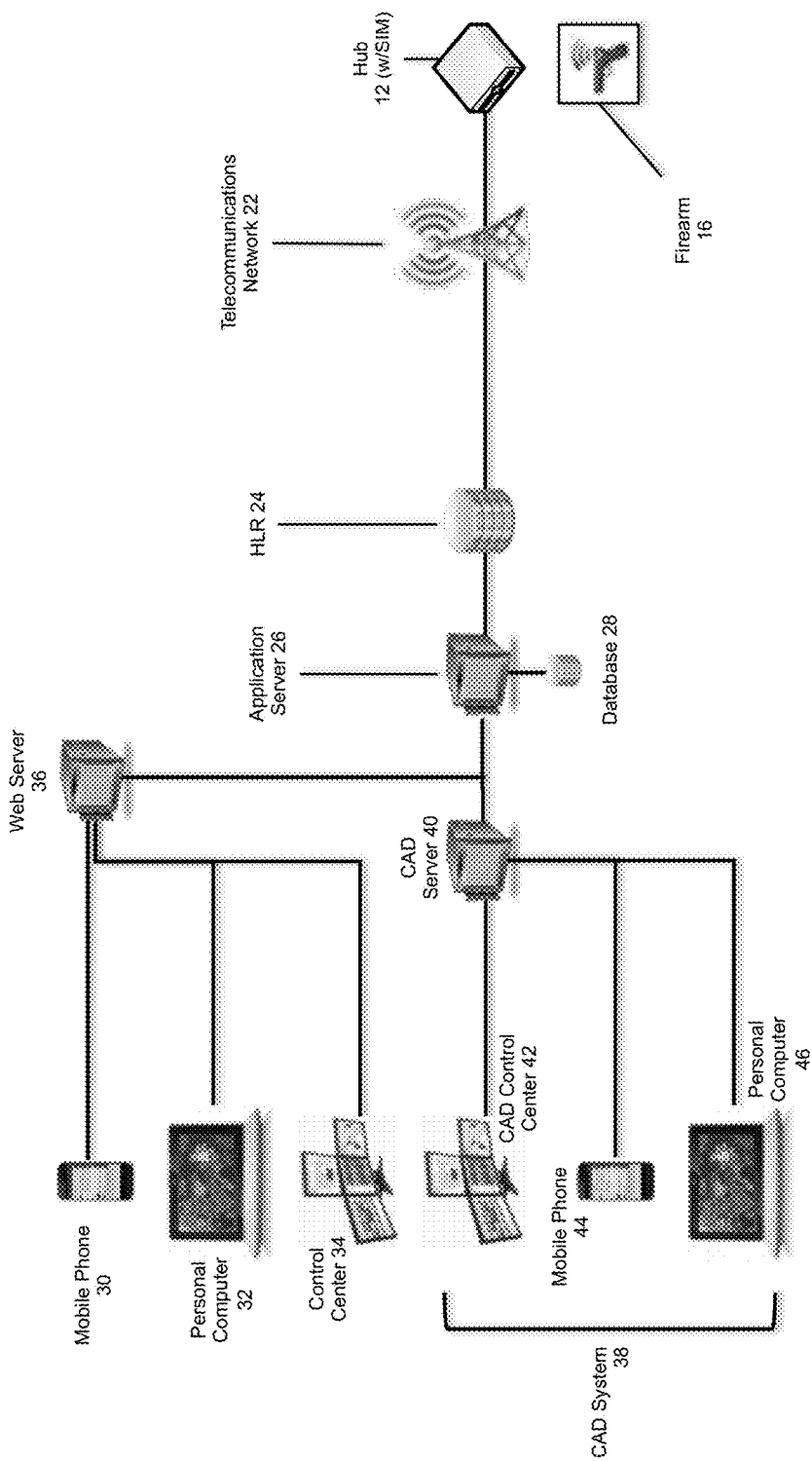
FIG. 33 illustrates an example of a system configured for monitoring and, optionally, controlling, a firearm configured with an embedded sensor device over a signaling channel of a wireless communications network in accordance with embodiments of the present invention.

Turning now to FIG. 33, the telematics sensor device included in firearm 16 is seen as one element of a monitoring and safety system that includes a number of cloud-based components, user interface components, and, optionally, a computer-aided dispatch (CAD) system which may also include Geographic Information System (GIS) software. The telematics sensor device in firearm 16 (and similar such telematics sensor devices included in other instruments) communicates over a wireless communications network with hub 12. Hub 12 is configured with both a wireless communications transceiver to communicate with the telematics sensor device included in firearm 16 and a second wireless communications transceiver to communicate with other components of the monitoring system over a signaling channel of a mobile telecommunications network 22. Included as part of the second wireless communications transceiver or modules associated with same is a subscriber identity module (SIM). Thus, the hub 12 includes one or more integrated circuits, similar to that used in mobile phones, having an onboard microcontroller, random access and read only memory (which stores an operating system), and an electrically erasable programmable read only memory that stores personality information such as a unique identifier, e.g., an international mobile subscriber identity (IMSI), and a related cryptographic key that is used to identify and authenticate a subscriber on a mobile telephony network. The SIM may also store one or more of a unique serial number, a personal identification number (PIN) and a personal unblocking code (PUK) for unlocking the PIN. Other logical and physical characteristics of the SIM may be such so as to be compatible with European Telecommunications Standards Institute specification TS 11.11, and/or $3^{rd}$ Generation Partnership Project (3GPP) specification TS 51.011 and TS 31.102. Applications may also be stored on the SIM, for example applications such as those described herein which facilitate communications between the SIM and a mobile device. Application toolkits which facilitate development of such applications are described in various specifications of the 3GPP and ETSI and are well known in the art and so will not be repeated herein.

Importantly for purposes of the present invention, SIMs store network-specific information used to authenticate and identify subscribers on a mobile telephony network. These identifiers include an integrated circuit card identifier (IC-CID), which identifies both the issuer of the SIM as well as a unique account number (e.g., of the subscriber), and the IMSI, which identifies the SIM to the network. In operation, the SIM also stores network state information, including a location area identity (LAI), which is updated whenever the SIM changes locations.

The SIM, as a component of the present system, is configured in accordance with embodiments of the present invention to transmit and receive signals over a dedicated signaling channel of wireless telecommunications network 22. Such mechanisms are commonly referred to as common channel signaling, distinguishing them from channel associated signaling which involves transporting signaling information on the same channel as will ultimately carry a voice conversation. Common channel signaling provides a distinct advantage in that the path and facility used to transport the signaling information is distinct from the channels that carry voice conversations, allowing for significant performance improvements in both the time it takes to communicate the signaling information and the use of network facilities. In the United States, common channel signaling is usually referred to as SS-7, which refers to a set of standards defining telephony signaling protocols. Thus, the present invention makes use of the SS-7 signaling channel of a wireless telecommunications network 22, which in one embodiment is a GSM telecommunications network.

In a GSM telecommunications network, a mobile switching center (MSC) is responsible for setting up and releasing end-to-end connections, based on signaling information received over the SS-7 signaling channel. The MSC is generally included within a mobile telephone switching office (MTSO) and is communicatively coupled to a home location register (HLR) and a central database that stores information concerning each subscriber authorized to use the network. This information includes the IMSI associated with the SIM and the current LAI.

In accordance with the present invention, communications between a SIM in hub 12 and an HLR 24 over the SS-7 signaling channel make use of USSD (Unstructured Supplementary Service Data) messages. USSD messages may be up to 182 alphanumeric characters per signaling packet. USSD messages create a real-time connection during a USSD session. The connection remains open, allowing a two-way exchange of data. This makes USSD sessions ideally suited as a communications vehicle between SIMs included in hub 12 and applications (e.g., instantiated on mobile phones 30, personal computers 32 and/or similar devices, and/or control centers 34) configured to permit firearm owners and/or users to authorize or block the use of those firearms (e.g., by authorizing or preventing the release of the firearm's safety mechanism). Some characters within the 182-character packet are otherwise un-used for transmission purposes and may be applied and used for transmission of telematics sensor device-related information, such as battery status, firearm status, etc., and for instructions signaling a solenoid to enable or disable a trigger safety mechanism.

As shown, hub 12 having a SIM that is configured in accordance with the present invention is communicatively coupled to a subscriber mobile device 30 over a wireless communications network 22. Details of the network 22 are not illustrated at this level; however, communications between the SIM and an application running on the mobile device 30 make use of the network's signaling channel rather than a voice or other channel. The application may be configured to provide alerts to the subscriber in response to the SIM signaling any movement or, optionally, attempted operation of the firearm and allows the subscriber to track such movements and/or enable or disable such operation remotely.

In addition to communicating the movement/attempted operation information to the mobile device 30, the network components may be configured to alert other units. For example, in the case of firearms associated with a police force or similar unit, alerts may be provided to a watch commander or other individual at control center 34, including via use of portable visual displays, such as mobile phone devices, where the control center itself may be mobile. This may act as a monitoring means for deployment of officers' firearms and/or an early warning indicator of the use of those firearms. Similarly, gun clubs and other private organizations may monitor the movements and/or use of their firearms (or members' firearms on the premises) so as to ensure they are being used and/or transported within guidelines established by the respective organizations. Personal computers 32 or control/command centers 34 may be used for such purposes.

Also shown in FIG. 33 is network equipment associated with a provider that offers the firearm monitoring service that is the subject of the invention. In some instances, the service provider may be the same provider that operates the telecommunications network 22, but more often then not it will be a different service provider. The provider's equipment is communicatively coupled to the telecommunications network 22 and includes an HLR 24 configured as with subscriber information as described herein. Also included in the provider's network are one or more servers, for example an application server 26 and web server 36, and associated rules databases 28, which are configured to issue enable/disable commands to a SIM in hub 12 according to rules established by a subscriber, including for example security firm, military, or law enforcement personnel, and information received from hub 12. For example, based on information from hub 12, the application server 26 may determine whether the firearm 16 is located within a permitted operating area established by the subscriber. If so, the server may issue an enable command to hub 12, which relays same over the short range wireless communications network to firearm or other device 16, permitting the use of the device. If, however, the firearm is determined to be outside the permitted area of operation, the server may be configured to prevent firing of the firearm, e.g., by sending a disable signal to the hub 12 to relay to the firearm. Alternatively, such "geo-fences" may be established to prevent firearm operation within a designated area (such as a building and is associated grounds, a park, etc.). These baseline enable/disable instructions may be overridden by a subscriber through use of an application running on mobile device 30. Note that although application server 26, web server 36 and rules database 28 are shown separately, the functions of these units may be included, in some embodiments, within HLR 24.

Also shown in FIG. 33 is optional integration of the present system with a computer-aided dispatch (CAD) system 38. CAD system 38 may include one or more servers 40 and an associated CAD control center 42. CAD control center 42 may be used to assist in the dispatch of emergency services personnel, such as police officers, firefighters and emergency medical personnel. Communications provided through CAD control center 42 are typically routed to and from dispatchees via a mobile data terminal (MDT) on the dispatchee's person or in an associated vehicle. CAD control center 42 may also be configured to store and retrieve data (e.g., radio logs, field interviews, client information, schedules, etc.) from the MDU.

In accordance with embodiments of the present invention, the CAD control center also receives information from hub 12 as hub 12 communicates with telematics sensor devices embedded in firearm 16 and other devices. Thus, a dispatcher may be provided with information concerning the movement, discharge or other operation of a firearm or other instrument and may relay such information through the CAD control center to other emergency services personnel. Alternatively, CAD server 40 may relay such information automatically, for example by sending alerts to mobile phones 44 and/or personal computers 46 (or MDUs) used by such personnel.

Thus far the hub 12 has been described primarily as a relay unit for communicating with one or more telematics sensor devices embedded in firearms and related instruments. In some embodiments, the hub may include additional features, such as location determining devices (e.g., global positioning system (GPS) receivers), and sensors for detection of illegal drugs, chemicals, gasses, and vapors associated with explosive devices, etc. Information obtained by such receivers/sensors may be communicated to a control station and/or mobile device, etc., via the same signaling channel used to relay information from a firearm. Thus, the hub may serve as a central communications facility for instrumentation and equipment carried by a police officer, security guard, soldier or other individual.

Thus, in one embodiment the present invention includes telematics sensor devices 202 in one or more firearms or related instruments, a personal hub that includes a SIM and, optionally, other receivers/sensors, and which is configured to communicate information received over a short range wireless communication network from the telematics sensor devices associated with the firearms and related instruments to a remote monitoring station via a signaling channel of a wireless telecommunications network. In addition to information received from the embedded telematics sensor devices 202 associated with the firearms and related instruments, the hub may also communicate information from its own associated receivers and/or sensors over the wireless telecommunications network to provide operators at the remote monitoring station with a more complete description of the environment in which the user associated with the firearms is operating. The hub is also configured to receive information over the signaling channel of the telecommunications network from the remote monitoring station (and/or other sources) and, responsive thereto, to send commands via the short range wireless network to the embedded telematics sensor devices associated with the firearms and related instruments to enable/disable operation of those firearms or related instruments.

In various embodiments, the telematics sensor devices associated with the firearms and other instruments may be configured to provide an alert upon one or more of: movement of the firearm, an attempted operation of the firearm, disabling of a safety of the firearm, and a change in mode of the firearm. To facilitate such actions, the telematics sensor device may include a motion detector. Upon receipt of such an alert, the hub 12 may be configured to transmit same to the remote monitoring station over the telecommunications network. In one embodiment, the telematics sensor device associated with a firearm or related instrument may be configured to periodically transmit an electronic heartbeat signal to the hub so that the hub knows the associated firearm is nearby (it is envisioned that the short range wireless communication network over which the hub and firearm telematics sensor device communicate has an effect range of a few meters to perhaps a few tens of meters). In the event the hub does not receive a heartbeat signal (which may be coded to uniquely identify the associated firearm or related instrument), the hub may transmit an alert message to the remote control station to act as a warning that the firearm has potentially become separated from its authorized user.

To this end, hubs may be configured to operate only with designated telematics sensor devices 202 (firearms) but to detect the heartbeats transmitted by other telematics sensor devices. In this way, a hub passing near a location of a stolen firearm may detect a heartbeat transmitted by that firearm, and, upon recognizing that the heartbeat is not associated with a telematics sensor device for which the hub is configured to operate, may pass the heartbeat information to a remote control center. At the remote control center, the heartbeat may be decoded to identify the associated firearm and, if recognized as being associated with a stolen firearm, an alert may be provided to law enforcement and/or other personnel in the area (e.g., via a CAD MDU). In some cases, the remote control center may wirelessly configure the hub that received the heartbeat from the stolen firearm to communicate with the telematics sensor device associated with that firearm and disable the firearm.

Within buildings and other structures or urban canyons, location determination based on Global Positioning System (GPS) receivers is not always reliable or accurate. Accordingly, the hubs are not limited to the use of GPS location determination but may also include other location determination means, such as mobile telecommunications network triangulation using femtocell devices deployed to provide cell tower location coordinates. Use of femtocell triangulation requires installing low-powered cellular base stations that have a range of approximately 40 feet. Such femtocell technology works well within buildings, for precise floor, hallway, or similar location determinations.

In accordance with embodiments of the invention, a SIM of a hub 12 communicatively couples the telematics sensor device embedded in a firearm 16 over a wireless network to a cloud-based platform (e.g., an HLR) that includes computer-based decision-making and database rule-sets for signaling information. The cloud-based platform is further communicatively coupled to a mobile device (such as a smart phone) and/or control center, which includes a firearm monitoring and safety application. The application enables the firearm owner or other user to communicate with the telematics sensor device in the firearm, for example to receive status information such as alerts produced by motion sensors included in the firearm. The user can respond to such alerts via a user interface of the application, for example to cause a solenoid to cause blocking or gating means included in the firearm to move between a first position and a second position, and vice versa. In other embodiments, the telematics sensor device may be enabled solely for purposes of tracking the location of the firearm and may not play a role in enabling or disabling the firing of the weapon.

In operation, when a hub configured in accordance with the present invention is powered on, it enters an initialization mode in which the SIM searches for a nearest base transceiver station (BTS) of a wireless telecommunications network. To facilitate communications between the SIM and the hub, the hub may include a radio transceiver and an antenna. The antenna may be located at or near the exterior surface of the hub and/or may have an exposed portion thereof so as to provide for a robust communication pathway.

In the initialization mode, the SIM included in the hub scans for a signal from one or more BTS signals and, if there is more than one, will generally select the one with the strongest received signal strength and that has a system identifier indicating compatibility with the SIM's network operator. The system identifier is typically broadcast by a BTS on a control channel. Once a BTS has been selected, the SIM will register with the network and, if the carrier that operates this network is not the same carrier as operates the firearm monitoring service of the present invention, the network operator will signal (using an SS-7 channel) the appropriate home carrier (i.e., the carrier associated with the present firearm monitoring service).

Network registration may vary depending on the country and/or carriers involved, but generally will include the SIM selecting a channel slot for transmission and, through the use of the radio transceiver, using the signal control path to transmit its associated phone number and IMSI to the BTS. The BTS forwards the signaling information to the local network operator's MTSO, which initiates a handshake with the SIM. The SIM responds with its unique authentication key, which is then used for encrypting and authenticating all further communications between the SIM and the MTSO. While a SIM is powered on, network registration is automatic and ongoing, occurring every several seconds and lasting only a few milliseconds. Power consumption during such registration operations is minimal.

The SS-7 protocol for SIM network registration includes specific signaling packet length(s), field(s) identity, and character length, and in addition to phone number and IMSI, the fields include a "message waiting indicator" and "feature request." These fields may be used in accordance with the present invention for communication of some of the information required for geospatial location awareness and an "enable" or "disable" instruction over the SS-7 signaling channel.

Mobile communications between the BTS and the hub occurs through the use of radio signaling transmissions, using a full-duplex configuration and separate transmit and receive frequencies. The BTS transmits on the frequency that the hub receiver is tuned to, while the hub transmits on the radio frequency that the BTS receiver is tuned to. The BTS acts as a conduit for information transfer between the hub and the MTSO. Subscriber-specific information for use by the MTSO is contained in the HLR, which also performs an important role in tracking the hub (i.e., its associated SIM) as it moves around the network. In one embodiment, this tracking involves the use of LAI information stored by the SIM.

During registration, the SIM stores network state information, including the LAI, received from the BTS. When the firearm changes location and/or the mode of the firearm is changed (e.g., going from a "safe" mode to a "fire" mode or a "single shot" mode to a "semi-automatic" mode, etc.), the SIM stores the new LAI. Further, in accordance with the present invention, the SIM encrypts the LAI and stores it in a dial buffer of the device.

Thereafter, and periodically, a server operated by the firearm monitoring service provider may attempt to place a voice call to the SIM. This is done using the SIM information stored in the HLR. The SIM, however, is configured not to accept voice calls and responds to the attempt with a "do-not-allow" or "wink-back" message. In accordance with the present invention, this message includes the contents of the dial buffer; i.e., the encrypted LAI. At the server, the dial buffer information is combined with the information gleaned from an SS-7 "location request" solicited by the server to provide detailed location information for the SIM (i.e., for the associated firearm). Because no actual voice or data transmission occurs power consumption is minimized in these transactions. In some instances, Global Positioning System (GPS) information may be included in addition to LAI in order to further define the location of the firearm user. The GPS information may be associated with the hub (if so equipped) and/or with the BTS in communication with the SIM.

To facilitate the operations described herein, the service provider's HLR 24 is configured to include parameters useful for monitoring firearms, which parameters may include but are not limited to: name of registrant (often, though not necessarily the firearm owner), purchase date, make and type of firearm, location purchased, description of authorized use areas (i.e., description of geo-fence boundaries), description of authorized use dates and/or times (e.g., times-of-day/days-of-week, etc.). An associated database 28 is configured with rule sets that define messages to be sent to a hub. For example, rules that are based on HLR parameters defining geo-fences and/or use dates and/or times may be provided. When information from a hub is received at the server, the server consults the HLR to retrieve the associated use parameters for firearms associated with that hub and issues instructions in accordance with those parameters. For example, in the case of a subscriber that has defined permitted uses of a firearm to be on weekends from 09:00 to 11:00, upon receipt of a signal from a hub indicating that a safety has been disabled, the server will retrieve the associated parameters from the HLR, compare the permitted use days/times with the current day/time and issue an enable or disable instruction to the hub for relay to the firearm accordingly. Similar enable/disable instructions based on geo-fence rule sets and decisions based upon real-time receipt of hub location information may also be dispatched. Logs of such decisions and instructions may be kept for later review and assessment.

Ideally, the HLR and any associated database are accessible only via authenticated accesses by the firearm owner and/or authorized individuals. In some countries, law enforcement personnel may be permitted to access and/or override certain parameters. For example, in some countries, law enforcement personnel or governmental authorities may be able to enforce firearm-free zones through one or more default HLR parameters applied to all firearms registered with the service provider. Changes in HLR parameters may, in some circumstances, also be subject to "waiting periods" in order to permit review by law enforcement or other government authorities.

Applications running on a subscriber's mobile device may be used to configure the geo-fences and other parameters stored at the HLR. In addition, the application may be used to receive location information concerning the hub. For example, subscribers may use the application to poll the HLR for current location information and/or may receive alerts when location updates are received by the HLR in response to detected movements of the firearm.

The computer- or controller-based devices described herein generally will include includes a bus or other communication mechanism for communicating information, and a processor coupled with the bus for processing information. Such devices also will include main memory, such as a RAM or other dynamic storage device, coupled to the bus for storing information and instructions to be executed by processor. Main memory also may be used for storing temporary variables or other intermediate information during execution of instructions to be executed by processor. Such devices further will include a ROM or other static storage device coupled to the bus for storing information and instructions for the processor. A storage device, such as a hard disk or flash drive, may also be provided and coupled to the bus for storing information and instructions. Execution of the sequences of instructions contained in the main memory, ROM and/or storage device causes the processor to perform the process steps described herein. Such devices also include a communication interface coupled to the bus, which communication interface provides a two-way data communication path as is known in the art. For example, such a communication interface may be a local area network (LAN) interface to provide a data communication connection to a compatible LAN.

Thus, methods and systems for monitoring and, optionally, controlling, handheld firearms and related instruments that make use of one or more embedded telematics sensor devices configured to send and receive signals over a wireless communications network have been described. In various embodiments, the present invention provides a safety mechanism for a firearm in which a personal hub is used as a communications gateway to and from the firearm and, optionally, a decision-gate in the firing enable path thereof.

Embodiments

In addition or as an alternative to the above, the following embodiments are described:

Embodiment 1 is directed to a system for controlling a camera, comprising:
a local system comprising:
one or more cameras;
a firearm;
a holster for receiving the firearm;
one or more telematics sensor devices, wherein the telematics sensor devices may be mounted on the holster and/or the firearm; and
a rule set for defining the behaviors of the one or more cameras and the one or more telematics sensor devices;
wherein the one or more camera and the one or more telematics sensor devices are in communication via a personal area network, and wherein the one or more cameras are configured to change status based upon events detected by the one or more telematics sensor devices.

Embodiment 2 is directed to embodiment 1, the local system further comprising a beacon, wherein the beacon is mounted on a vehicle, and the one or more cameras are configured to change status based upon a detection of proximity to the beacon.

Embodiment 3 is directed to embodiment 1, the local system further comprising a mobile device, wherein the mobile device is in communication with the one or more cameras and the one or more telematics sensor devices via the personal area network, wherein the mobile device is configured to receive information regarding events from the one or more telematics sensor devices, and the mobile device is configured to provide instructions regarding camera status to the one or more cameras.

Embodiment 4 is directed to embodiment 1, further comprising a server that is directly or indirectly in communication with the one or more camera devices and with the one or more telematics sensor devices using a wide area network.

Embodiment 5 is directed to embodiment 4, further comprising an updated rule set received from the server.

Embodiment 6 is directed to a user interface on a display of a computing device that includes a processor, comprising:
a display area for displaying the status of a body camera; and
a user control configured to change the status of the body camera,
wherein the status of the body camera may be selected from the group consisting of recording, not recording, powered on, and standby mode.

Embodiment 7 is directed to embodiment 6, wherein the computing device is a mobile computing device.

Embodiment 8 is directed to method for activating a camera associated with a user, comprising:
identifying that an event concerning a firearm has occurred;
wirelessly providing, to a camera, an instruction to change the status of the camera;
wirelessly providing, to a remote server, information regarding the changed status of the camera; and
recording metadata regarding the event for association with video recorded by the camera.

Embodiment 9 is directed to embodiment 8, wherein the instruction to change the status of the camera was initiated by a remote command center.

Embodiment 10 is directed to embodiment 8, further comprising:
wirelessly receiving, at one or more of a mobile device, a camera, or a telematics sensor device, an updated rule set for defining the behaviors of the camera and the one or more telematics sensor devices.

Embodiment 11 is directed to embodiment 8, wherein the event is selected from the group consisting of: user exits a vehicle with a firearm, user enters a vehicle with a firearm, holstering a firearm, unholstering a firearm, discharging a firearm, approaching a second user of the system, a firearm is separated from the user, loud noise is detected, and receiving a notification from a second user of the system or dispatch or command.

Embodiment 12 is directed to embodiment 11, wherein the event is unholstering a firearm, and the event was detected using a sensor device relying on a pulse induction mechanism.

Embodiment 13 is directed to embodiment 8, wherein the instruction to change the status of the camera is selected from the group consisting of: turning on the camera, waking the camera, activating recording of video at the camera, marking existing video to be retained, and/or marking new video to be retained.

Embodiment 14 is directed to embodiment 13, wherein at least 30 seconds of existing video is marked to be retained.

Embodiment 15 is directed to embodiment 8, wherein the camera is mounted on a vehicle, mounted on eyewear, clipped to a vest, or mounted on a lanyard.

Embodiment 16 is directed to embodiment 8, wherein the information provided to a remote server includes an alert.

Embodiment 17 is directed to embodiment 8, wherein an alert message is distributed to multiple recipients.

Embodiment 18 is directed to embodiment 8, wherein the firearm is a handgun, a Taser, a baton, or a rifle.

Embodiment 19 is directed to embodiment 8, wherein the information provided to a remote server is only provided when the firearm is associated with an on-duty status.

Embodiment 20 is directed to embodiment 8, wherein the metadata comprises a time stamp and the category of event.

Embodiment 21 is directed to embodiment 8, wherein the metadata is selected from one or more of: date, coordinates, altitude, firearm orientation, movement, translation, bearing.

Embodiment 22 is directed to embodiment 8, wherein the metadata comprises the ammunition type, and/or the ammunition remaining.

Embodiment 23 is directed to embodiment 8, wherein the metadata are provided as one or more tracks that map to a video file.

Embodiment 1a is directed to a system for identifying the individual who discharged a firearm, comprising:
  a local system comprising:
  the firearm; and
  one or more telematics sensor devices associated with the firearm, wherein the one or more telematics sensor devices are configured to detect a plurality of inertial measurements; and
  a database comprising a plurality of firearm signatures; and
  a server comprising one or more memories storing instructions and one or more processors that execute the instructions by:
    evaluating the similarity between a test firearm signature based the inertial measurements detected by the one or more telematics sensor devices and the plurality of firearm signatures of the database;
    providing the one or more most similar firearm signatures of the plurality of firearm signatures, or a negative report if none of the plurality of firearm signatures are more similar than a threshold.

Embodiment 2a is directed to embodiment 1a, the local system further comprising a mobile device, wherein the mobile device is in communication with the one or more telematics sensor devices via a personal area network.

Embodiment 3a is directed to embodiment 2a, wherein the mobile device is configured to execute the instructions.

Embodiment 4a is directed to embodiment 2a, wherein a remote server is configured to execute the instructions.

Embodiment 5a is directed to embodiment 1a, the local system further comprising a holster telematics sensor device mounted on a holster for the firearm, and wherein the one or more telematics sensor devices associated with the firearm are activated and begin making inertial measurements when the holster telematics sensor device determines that the firearm is unholstered.

Embodiment 6a is directed to embodiment 1a, wherein the one or more telematics sensor devices are further configured to identify an event comprising the discharge of the firearm, and wherein the instructions further include associating the event with one or more of the group selected from: a geographic location of the event, and the direction of aim for the firearm.

Embodiment 7a is directed to embodiment 1a, wherein the database further comprises data concerning firing events associated with a firearm operator, wherein the data include firearm bearing and geographic location.

Embodiment 8a is directed to a method for identifying the individual who discharged a firearm, comprising:
  generating a test firearm signature based on inertial measurements detected by one or more telematics sensor devices associated with the firearm;
  evaluating the similarity between the test firearm signature and a plurality of firearm signatures stored in a database;
  providing the one or more most similar firearm signatures of the plurality of firearm signatures, or a negative report if none of the plurality of firearm signatures are more similar than a threshold.

Embodiment 9a is directed to embodiment 8a, wherein the test firearm signature is a set of three waveforms corresponding to a time period encompassing a trigger pull and discharge of the firearm.

Embodiment 10a is directed to embodiment 9a, wherein the three waveforms represent movements within three spatial axes.

Embodiment 11a is directed to embodiment 10a, wherein the inertial measurements are filtered with a band pass filter in order to generate the test firearm signature.

Embodiment 12a is directed to embodiment 8a, wherein the similarity is determined using a least-squares comparison, principal component analysis, or Pearson correlation.

Embodiment 13a is directed to embodiment 9a, wherein the time period and corresponding waveform data are segmented into: prior to discharge, discharge, and subsequent to discharge.

Embodiment 14a is directed to embodiment 10a, wherein the three waveforms are based upon linear acceleration along three spatial axes.

Embodiment 15a is directed to embodiment 10a, wherein the three waveforms are based upon rotation about three spatial axes.

Embodiment 16a is directed to embodiment 10a, wherein the three waveforms are based upon a combination of acceleration and rotation with respect to three spatial axes.

Embodiment 1b is directed to a system for detection of the status of an implement on a mount, comprising:
  the implement that is attached to the mount, wherein the mount is a holster or a gun rack;
  a telematics device attached on or near the mount, the telematics device comprising:
    one or more memories storing instructions and one or more processors that execute the instructions by:
    monitoring the status of the mount, wherein the status includes detecting whether or not the implement is present;
    communicating the status of the mount.

Embodiment 2b is directed to embodiment 1b, wherein the implement is selected from the group consisting of: a lethal weapon, a nonlethal weapon, a policing implement, a camera, an ammunition-related implement, and a radio.

Embodiment 3b is directed to embodiment 1b, wherein the telematics device uses inductive coupling to detect the presence or absence of the implement.

Embodiment 4b is directed to embodiment 1b, wherein the telematics device uses a dielectric-shift-based mechanism to detect the presence or absence of the implement.

Embodiment 5b is directed to embodiment 1b, wherein the status of the mount is provided to a mobile device via a personal area network.

Embodiment 6b is directed to embodiment 1b, wherein the status of the mount is communicated to a server.

Embodiment 7b is directed to embodiment 1b, wherein the status of the mount is communicated in real time.

Embodiment 8b is directed to embodiment 1b, wherein the mount is a holster, and the telematics device is external to an interior cavity of the holster.

Embodiment 9b is directed to embodiment 1b, wherein the telematics device is attached to the mount using a reversible adhesive or an interposer, and the mount is off-the-shelf.

Embodiment 10b is directed to embodiment 1b, wherein the telematics device is configured to wirelessly receive instructions to suspend or resume status monitoring, and to wirelessly receive a profile including parameters for detecting the presence or absence of an implement.

Embodiment 11b is directed to embodiment 1b, wherein the status of the mount further comprises the location of the mount.

Embodiment 12b is directed to a method for sharing the status of an implement on a mount, comprising:

receiving, from a telematics device mounted on the mount, a determination of whether the implement is holstered or unholstered, wherein the determination is received one or more times per minute;

providing the current status of the implement, wherein the current status comprises the latest determination and the location of the implement.

Embodiment 13b is directed to embodiment 12b, wherein the determination and the location are received by way of a mobile device in communication with the telematics device mounted on the mount, and the current status is provided via a user interface that includes changes in status and displays the location of the implement on a map.

Embodiment 14b is directed to embodiment 12b, wherein the determination and the location were received at a mobile device, and the current status of the implement as well as the current status of other implements are provided via a graphical user interface that displays the status of each implement on a map.

Embodiment 15b is directed to embodiment 14b, wherein the statuses displayed on the map were obtained via a personal or local area network without relaying communications via a remote server.

Embodiment 16b is directed to embodiment 12b, wherein the determination is updated one or more times per five seconds.

Embodiment 17b is directed to embodiment 12b, wherein the determination is updated one or more times per second.

Embodiment 18b is directed to embodiment 13b, wherein the mobile device is a radio.

Embodiment 19b is directed to embodiment 13b, wherein the mobile device provides the user interface.

Embodiment 20b is directed to embodiment 13b, wherein a client device that is different from the mobile device provides the user interface.

Embodiment 21b is directed to embodiment 12b, wherein the current status is provided as an alert message.

Embodiment 22b is directed to a method for sharing the status of an implement on a mount, comprising:

receiving, at a first telematics device, from a second telematics device mounted on the mount, a determination of whether the implement is holstered or unholstered, wherein the determination is updated one or more times per minute;

performing one or more automated task.

Embodiment 23b is directed to embodiment 22b, wherein the one or more automated task is one or more of initiating forensic logging, opening a radio channel, and waking from a sleep state.

Embodiment 1c is directed to a system for charging a firearm accessory, comprising:

a firearm;

the firearm accessory, wherein the accessory is mounted on or within the grip of the firearm; and a charging device located within the magazine chamber of the firearm receiver.

Embodiment 2c is directed to embodiment 1c, wherein the charging device is secured within the magazine chamber by way of a standard magazine catch.

Embodiment 3c is directed to embodiment 1c, wherein the charging device comprises an inductive charging coil.

Embodiment 4c is directed to embodiment 1c, wherein the charging device forms a direct connection with the accessory by positioning contacts on the accessory in physical proximity to contacts on the charging device.

Embodiment 5c is directed to embodiment 1c, wherein the accessory comprises circuitry configured to provide and receive communications with a remote device over a wireless subsystem.

Embodiment 6c is directed to embodiment 1c, wherein the charging device comprises circuitry configured to provide and receive communications with a remote device over a wireless subsystem.

Embodiment 7c is directed to embodiment 1c, wherein the charging device disables the firing mechanism of the firearm upon securing the charging device within the magazine chamber.

Embodiment 8c is directed to embodiment 2c, wherein the charging device comprises a protrusion that physically interferes with movement of the trigger mechanism of the firearm.

Embodiment 9c is directed to embodiment 3c, wherein the inductive charging coil is formed using a stacked winding or is formed using integrated traces upon a printed circuit board.

Embodiment 10c is directed to embodiment 1c, wherein the time to charge the accessory is less than 8 hours.

Embodiment 11c is directed to embodiment 1c, wherein the system automatically halts charging when the accessory reaches a target charge level.

Embodiment 12c is directed to embodiment 1c, wherein the charging device comprises a rechargeable battery.

Embodiment 13c is directed to embodiment 1c, wherein the charging device includes visual indicators that show the status of charging.

Embodiment 14c is directed to a method for charging a firearm accessory, comprising:

at a firearm having a firearm accessory positioned proximal to the magazine chamber of the firearm, receiving a charging device into the magazine chamber of the firearm;

at the firearm, automatically commencing charging the firearm accessory upon receipt of the charging device into the magazine chamber;

at the firearm, each time a time interval has elapsed, providing a status message to a remote device, wherein the status message comprises an indication that the firearm accessory is charging or the firearm accessory is not charging;

at the firearm, automatically halting charging of the firearm accessory when the firearm accessory is fully charged.

Embodiment 15c is directed to embodiment 14c, wherein the status message further comprises information about the amount of remaining battery charge for a battery of the firearm accessory, or the rate of charging for the battery of the firearm accessory.

Embodiment 16c is directed to embodiment 14c, wherein the status message is provided by the firearm accessory.

Embodiment 17c is directed to embodiment 14c, wherein the status message is provided by the charging device.

Embodiment 18c is directed to embodiment 14c, wherein the method further comprises receiving, at the firearm, a message to activate or deactivate charging of the firearm accessory, and activating or deactivating charging accordingly.

Embodiment 19c is directed to embodiment 14c, wherein the remote device is a mobile device.

Embodiment 20c is directed to embodiment 14c, wherein the remote device is a server.

The foregoing description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

What is claimed is:

1. A method for documenting a firearm-discharge event, based on instructions from a holster telematics sensor device mounted to a holster and a firearm telematics sensor device attached to a firearm, the holster telematics sensor device having a first processor, a first sensor, and a first storage component and configured for detecting an unholstering event, wherein the first processor, the first sensor, and the first storage component are contained within a common housing of the holster telematics sensor device, and the firearm telematics sensor device having a second processor, a second sensor, and a second storage component and configured for detecting a firearm-discharge event, wherein the second processor, the second sensor, and the second storage component are contained within a common housing of the firearm telematics sensor device, the method comprising:

detecting, by the holster telematics sensor device, an unholstering event, wherein detecting the unholstering event comprises:

generating, by the first sensor of the holster telematics sensor device, a presence measurement regarding the presence of the firearm in the holster, wherein the presence measurement is inductive coupling data or dielectric trace data;

determining, by the first processor of the holster telematics sensor device, the holstering status of the firearm based on the presence measurement, wherein the holstering status is selected from a group consisting of holstered and unholstered, and storing the holstering status in the first storage component; and comparing, by the first processor of the holster telematics sensor device, the holstering status to a previous holstering status and identifying, by the first processor of the holster telematics sensor device, the unholstering event as a change in the status of the firearm from holstered to unholstered;

responsive to detection of the unholstering event, sending, to a camera, an instruction to record video data;

detecting, by the firearm telematics sensor device the firearm-discharge event, wherein detecting the firearm-discharge event comprises:

generating, by the second sensor of the firearm telematics sensor device, a data series based on inertial measurements concerning translation of the firearm and storing the data series in the second storage component; and determining that a discharge event has occurred by identifying, by the processor of the firearm telematics sensor device, a portion of the data series based on the inertial measurements that is indicative of to a characteristic firearm-discharge-event pattern; and storing, by the firearm telematics sensor device, metadata regarding the discharge event for association with the video data in the second storage component, wherein the metadata comprise a time stamp for the discharge event.

2. The method of claim 1, wherein the instruction to record video data is sent over a telecommunications network.

3. The method of claim 1, wherein the instruction to record video data is sent over a local area network by the holster telematics sensor device.

4. The method of claim 1, wherein the firearm telematics sensor device is integrated into the grip of the firearm.

5. The method of claim 1, further comprising: receiving, at the camera, an instruction selected from the group consisting of: turning on the camera, waking the camera, marking existing video to be retained, and marking new video to be retained.

6. The method of claim 1, further comprising:

sending, responsive to detecting an unholstering event, by the holster telematics sensor device, to the firearm telematics sensor device, an instruction to change the status of the firearm telematics sensor device to a more active state.

7. The method of claim 1, the step of detecting the firearm-discharge event further comprising determining, by the firearm telematics sensor device, the orientation of the firearm during the firearm-discharge event, and the metadata further comprising the determined orientation.

8. The method of claim 1, wherein the data series based on inertial measurements is filtered with a band pass filter prior to identifying the similar portion of the data series.

* * * * *